United States Patent
Busch

(10) Patent No.: US 11,348,140 B2
(45) Date of Patent: May 31, 2022

(54) SYSTEMS AND METHODS FOR TRANSMITTING ESTABLISHMENT INFORMATION

(71) Applicant: Meta Platforms, Inc., Menlo Park, CA (US)

(72) Inventor: James David Busch, Tempe, AZ (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/898,066

(22) Filed: Jun. 10, 2020

(65) Prior Publication Data

US 2020/0302480 A1 Sep. 24, 2020

Related U.S. Application Data

(63) Continuation of application No. 16/687,514, filed on Nov. 18, 2019, now Pat. No. 10,733,629, which is a
(Continued)

(51) Int. Cl.
| | |
|---|---|
| *H04W 24/00* | (2009.01) |
| *G06Q 30/02* | (2012.01) |
| *H04W 4/029* | (2018.01) |
| *H04W 4/80* | (2018.01) |
| *G06F 16/9537* | (2019.01) |
| *H04W 4/38* | (2018.01) |
| *H04L 67/50* | (2022.01) |
| *H04L 67/52* | (2022.01) |
| *G06Q 20/32* | (2012.01) |

(Continued)

(52) U.S. Cl.
CPC ..... *G06Q 30/0261* (2013.01); *G06F 16/9537* (2019.01); *G06Q 20/3224* (2013.01); *G06Q 30/0205* (2013.01); *G06Q 30/0224* (2013.01); *G06Q 30/0233* (2013.01); *G06Q 30/0236* (2013.01); *G06Q 30/0245* (2013.01); *G06Q 30/0255* (2013.01); *G06Q 30/0256* (2013.01); *G06Q 30/0267* (2013.01); *G06Q 30/0282* (2013.01); *H04L 67/18* (2013.01); *H04L 67/22* (2013.01); *H04W 4/02* (2013.01); *H04W 4/023* (2013.01); *H04W 4/025* (2013.01); *H04W 4/029* (2018.02); *H04W 4/30* (2018.02); *H04W 4/38* (2018.02); *H04W 4/80* (2018.02); *H04M 2250/10* (2013.01); *H04M 2250/12* (2013.01)

(58) Field of Classification Search
CPC ..... H04W 4/028; H04W 4/023; H04W 4/008; G06Q 30/0225
USPC ...................................... 455/456.3; 370/338
See application file for complete search history.

(56) References Cited

U.S. PATENT DOCUMENTS

2006/0276201 A1* 12/2006 Dupray ................ H04W 4/024
  455/456.1
2013/0038490 A1* 2/2013 Garcia .................... G01S 13/74
  342/451

* cited by examiner

*Primary Examiner* — Marcos Batista
(74) *Attorney, Agent, or Firm* — Baker Botts L.L.P.

(57) ABSTRACT

A computing system is configured to receive location data from a wireless device of a user. Upon receiving a search request from the wireless device, the computing system utilizes the location data to determine one or more likely travel routes of the user of the wireless device. In response to the search request, the computing system may select one or more establishments based on the likely travel routes and location data associated with the one or more establishments. The computing system may further transmit to the wireless device information associated with the selected one or more establishments.

20 Claims, 29 Drawing Sheets

Analytics (Content Feedback): — 1620

Content ID: Gelato Shop! Summer Promotion Number 3 — 1622

| Day | Views | Visits | Returning Visits | Sales | | Revenue |
|---|---|---|---|---|---|---|
| June 21 | 100 | 30 | 3 | 33 | (details) | $405 |
| June 22 | 120 | 45 | 10 | 48 | (details) | $560 |
| June 23 | 110 | 50 | 20 | 52 | (details) | $602 |
| June 24 | 150 | 59 | 25 | 63 | (details) | $699 |
| June 25 | 143 | 43 | 34 | 50 | (details) | $650 |
| ... | ... | ... | ... | ... | ... | ... |
| Total | ### | ### | ### | ### | (details) | ### |
| | 1624 | 1626 | 1628 | 1630 | 1632 | 1634 |

Related U.S. Application Data continuation of application No. 16/405,709, filed on May 7, 2019, now Pat. No. 10,546,324, which is a continuation of application No. 15/462,687, filed on Mar. 17, 2017, now Pat. No. 10,332,152, which is a continuation of application No. 15/352,456, filed on Nov. 15, 2016, now Pat. No. 9,639,858, which is a continuation of application No. 14/823,562, filed on Aug. 11, 2015, now Pat. No. 9,521,524, which is a continuation of application No. 14/752,840, filed on Jun. 27, 2015, now Pat. No. 9,277,366, which is a continuation of application No. 14/281,878, filed on May 19, 2014, now Pat. No. 9,076,165, which is a continuation of application No. 13/748,519, filed on Jan. 23, 2013, now Pat. No. 8,768,379, which is a continuation of application No. 13/556,195, filed on Jul. 23, 2012, now Pat. No. 8,437,776, which is a continuation of application No. 12/049,364, filed on Mar. 16, 2008, now Pat. No. 8,229,458.

(60) Provisional application No. 60/910,662, filed on Apr. 8, 2007.

(51) Int. Cl.
*H04W 4/02* (2018.01)
*H04W 4/30* (2018.01)

Please Verify the Business Location(s) Visited

280 →

☐ Location 200

☐ Location 206

☐ Location 208

☐ Location 210

| Cancel | Submit |

FIG. 2D

| Your Friends: |
| --- |
| Dos Gringos (4)<br>[ Info ] [ Directions ] [ Notify Me ]<br><br>Steve's Espresso (2)<br>[ Info ] [ Directions ] [ Notify Me ]<br><br>Cue Club (10)<br>[ Info ] [ Directions ] [ Notify Me ]<br><br>Home (37)<br><br>Not Reporting (20) |
| [ Map View ]<br>[ Apply Filters ] |

FIG. 12A

| Your Friends: |
| --- |
| Dos Gringos (4)<br>[ Info ] [ Directions ] [ Notify Me ]<br>• Albert [ Call ] [ Text ]<br>• Betty  [ Call ] [ Text ]<br>• Curtis [ Call ] [ Text ]<br>• Dave  [ Call ] [ Text ]<br><br>Steve's Espresso (2)<br>[ Info ] [ Directions ] [ Notify Me ]<br>• Emily [ Call ] [ Text ]<br>• Frank [ Call ] [ Text ]<br><br>Cue Club (10) |
| [ Map View ] [ Group Text ]<br>[ Apply Filters ] |

FIG. 12B

Create Content

Content ID: _____ —1600

Business Location: [All Locations ▽] —1602
(1) Tempe Location
(2) Scottsdale Location
...

Link (Optional): _____ —1604

Content / Description:

Analytics (Content Feedback):

Content ID: Gelato Shop! Summer Promotion Number 3 —1620
—1622

| Day | Views | Visits | Returning Visits | Sales | | Revenue |
|---|---|---|---|---|---|---|
| June 21 | 100 | 30 | 3 | 33 | (details) | $405 |
| June 22 | 120 | 45 | 10 | 48 | (details) | $560 |
| June 23 | 110 | 50 | 20 | 52 | (details) | $602 |
| June 24 | 150 | 59 | 25 | 63 | (details) | $699 |
| June 25 | 143 | 43 | 34 | 50 | (details) | $650 |
| ... | ... | ... | ... | ... | ... | ... |
| Total | ### | ### | ### | ### | (details) | ### |

SYSTEMS AND METHODS FOR TRANSMITTING ESTABLISHMENT INFORMATION

CROSS REFERENCE TO RELATED APPLICATIONS

Claim of Domestic Priority: This application is a continuation of U.S. application Ser. No. 16/687,514, filed Nov. 18, 2019, which is a continuation of U.S. application Ser. No. 16/405,709, filed May 7, 2019 (issued as U.S. Pat. No. 10,546,324 on Jan. 28, 2020), which is a continuation of U.S. application Ser. No. 15/462,687, filed Mar. 17, 2017 (issued as U.S. Pat. No. 10,332,152 on Jun. 25, 2019), which is a continuation of U.S. application Ser. No. 15/352,456, filed Nov. 15, 2016 (issued as U.S. Pat. No. 9,639,858 on May 2, 2017), which is a continuation of U.S. application Ser. No. 14/823,562, filed Aug. 11, 2015 (issued as U.S. Pat. No. 9,521,524 on Dec. 13, 2016), which is a continuation of U.S. application Ser. No. 14/752,840, filed Jun. 27, 2015 (issued as U.S. Pat. No. 9,277,366 on Mar. 1, 2016), which is a continuation of U.S. application Ser. No. 14/281,878, filed May 19, 2014 (issued as U.S. Pat. No. 9,076,165 on Jul. 7, 2015), which is a continuation of U.S. application Ser. No. 13/748,519, filed Jan. 23, 2013 (issued as U.S. Pat. No. 8,768,379 on Jul. 1, 2014), which is a continuation U.S. application Ser. No. 13/556,195 filed Jul. 23, 2012 (issued as U.S. Pat. No. 8,437,776 on May 7, 2013), which is a continuation of U.S. application Ser. No. 12/049,364, filed Mar. 16, 2008 (issued as U.S. Pat. No. 8,229,458 on Jul. 24, 2012), which claims the benefit of the filing date under 35 U.S.C. § 119(e) of U.S. Provisional Application Ser. No. 60/910,662, filed Apr. 8, 2007. Other Related Applications: Other related applications include U.S. application Ser. Nos. 12/951,040, 13/107,932, 13/555,202 (issued as U.S. Pat. No. 8,364,171 on Jan. 29, 2013), Ser. No. 13/556,188 (issued as U.S. Pat. No. 8,447,331 on May 21, 2013), Ser. No. 13/674,882 (issued as U.S. Pat. No. 8,566,236 on Oct. 22, 2013), Ser. No. 13/693,054 (issued as U.S. Pat. No. 8,626,194 on Jan. 7, 2014), Ser. No. 13/740,218 (issued as U.S. Pat. No. 8,515,459 on Aug. 20, 2013), Ser. No. 13/843,879 (issued as U.S. Pat. No. 8,559,977 on Oct. 15, 2013), Ser. No. 13/843,915 (issued as U.S. Pat. No. 8,774,839 on Jul. 8, 2014), Ser. No. 14/205,294 (issued as U.S. Pat. No. 8,996,035 on Mar. 31, 2015), Ser. No. 14/257,829 (issued as U.S. Pat. No. 8,892,126 on Nov. 18, 2014), and Ser. No. 14/281,878 (issued as U.S. Pat. No. 9,076,165 on Jul. 7, 2015). All of the above referenced Applications and Patents are herein incorporated by reference in their entirety.

BACKGROUND OF THE INVENTION

This invention generally relates to methods and systems that generate information associated with geographic locations, targeted content delivery, targeted search results, navigation systems, mobile conversion tracking, and location based services on mobile devices. More specifically, this invention relates to methods and systems for processing and reporting mobile location data in order to provide targeted content, conversion tracking, and other information and services to businesses and users of mobile devices. To shorten and simplify the description of the invention, see references 1 through 16 and 36 through 40 below, herein incorporated by reference in their entirety.

There is significant benefit provided by methods and systems that provide an improved targeted advertising system that is able to deliver content to a mobile audience that may subsequently conveniently visit the advertiser's business. The methods and systems also provide feedback to advertisers including conversion tracking of mobile advertisements that result in sales at their retail locations. Furthermore, significant benefit is also provided by methods and systems of paying via mobile phones that are coupled to mobile advertisement systems, and systems that track conversions.

There is significant benefit provided by methods and systems that provide a better display of content on a mobile device that exploits the form factor and features of the mobile device. Current targeted content efforts have not taken advantage of all the features mobile devices have to offer. To shorten and simplify the description of the invention, see reference 5 below, herein incorporated by reference in its entirety.

There is significant benefit provided by methods and systems that provide search results and targeted content based upon the current course of the user instead of simply the radial distance from the user. There is also significant benefit provided by methods and systems that provide up-to-date cartographic information. For purposes of illustration and without limitation, when a car is traveling north there may be a gas station one mile south but it is better to remain on course and visit a different gas station three miles ahead of the current location and along the desired route.

Significant benefit is provided by a content targeting methods and systems usable with mobile devices that not only search for results closest to the current location of the mobile device, but also take into account other information in order to provide more useful results for the user. The methods and systems analyze current or historical locations, speeds, headings of the mobile device, or combinations thereof, as recorded by the device, by a remote system, or both, and deliver search result information, including content from advertisers interested in targeting consumers in the areas the consumer typically travels. Thus, in one application, if a consumer usually travels along a given route to and from work, where a specific advertiser owns a business, it would be desirable if the content produced by the advertiser would be more likely to reach the consumer than another consumer that never passes by any business locations of the advertiser. In another application, targeted content for businesses on the right hand side of the road may have preference over targeted content on the left hand side of the road in the United States since it may be easier to make a right hand turn than a left hand turn. If the content is something that the targeted consumer is interested in, they are more likely to respond to the content and visit the business location of the advertiser because it is convenient for them to stop at the business location, based on the flow of automobile traffic. In forms of the invention with integrated navigation features, the current or any historical route may be used to provide results for businesses that are easily accessible from the current route or other likely routes. Furthermore, the types of businesses along the route that the mobile device is currently on or usually takes, the types of businesses that the mobile device appears to visit based on past location and other data, the types of targeted content that the device has responded to, preferences and favored keywords of the user, historical search queries from the mobile device or another associated device or account on a remote system, reminder flags set from the mobile device or another associated device or account on a remote system, and preferences of advertisers may also be used to more effectively target content for mobile devices. To shorten and simplify the description of the invention, see references 1, 2, and 17 through 35 below, herein incorporated by reference in their entirety.

Significant benefit is provided by a content targeting methods and systems usable with mobile devices that provide feedback to the advertisers—especially those advertisers that have brick and mortar businesses—to help them judge the effectiveness of their targeted content. The effectiveness of a business' advertising effort may be measured by determining with regard to a user of a device that has received targeted content one or more of: whether the user visits a business location of a content producer after their content has been delivered to the device; the time spent at the location; and, how much money was spent at the business by that user (especially in the case where the user pays through an online payment service utilizing the mobile device).

There is significant benefit provided by methods and systems that facilitate sharing of location information with friends, family, acquaintances, and the general public. These methods and systems may provide personal information or may anonomyze the data depending on privacy settings and the particular application. These methods and systems help a user of the system locate friends and family members and provide up-to-date information about the popularity or business of business locations. To shorten and simplify the description of the invention, see reference 50 below, herein incorporated by reference in its entirety.

There is significant benefit provided by improved GPS functionality in these devices in order to better provide location based services and to enable reliable location based services indoors. The methods and systems incorporate Bluetooth®, Near Field Radios such as RFID, Wi-Fi, WiMax, 700 MHz Radios, GPS, or combinations thereof. The methods and systems may incorporate more accurate GPS chipsets such as the SIRF Star III or even more accurate GPS chipsets, A-GPS, cell tower triangulation, terrestrial FM or TV signals, altimeters, pressure sensors, or a combination thereof in addition to other location determination and sensing technologies in conjunction with one another. To further improve the accuracy, filtering techniques may be employed (e.g., a Kalman filter, etc.). To shorten and simplify the description of the invention, see references 41 through 64 below, herein incorporated by reference in their entirety.

Significant benefit is provided by methods and systems that report more accurate addresses, business names, and other information that corresponds to the location reported by mobile devices. Current location based services simply show a pinpoint on a map or an approximate street address that does not correspond to the actual location inside of a business location. Street addresses typically correspond to locations along the road while the location information from the cellular phone usually indicates a location set back from the road representing the user's actual location inside of a business location. Other reasons why street address information may be inaccurate is that the geocoding algorithms that calculate the street address are incorrect at times, or they cannot account for all of the variations that must occur in the addressing scheme to account for various city layouts. To shorten and simplify the description of the invention, refer to references 17 through 28 below, herein incorporated by reference in their entirety.

Significant benefit is provided by navigation software that not only takes into account current traffic conditions in providing routes, but methods and systems that are able to determine how many people are taking any given route and orchestrate traffic by distributing travelers judiciously across all available streets to avoid congestion on the most well known paths. The methods and systems provide traffic information enabling users to avoid traffic congestion. To shorten and simplify the description of the invention, refer to references 17 through 28, 65 through 69, and 131 below, herein incorporated by reference in their entirety.

Significant benefit is provided by an incentive system to entice consumers to go out of their way to visit the business location of an advertiser. The methods and systems provide digital coupon delivery usable with mobile devices. When the advertising system sends a targeted advertisement to a consumer, it may be beneficial to provide an incentive in the form of a coupon or discount valid at the advertiser's place of business. The type or value of the discount may be tied to the amount of effort that is required by the consumer to visit the advertiser's business from the current course of travel. The incentive may additionally or alternatively be subject to other conditions imposed by the advertising system or the advertiser.

There is significant benefit provided by methods and systems that entice users to visit business locations where there is relatively little effort on the part of the customer or the business to implement the incentive mechanism. The methods and systems may assign a value to the coupon related to the effort that would be required for the potential customer to get to the store from their current location and route. Furthermore, the methods and systems may automatically apply the coupon to the purchase price or they may provide a simple mechanism for application of the coupon. To shorten and simplify the description of the invention, see references 39, 40, and 130 below, herein incorporated by reference in their entirety.

Significant benefit is provided by advertising methods and systems that include one or more of: an interface for advertisers to produce or input their targeted content into an advertising system, a database that contains business locations and optionally other information such as phone numbers and business classifications, a secure database that contains tracking information for mobile devices and other user information, a search engine, a navigation or mapping system, and a software package with a suitable user interface for displaying location based targeted content on mobile devises. Using these and other elements as building blocks, any combination systems within the spirit of the invention may be put into place. To shorten and simplify the description of the invention, refer to references 69 through 83 below, herein incorporated by reference in their entirety.

Significant benefit is provided by methods and systems that encourage mobile device users to embrace the incredibly useful cell phone tracking features for their benefit. Despite the utility that this invention is provides, there is likely to be at least some resistance and reluctance to implement the invention due to what people perceive to be privacy concerns. Many people and organizations, such as the Electronic Freedom Foundation, are very reluctant to have their search habits, email, website viewing habits, and other personal information recorded while they browse the internet. This is true even if the information is not associated with any personal information. In order for increased privacy on the internet, some people even go as far as to disable very helpful and non-threatening features of web browsers such as cookies. Since many people are overly cautious of their internet location being known, they are even more resistant to their physical location known to a system that is able to analyze the data. Furthermore, there have been numerous recent court cases over the use of cell phone tracking. To shorten and simplify the description of the invention, see references 84 through 86 below, herein incorporated by reference in their entirety.

So as to reduce the complexity and length of the Detailed Specification, and to fully establish the state of the art in certain areas of technology, Applicant herein expressly incorporates by reference all of the following materials identified in each numbered paragraph below. The incorporated materials are not necessarily "prior art" and Applicant expressly reserves the right to swear behind any of the incorporated materials. Furthermore, the full text of non-patent literature incorporated by reference below may be included in the file wrapper of this application.

1. U.S. Publication Number 20060248062 entitled "Method and system for content search with mobile computing devices."
2. U.S. Publication Number 20060242017 entitled "Method and system of bidding for advertisement placement on computing devices."
3. U.S. Publication Number 20060190331 entitled "Delivering targeted advertising to mobile devices."
4. U.S. Pat. No. 6,947,772 entitled "System and method for providing messages on a wireless device connecting to an application server."
5. Web Document Manipulation for Small Screen Devices: A Review, Hassan Alam and Faud Rahman, BCL Technologies Inc.
6. Google Content-Targeted Advertising FAQ.
7. Behavioral Matchmaking, Part 3: GPS and Behavioral Targeting, By Andy Chen (Nov. 24, 2004)
8. Inside AdWords: A fireside chat on content targeting.
9. Schmidt: 'Just at The Beginning of Targeted Ads', By David Needle, internetnews.com.
10. Nokia Gets into Mobile Advertising, cellular-news.com.
11. The Big Bling: Targeted Advertising Will Take Off Thanks to Mobile Search.
12. Medio: Products: Mobile Advertising, medio.com.
13. Welcome to AdWords, Google.
14. Understanding Google's Conversion-Tracking Mechanism, Wednesday Jul. 13, 2005 9:50 AM, by Harold Davis, ONLamp.com.
15. Google AdWords, Regional and Local Targeting: Sharpen Your Advertising Focus.
16. Google AdWords Conversion Tracking Guide.
17. Google Maps adds real-time traffic data, by Daniel Terdiman, CNET News.com (Mar. 1, 2007).
18. Charelston Tour Guide: Developing and Evaluating a GPS-Enabled Mobile Device for Touring Charleston, Dr. Bing Pan, Office of Tourism Analysis Department of Hospitality and Tourism Management College of Charleston.
19. NexBus—Wikipedia, the free encyclopedia.
20. Smarter Agent Privacy Policy.
21. Telematics—Wikipedia, the free encyclopedia.
22. Vehicle Tracking System—Wikipedia, the free encyclopedia.
23. ESITrack Products© 2005-2006 PT Elda Sarana Informatika.
24. Global Location Systems, Inc.
25. iTRAK GPS Vehicle Tracking System.
26. Snitch—Low Cost GPS Tracking.
27. About Sprint Family Locator.
28. Get the power of GPS-enabled Google Maps on your Helio Drift, Google Maps.
29. Algorithms and Data Structures: 4th International Workshop, Wads '95, Kingston, Canada, Aug. 16-18, 1995: Proceedings (Lecture Notes in Computer Science), by Selim G. Akl, Springer (December 1995).
30. Algorithms and Data Structures: 6th International Workshop, WADS'99 Vancouver, Canada, Aug. 11-14, 1999 Proceedings (Lecture Notes in Computer Science), by Frank Dehne, Springer; 1 edition (Aug. 27, 1999).
31. Algorithms in C, Parts 1-5 (Bundle): Fundamentals, Data Structures, Sorting, Searching, and Graph Algorithms (3rd Edition), by Robert Sedgewick, Addison-Wesley Professional; 3 edition (Aug. 31, 2001).
32. Data Mining In Time Series Databases (Series in Machine Perception and Artificial Intelligence), by Mark Last, World Scientific Pub Co Inc (November 2004).
33. Data Structures and Algorithms I: Sorting and Searching (Monographs in Theoretical Computer Science. An EATCS Series), by K. Mehlhorn, Springer; 1 edition (Sep. 15, 1987).
34. U.S. Publication Number 20060242129 entitled "Method and system for active ranking of browser search engine results."
35. Web Information Systems —WISE 2004: 5th International Conference on Web Information Systems Engineering, Brisbane, Australia, Nov. 22-24, 2004, Proceedings, by Xiaofang Zhou, Springer; 1 edition (Dec. 22, 2004).
36. Electronic Payment Systems for E-Commerce, by Donal O'Mahony, Artech House Publishers; 2nd edition (Aug. 15, 2001).
37. Implementing Electronic Card Payment Systems, by Cristian Radu, Artech House Publishers (November 2002).
38. Payment Technologies for E-Commerce, by Weidong Kou, Springer; 1 edition (Aug. 9, 2006).
39. U.S. Pat. No. 6,505,046 entitled "Method and apparatus for distributing location-based messages in a wireless communication network."
40. U.S. Pat. No. 6,968,180 entitled "Coupon methods and systems of use of coupons within a group communications system."
41. Understanding GPS: Principles and Applications, Second Edition, by Elliott D. Kaplan, Artech House Publishers; 2nd edition (Nov. 30, 2005).
42. Global Positioning Systems, Inertial Navigation, and Integration, by Mohinder S. Grewal, Wiley-Interscience; 2 Har/Cdr edition (Jan. 22, 2007).
43. Fundamentals of Global Positioning System Receivers: A Software Approach, by James Bao-Yen Tsui, Wiley-Interscience; 1 edition (May 19, 2000).
44. Global Positioning System—Wikipedia, the free online encyclopedia.
45. GPS Phone—Wikipedia, the free online encyclopedia.
46. GPS Standard Positioning using Kalman filter, Yamaguchi, S.; Tanaka, T.; SICE-ICASE, 2006. International Joint Conference, October 2006 Page(s): 1351-1354.
47. GPS Tracking—Wikipedia, the free online encyclopedia.
48. Assisted GPS: A Low-Infrastructure Approach, By Jimmy LaMance, Jani Jarvinen, Javier DeSalas, GPSWorld (Mar. 1, 2002).
49. Indoor GPS theory & implementation, van Digellen, F.; Position Location and Navigation Symposium, 2002 IEEE, 15-18 Apr. 2002 Page(s): 240-247.
50. Automatic Position Reporting System—Wikipedia, the free online encyclopedia.
51. Beidou navigation system—Wikipedia, the free online encyclopedia.
52. Galileo Positioning System—Wikipedia, the free online encyclopedia.

53. GLONASS—Wikipedia, the free online encyclopedia.
54. GSM localization—Wikipedia, the free online encyclopedia.
55. Indian Regional Navigational Satellite System—Wikipedia, the free online encyclopedia.
56. Computing location from ambient FM radio signals [commercial radio station signals], Youssef, A.; Krumm, J.; Miller, E.; Cermak, G.; Horvitz, E.; Wireless Communications and Networking Conference, 2005 IEEE, Volume 2, 13-17 Mar. 2005 Page(s): 824-829 Vol. 2.
57. Multilateration—Wikipedia, the free online encyclopedia.
58. Trilateration—Wikipedia, the free online encyclopedia.
59. Naystar GPS and GLONASS: global satellite navigation systems, Daly, P.; Electronics & Communication Engineering Journal, Volume 5, Issue 6, December 1993 Page(s): 349-357.
60. Performance of Hybrid Positioning System Combining GPS and Television Signals, Ju-Yong Do; Rabinowitz, M.; Enge, P.; Position, Location, And Navigation Symposium, 2006 IEEE/ION, Apr. 25-27, 2006 Page(s): 556-564.
61. Accuracy Enhancement for UWB Indoor Positioning Using Ray Tracing, Yung-Hoon Jo; Joon-Yong Lee; Dong-Heon Ha; Shin-Hoo Kang; Position, Location, And Navigation Symposium, 2006 IEEE/ION, Apr. 25-27, 2006 Page(s): 565-568.
62. PMD Based Mobile Node Position Monitoring, Hasouneh, F.; Knedlik, S.; Peters, V.; Loffeld, O.; Position, Location, And Navigation Symposium, 2006 IEEE/ION, Apr. 25-27, 2006 Page(s): 569-573.
63. Performance of Hybrid Positioning System Combining GPS and Television Signals, Ju-Yong Do; Rabinowitz, M.; Enge, P.; Position, Location, And Navigation Symposium, 2006 IEEE/ION, Apr. 25-27, 2006 Page(s): 556-564.
64. Multilateration tracking and synchronization over wide areas, Yang, Y. E.; Baldwin, J.; Smith, A.; Radar Conference, 2002. Proceedings of the IEEE, 22-25 Apr. 2002 Page(s): 419-424.
65. A Prototype Personal Navigation System, Soehren, W.; Hawkinson, W.; Position, Location, And Navigation Symposium, 2006 IEEE/ION, Apr. 25-27, 2006 Page(s): 539-546.
66. An AutoPC for supporting in-vehicle navigation and location-based multimedia services, Chun-Hsin Wu; Ann-Tzung Cheng; Shao-Ting Lee; Jan-Ming Ho; Position Location and Navigation Symposium, 2002 IEEE, 15-18 Apr. 2002 Page(s): 226-232.
67. An AutoPC for supporting in-vehicle navigation and location-based multimedia services, Chun-Hsin Wu; Ann-Tzung Cheng; Shao-Ting Lee; Jan-Ming Ho; Position Location and Navigation Symposium, 2002 IEEE, 15-18 Apr. 2002 Page(s): 226-232.
68. WikiGPS—Meta. Retrieved from "http://meta.wikimedia.org/wiki/WikiGPS".
69. 2002 IEEE Position Location and Navigation Symposium (IEEE Cat. No. 02CH37284), Position Location and Navigation Symposium, 2002 IEEE, 15-18 Apr. 2002.
70. IEEE 1998 Position Location and Navigation Symposium (Cat. No. 98CH36153), Position Location and Navigation Symposium, IEEE 1998, 20-23 Apr. 1998.
71. IEEE 2000. Position Location and Navigation Symposium (Cat. No. 00CH37062), Position Location and Navigation Symposium, IEEE 2000, 13-16 Mar. 2000.
72. IEEE PLANS '88 Position Location and Navigation Symposium Record 'Navigation into the 21st Century' (IEEE Cat. No. 88CH2675-7) Position Location and Navigation Symposium, 1988. Record. 'Navigation into the 21st Century'. IEEE PLANS '88., IEEE, 29 Nov.-2 Dec. 1988.
73. IEEE PLANS '90: Position Location and Navigation Symposium Record. The 1990's—A Decade of Excellence in the Navigation Sciences' (Cat. No. 90CH2811-8), Position Location and Navigation Symposium, 1990. Record. 'The 1990's—A Decade of Excellence in the Navigation Sciences'. IEEE PLANS '90., IEEE, 20-23 Mar. 1990.
74. IEEE PLANS '92. Position Location and Navigation Symposium. Record. 500 Years After Columbus—Navigation Challenges of Tomorrow (Cat. No. 92CH3085-8), Position Location and Navigation Symposium, 1992. Record. '500 Years After Columbus—Navigation Challenges of Tomorrow'. IEEE PLANS '92., IEEE, 23-27 Mar. 1992.
75. Location- and Context-Awareness: First International Workshop, LoCA 2005, Oberpfaffenhofen, Germany, May 12-13, 2005, Proceedings, by Thomas Strang, Springer; 1 edition (Aug. 5, 2005).
76. Location- and Context-Awareness: Second International Workshop, LoCA 2006, Dublin, Ireland, May 10-11, 2006, Proceedings, by Mike Hazas, Springer; 1 edition (Jun. 14, 2006).
77. PLANS 2000 position location and navigation symposium, Schroer, R.; Aerospace and Electronic Systems Magazine, IEEE, Volume 16, Issue 3, March 2001 Page (s): 21-25.
78. PLANS 2004. Position Location and Navigation Symposium (IEEE Cat. No. 04CH37556), Position Location and Navigation Symposium, 2004. PLANS 2004, 26-29 Apr. 2004.
79. PLANS '94. Position, Location and Navigation Symposium '94, Oman, H.; Aerospace and Electronic Systems Magazine, IEEE, Volume 9, Issue 7, July 1994 Page(s): 2-5
80. Position, Location, and Navigation Symposium (PLANS), Schroer, R.; Aerospace and Electronic Systems Magazine, IEEE, Volume 19, Issue 2, February 2004 Page(s): 33-34.
81. Proceedings of 1994 IEEE Position, Location and Navigation Symposium—PLANS'94, Position Location and Navigation Symposium, 1994, IEEE, 11-15 Apr. 1994.
82. Proceedings of Position, Location and Navigation Symposium—PLANS '96, Position Location and Navigation Symposium, 1996, IEEE 1996, 22-26 Apr. 1996.
83. Table of Contents, Position, Location, And Navigation Symposium, 2006 IEEE/ION, Apr. 25-27, 2006 Page(s): i-xii.
84. Cell phone tracking—Wikipedia, the free encyclopedia.
85. Cell phone tracking raises privacy issues, by Ben Charny, CNET News.com; Last Update (May 31, 2002).
86. EFF Cellphone Tracking Cases—USA v. Pen Register.
87. U.S. patent application Ser. No. 11/196,951 and U.S. Publication 20070032240 entitled "Realtime, interactive and geographically defined computerized personal matching methods and systems."
88. U.S. patent application Ser. No. 11/513,515 and U.S. Publication 20070032225 entitled "Realtime, location-based cell phone enhancements, uses, and applications."
89. Android Location Manager API, http://code.google.com/android/reference/android/location/LocationManager.html.
90. U.S. Provisional Patent Application 60/799,762 (Expired).

91. U.S. patent application Ser. No. 11/747,602 and U.S. Publication 20070264968 entitled "Location-based targeting."
92. U.S. patent application Ser. No. 11/747,613.
93. U.S. patent application Ser. No. 11/747,618 and U.S. Publication 20070264974 entitled "Privacy control of location information."
94. U.S. patent application Ser. No. 11/747,658 and U.S. Publication 20070264969 entitled "Location-based status checking."
95. U.S. Pat. No. 6,675,017 entitled "Location blocking service for wireless networks", to Samuel N. Zellner, Mark J. Enzmann, and Robert T. Moton, Jr.
96. U.S. Pat. No. 6,716,101 entitled "System and method for monitoring the location of individuals via the world wide web using a wireless communications network", to Vemon Meadows and Michael S. Harper.
97. U.S. Pat. No. 6,738,808 entitled "Anonymous. location service for wireless networks", to Samuel N. Zellner, Mark J. Enzmann, and Robert T. Moton, Jr.
98. U.S. Pat. No. 6,799,049 entitled "System and method for tracking movement of a wireless device", to Samuel N. Zellner, Mark J. Enzmann, and Robert T. Moton, Jr.
99. U.S. Publication Number 20020077083 entitled "Identity blocking service from a wireless service provider", of Samuel N. Zellner, Mark J. Enzmann, and Robert T. Moton, Jr.
100. U.S. Publication Number 20020077118 entitled "Location blocking service from a wireless service provider", of Samuel N. Zellner, Mark J. Enzmann, and Moton, Robert T. Moton, Jr.
101. U.S. Publication Number 20040205198 entitled "Anonymous. location service for wireless networks", of Samuel N. Zellner, Mark J. Enzmann, and Robert T. Moton, Jr.
102. U.S. Publication Number 20060030335 entitled "Identity blocking service from a wireless service provider", of Samuel N. Zellner, Mark J. Enzmann, and Robert T. Moton, Jr.
103. U.S. Publication Number 20060089134 entitled "System and method for using location information to execute an action", of Robert 1. Moton, Jr., Mark J. Enzmann, and Samuel N. Zellner.
104. U.S. Publication Number 20060094447 entitled "System and method for using location information to execute an action", of Samuel N. Zellner.
105. U.S. Publication Number 20040097243 entitled "Location blocking service for wireless networks", of Samuel N. Zellner, Mark J. Enzmann, and Robert 1. Moton, Jr.
106. U.S. Publication Number 20060099966 entitled "System and method for using location information to execute an action", of Robert 1. Moton, Jr., Mark J. Enzmann, and Samuel N. Zellner.
107. "Location-Based Services" by Jochen Schiller and Agnes Voisard, which was published in 2004 and has ISBN Number: 1558609296.
108. "E-Commerce: Business, Technology, Society", Second Edition, by Kenneth C. Laudon and Carol Guercio Traver, which was published in 2004 and has ISBN Number: 0321269373.
109. 'WWW.Advertising: Advertising and Marketing on the World Wide Web" by Richard Adams, which was published in 2003 and has ISBN Number: 0823058611.
110. SurfStats—What is Conversion Tracking?
111. U.S. Publication Number 20070088603 entitled "Method and system for targeted data delivery using weight-based scoring."
112. U.S. Publication Number 20070192168 entitled "Map and Inventory-Based On-Line Purchases."
113. U.S. Publication Number 20060249576 entitled "Methods and systems for providing near real-time collection and reporting of data to third parties at remote locations."
114. U.S. Publication Number 20080005313 entitled "USING OFFLINE ACTIVITY TO ENHANCE ONLINE SEARCHING."
115. U.S. Publication Number 20080004990 entitled "VIRTUAL SPOT MARKET FOR ADVERTISEMENTS."
116. U.S. Publication Number 20080004948 entitled "AUCTIONING FOR VIDEO AND AUDIO ADVERTISING."
117. U.S. Publication Number 20080004884 entitled "EMPLOYMENT OF OFFLINE BEHAVIOR TO DISPLAY ONLINE CONTENT."
118. U.S. Publication Number 20070273558 entitled "DYNAMIC MAP RENDERING AS A FUNCTION OF A USER PARAMETER."
119. U.S. Publication Number 20070210937 entitled "DYNAMIC RENDERING OF MAP INFORMATION."
120. U.S. Publication Number 20070073477 entitled "METHODS FOR PREDICTING DESTINATIONS FROM PARTIAL TRAJECTORIES EMPLOYING OPEN- AND CLOSED-WORLD MODELING METHODS."
121. U.S. Publication Number 20070024580 entitled "Interactive display device, such as in context-aware environments."
122. U.S. Publication Number 20060282312 entitled "Advertisements in an alert interface."
123. U.S. Publication Number 20060241860 entitled "Virtual earth mapping."
124. U.S. Publication Number 20060241859 entitled "Virtual earth real-time advertising."
125. U.S. Publication Number 20060238383 entitled "Virtual earth rooftop overlay and bounding."
126. U.S. Publication Number 20060238382 entitled "Real-time virtual earth driving information."
127. U.S. Publication Number 20060238381 entitled "Virtual earth community based recommendations."
128. U.S. Publication Number 20060238380 entitled "Maintaining user privacy in a virtual earth environment."
129. U.S. Publication Number 20060238379 entitled "Obtaining and displaying virtual earth images."
130. The Business Journal of Phoenix, Going mobile: Marketing trend puts instant Gratification (Jun. 4, 2007).
131. CNET News.com, Nokia turns people into traffic sensors (Feb. 8, 2008).
132. Facebook Social Ads (Feb. 9, 2008).
133. Nokia Maps 2.0 hits beta (Feb. 9, 2008).
134. Sprint Conducting NFC Based Phone Payment Trial in Bay Area (Jan. 30, 2008).
135. CSR eGPS: Combined GPS/cellular data creates universal positioning Data, CSR (Feb. 10, 2008).
136. CSR eGPS: Positioning technology that always works, CSR (Feb. 10, 2008).
137. CSR eGPS: What users want, where they want it, CSR (Feb. 10, 2008).
138. TUAW Responds: iPhone LoJack (Feb. 21, 2008).
139. How Google Earth Ate our Town, TIME (Mar. 10, 2008).

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY OF THE INVENTION

The present invention provides among other things methods and systems to obtain data relating to location from mobile devices, processing this data, sending content to a mobile device based at least in part on location data, integration of location data associated with a mobile device with web based applications accessed with a standard computer or laptop, integration of location data with conversion tracking systems, integration of location data with customer relationship management systems and systems to determining retail business location performance, integration with social uses of location data of mobile devices, and integration with navigation uses of location data associated with mobile devices.

It is an object of the invention to provide methods and systems that obtain location information from mobile devices.

It is another object of the invention to provide methods and systems that transmit location information to a remote system.

It is another object of the invention to provide methods and systems that store location information from mobile devices.

It is another object of the invention to provide methods and systems that stream location data in real time.

It is another object of the invention to provide methods and systems that store location information and periodically send the location data to a remote system.

It is another object of the invention to provide methods and systems that allow the user of the mobile device to selectively enable or disable tracking features.

It is another object of the invention to provide methods and systems that yield location based services to devices without requiring constant tracking of the mobile device.

It is another object of the invention to provide methods and systems that yield location based services based upon search queries, requests for driving directions, or dialed phone numbers.

It is another object of the invention to provide methods and systems that yield search results or targeted content for locations along routes that the user plans on taking or has previously taken.

It is another object of the invention to provide methods and systems that periodically return location based content based on location data that has been generalized prior to sending the information in order to protect user privacy.

It is another object of the invention to provide methods and systems that process location information from mobile devices.

It is another object of the invention to provide methods and systems that process location information from a mobile device to determine the business that the user of the mobile device is visiting.

It is another object of the invention to provide methods and systems that process location information from a mobile device to determine the businesses that the user of the mobile device visited.

It is another object of the invention to provide methods and systems that collect location data from a mobile device and compare this data to business location information to determine specific businesses or types of businesses the user of a mobile device visits.

It is another object of the invention to provide methods and systems that collect location data from a mobile device and compare the data to business location information to determine the businesses the user of a mobile device is able to conveniently visit.

It is another object of the invention to provide methods and systems that collect location data from many mobile devices and compare the data to business location information to determine what types of businesses the users of the many mobile devices visit.

It is another object of the invention to provide methods and systems that process location information from a mobile device to determine the current route of the user of the mobile device.

It is another object of the invention to provide methods and systems that process location information from a mobile device to determine the routes that the user of the mobile device has previously taken.

It is another object of the invention to provide methods and systems that process location information from a mobile device to determine the routes that the user of the mobile device prefers to take.

It is another object of the invention to provide methods and systems that target content based upon the speed of the user.

It is another object of the invention to provide methods and systems that target content based upon the current behavior of the user (e.g., driving, walking on street, walking in shopping center).

It is another object of the invention to provide methods and systems that deliver digital content or advertisements to a user based upon routes or along the routes that the user travels.

It is another object of the invention to provide methods and systems that deliver targeted advertisements or content to mobile devices.

It is another object of the invention to provide methods and systems that deliver search results, advertisements, or content, to a user based upon locations the user is known to have previously visited.

It is another object of the invention to provide methods and systems that deliver digital advertisements or content based entirely or partly on the physical location and speed of the mobile device.

It is another object of the invention to provide methods and systems that deliver digital advertisements or content based entirely or partly on any combination or all of the following characteristics of the mobile device: the physical location, speed, or heading.

It is another object of the invention to provide methods and systems that deliver digital advertisements or content based entirely or partly on any combination or all of the following characteristics of the mobile device: previous physical locations, previous speeds, and previous headings.

It is another object of the invention to provide methods and systems that deliver route guidance based upon traffic conditions and user preferences and preferred routes.

It is another object of the invention to provide methods and systems that deliver search results to a user based upon routes along which the user travels.

It is another object of the invention to provide methods and systems that display businesses of interest to a user.

It is another object of the invention to provide methods and systems that inform individuals of nearby businesses they typically visit when they are in unfamiliar areas.

It is another object of the invention to provide methods and systems that yield advertisements formatted based upon the capabilities of the targeted mobile device.

It is another object of the invention to provide methods and systems that target content based upon the route the user of the mobile device typically takes.

It is another object of the invention to provide methods and systems that target content based upon the route the user of the mobile device is currently taking.

It is another object of the invention to provide methods and systems that yield targeted content based upon the types of businesses along the route the user of the mobile device usually takes.

It is another object of the invention to provide methods and systems that target advertisements based upon the types of businesses that the user of the mobile device typically visits.

It is another object of the invention to provide methods and systems that target advertisements based upon the businesses near the mobile device.

It is another object of the invention to provide methods and systems that target content based upon the history of content that the user has interacted with.

It is another object of the invention to provide methods and systems that target content based upon keywords associated with the user of the mobile device.

It is another object of the invention to provide methods and systems that target content based upon the current status of the user.

It is another object of the invention to provide methods and systems that display targeted content on the mobile device differently in varying circumstances.

It is another object of the invention to provide methods and systems that display targeted content when the mobile device is stationary.

It is another object of the invention to provide methods and systems that display targeted content when the mobile device is moving.

It is another object of the invention to provide methods and systems that display targeted content prior to the mobile device passing an entrance to the business location.

It is another object of the invention to provide methods and systems that display targeted content prior to the mobile device reaching the location of the business location.

It is another object of the invention to provide methods and systems that display targeted content based on the speed of the mobile device.

It is another object of the invention to provide methods and systems that display targeted content based upon the side of the road the merchant is located on with respect to the heading of the mobile device.

It is another object of the invention to provide methods and systems that trigger events on the mobile device based upon the location.

It is another object of the invention to provide methods and systems that track the user of the mobile device after viewing an advertisement to determine if the user visits the business location or makes a purchase.

It is another object of the invention to provide methods and systems that deliver coupons.

It is another object of the invention to provide methods and systems that are able to assign a value to a targeted coupon.

It is another object of the invention to provide methods and systems that yield coupon values based on the amount of energy a user needs to exert to go respond to the targeted content.

It is another object of the invention to provide methods and systems that yield coupons based upon the side of the road the business is in relation to the direction of the user's travel.

It is another object of the invention to provide methods and systems that yield coupon values based upon the location of the business with respect to the heading of the user.

It is another object of the invention to provide methods and systems that yield text based coupons.

It is another object of the invention to provide methods and systems that yield image based coupons.

It is another object of the invention to provide methods and systems that yield coupons redeemable with a barcode that is displayed on the mobile device.

It is another object of the invention to provide methods and systems that yield coupons redeemable via wireless technologies.

It is another object of the invention to provide methods and systems that track recipients of targeted content to determine whether they visit the business location associated with the targeted content.

It is another object of the invention to provide methods and systems that verify that a user stops at a business and does not just pass through the business location.

It is another object of the invention to provide methods and systems that determine the length of time a user of the mobile device spends at a particular business location in response to receiving targeted content.

It is another object of the invention to provide methods and systems that integrate location based services with search engines.

It is another object of the invention to provide methods and systems that yield location based features when the user is logged into the service on either a computer or a mobile device.

It is another object of the invention to provide methods and systems that allows a user to flag content for later notification on the mobile device based upon the location of the device.

It is another object of the invention to provide methods and systems that embed advertisements in web pages that communicate the location information to a remote system.

It is another object of the invention to provide methods and systems that integrate targeted content with databases of business inventories.

It is another object of the invention to provide methods and systems that search the inventories of stores along the paths that a user of a mobile device has traveled.

It is another object of the invention to provide methods and systems that integrate location services with payment services in order to assist with conversion tracking.

It is another object of the invention to provide methods and systems that integrate location services with online payment systems.

It is another object of the invention to provide methods and systems that integrate location services with credit card processing systems.

It is another object of the invention to provide methods and systems that determine a user response (e.g., action or omission) to targeted content.

It is another object of the invention to provide methods and systems that determine the amount of money spent at a particular business location by the user of a mobile device.

It is another object of the invention to provide methods and systems that determine how much time was spent at a particular business location by the user of a mobile device.

It is another object of the invention to use gathered information that targets advertisements or content.

It is another object of the invention to use the gathered information to be used in market research.

It is another object of the invention to provide methods and systems that report the number of visitors, unique visitors, or returning visitors, to a specific location, or to a group of locations (e.g., a retail location, a chain of locations, and a category of businesses) in a given period of time.

It is another object of the invention to provide methods and systems that yield advertisers with data that indicates information about mobile devices that were present at the geographic location indicated by an advertiser (e.g. the location of their business) during a period of time subsequent to the mobile device receiving an advertisement placed by the advertiser.

It is another object of the invention to provide methods and systems that determine if the owner of the mobile devices responded to an advertisement or content by providing input into the mobile device or going to the geographic location indicated by the advertisement or content.

It is another object of the invention to provide methods and systems that aggregate and display customer relationship management data.

It is another object of the invention to provide methods and systems that report the amount of money spent at a specific location, or a group of locations (e.g., a retail location, a chain of retail locations, a category of businesses) in a given period of time.

It is another object of the invention to provide methods and systems that report the amount of money spent broken down by geographic locations, regions, or areas, in a given period of time.

It is another object of the invention to provide methods and systems that forecast earnings, or performance of specific business locations, groups of locations, chains of locations, types of locations, and geographic areas.

It is another object of the invention to provide methods and systems that facilitate social interaction.

It is another object of the invention to provide methods and systems that allow family members to locate one another.

It is another object of the invention to provide methods and systems that yield the name of the business at which a family member is currently located.

It is another object of the invention to provide methods and systems that allow friends to locate one another.

It is another object of the invention to provide methods and systems that yield a listing of the businesses at which a friend is currently located.

It is another object of the invention to provide methods and systems that calculate a commission for generating business for a particular business location.

It is another object of the invention to provide methods and systems that allows notifications to be sent to friends and family including the current business location of the user.

It is another object of the invention to provide methods and systems that yield a measure of how busy a particular business location is.

It is another object of the invention to provide methods and systems that yield a measure of how busy a number of business locations are.

It is another object of the invention to provide methods and systems that deliver targeted advertisements or content to mobile devices, and mobile devices that operate as navigation systems.

It is another object of the invention to provide methods and systems that learn favored routes of the user.

It is another object of the invention to provide methods and systems that remember prior routes of the user.

It is another object of the invention to provide methods and systems that yield routes by businesses of interest to the user.

It is another object of the invention to provide methods and systems that insert intermediate destinations into directions provided by the navigation system.

It is another object of the invention to provide methods and systems that integrate navigation systems with fuel and other systems in the automobile.

It is another object of the invention to provide methods and systems that yield route guidance that is organized on a large scale.

It is another object of the invention to provide methods and systems that compare many sets of location data from different users to determine traffic conditions.

It is another object of the invention to provide methods and systems that integrate location based advertisements with voice communications systems.

It is another object of the invention to provide methods and systems that communicate phone numbers that a user dials to a remote system in order to assist with tracking the effectiveness of advertising materials.

It is another object of the invention to provide methods and systems that yield content to be sent to the user based on the specific business location they are currently visiting.

It is another object of the invention to provide methods and systems that communicate phone numbers that a user dials to a remote system in order to assist with tracking the effectiveness of advertising materials.

It is another object of the invention to provide methods and systems that determine if a viewer of a video advertisement (e.g., placed before, after, or during, an online video) takes an action (e.g., calling a phone number associated with the advertisement, visiting a business location associated with the advertisement, etc.) after viewing the advertisement.

It is another object of the invention to provide methods and systems that determine if a viewer of a video advertisement played on a Digital Video Recorder (DVR) or other digital video playback device (e.g., TiVo, Apple TV, Digital Cable boxes, Satellite TV Receivers, etc.) takes an action (e.g., calling a phone number associated with the advertisement, visiting a business location associated with the advertisement, etc.) after viewing the advertisement.

It is another object of the invention to provide methods and systems that determine if a user is in proximity to a print advertisement; whether it is likely that the user read the print advertisement; and, if the user performed an action (e.g., calling a phone number associated with the advertisement, visiting a business location associated with the advertisement, etc.) after viewing the advertisement.

It is another object of the invention to provide methods and systems that determine if a user views a public advertisement (e.g., Billboard, Sign, Poster) and takes an action (e.g., calling a phone number associated with the advertisement, visiting a business location associated with the advertisement, etc.) after viewing the advertisement.

It is another object of the invention to provide methods and systems that determine if a user visits a business location through word-of-mouth advertising (e.g., a friend of a user mentioned a particular business location and the user subsequently visits the business location).

It is another object of the invention to provide methods and systems that interface location based services with social networking websites.

It is another object of the invention to provide methods and systems that interface location based services with social networking websites by displaying location information on the users profile page (e.g., favorite business locations, favorite bars, favorite restaurants, marked locations, etc.); registering that a user attended an event if their location corresponded to the location of an event during the time the event took place (optionally only if they were invited to the event); managing location privacy permissions to friends and family; or displaying location based advertisements to the user based on their location information.

The above and other objects may be achieved using methods and systems involving targeting content to a user associated with a mobile device. First, a data set is obtained including geographic information associated with the mobile device. Then, the data set is processed in order to determine at least one likely course of that user. A content result set is obtained that has one or more elements that were selected based upon the likely course that was determined. The content result set is transmitted to the mobile device and at least one of the elements of the content result set is displayed on the mobile device.

The data set that is obtained may include a location, a speed, and a heading, or alternatively, the data set may include a planned or tentative course.

The act of processing the data involves first comparing the data set to a collection of other data sets associated with the user and then determining a set of previously traveled courses including at least a most likely course of travel. Alternatively, the act of processing may involve comparing the data set to a database of businesses and their locations, and then determining a set of likely locations that have previously been visited by the user of the mobile device.

The act of displaying involves listing any number of the elements of the content result set. Alternatively, displaying may involve listing any number of the elements of the content result set when the locations associated with the elements are ahead of the user on the likely course of travel. Still further, the act of displaying may involve showing any number of the elements of the content result set on the display of the mobile device when the locations associated with the elements are ahead on the likely course of travel, and then refreshing the list of visible elements on the display of the mobile device when the location associated with one of the elements is passed or when the likely course of travel changes.

Furthermore, the mobile device may be monitored to determine if there is an action or an omission after any of the elements of the content result set are displayed. That is, whether a user of the mobile device ignores the content or performs an action on it such as viewing the content or proceeding to a geographic location indicated by the element of the content result set. Then, the action or the omission associated with the element of the content result set displayed to the user may be recorded.

The action or the omission may be reported to the advertiser associated with the element of the content result set. This allows the advertiser to gauge the effectiveness of their content and further refine their advertising and marketing strategies.

The above and other objects may be achieved using methods and systems involving determining the extent that targeted content contributes to a consumer visiting a business location. First, an element of a content result set is displayed on a screen of a mobile device so that the content is presented to a user of the mobile device. Then the mobile device monitors its geographic position and records whether the geographic location of the mobile device corresponds to a geographic location associated with the element of the content result set. This allows the device to determine if an element of a content result set persuaded the user of the mobile device to respond to the content or advertisement by visiting the business location of the advertiser.

Then the mobile device may be configured to report the information describing whether or not the user responded to the content by going to the geographic location indicated back to the advertiser associated with corresponding element of the content result set. The system may also report the duration or period of time the geographic location of the mobile device corresponded to the geographic location corresponding to the element of the content result set, or a business location of the advertiser. This allows advertisers to see the different periods of time people spend at their business locations.

Monitoring performed by the device, the system, or both provide the location, the speed, and the heading of the mobile device periodically, or combination thereof, and then recording information indicating that the mobile device visited the location associated with an element of the content result set if the location of the mobile device is within an area accounting for maximum system error. The system and methods are cognizant of error in location information to assist with avoiding any problems where the system fails to account for a store visit because the location information including the error in the position falls outside the indicated geographic area of the business location associated with the element of the content result set.

The above and other objects may be achieved using methods and systems involving targeting content for a user associated with a mobile device. In one alternative, a data set is obtained that contains information pertaining to a mobile device including geographic information associated with the mobile device. Then, the data set is processed to determine at least one likely area of travel, specific destination, or specific destinations. The area of travel is an area that may be represented by a rectangle or another polygon on a map or, alternatively, the area may simply be a proposed route. Alternatively, one or more destinations may be determined and the current geographic location information along with a proposed destination is routed to a routing program to obtain a path of travel. Next, a content result set is obtained that contains one or more elements selected based upon at least the likely course or area of travel, specific destination, or specific destinations so that information pertaining to businesses along the course of travel is available to the user. Any number of these results are displayed on the mobile device at appropriate times (e.g., when the user is approaching a business location along a path, when a user is walking around a shopping area, when the user is driving along a highway, when the user performs a search for content or a business, when a user requests route guidance, not when the user is in a movie theater, not when the user is eating dinner, not when the user is at work, etc.).

After displaying a result, the mobile device or a remote system monitors position information to determine if there is an action or an omission and the action or the omission is associated with the element of the content result set displayed to the user, recorded, and then reported so that the advertiser associated with the element of the content result set may observe the data.

The data set includes a location, a speed, and a heading but may alternatively or additionally include a planned or tentative course, or a planned or tentative destination.

The content result set is associated with an advertiser, a geographic location, and content; however, the content may additionally include audio, voice, music, image, graphical, text, hyperlink, video, application, or data information.

The action or the omission may include any of the following. The user is able to save the element for future display, or the user may decide to dismiss the element intentionally or ignore the displayed element until it goes away. Alternatively, the user may add the geographic location indicated by the element as a destination. Even if the user does not add the geographic location as a destination the act of actually visiting a geographic location associated with the element may be considered an act. Furthermore, the system may be integrated with payment systems so that purchasing a product using the payment system is tracked so that conversion tracking is implemented for digital ads and actual visitors to a physical store location.

The above and other objects may be achieved using methods and systems involving collecting and processing location data from many mobile devices. This involves obtaining many data sets each including geographic information associated with one of the many mobile devices. This data is received by a part of the system and then the information including the plurality of data sets is processed in order to determine Customer Relationship Management (CRM) data for a set business locations. This information may include, for purposes of illustration and without limitation, the number of visitors a particular business location received in a given period of time. The number of visitors all business locations associated with a particular advertiser received for a given period of time. The number of ad views, the number of visits prompted by ad views, and the number of sales prompted by ad views. The information may also include, for purposes of illustration and without limitation, the average amount of time a visitor spends in the store, the average amount of money a customer spends in the store, or any other metric commonly used or uniquely desired by an advertiser or content producer.

The location is a specific business locations defined by a coordinate or a perimeter; however, the location may also be a group of businesses defined by a list of different geographic locations.

The processing that occurs may be unbounded in time, only limited by the amount of information available in the system but it may also be limited to data collected over a specified period of time.

The business or store locations are a set of branded business locations defined by a set of coordinates, or a set of perimeters; however, the business or store locations do not need to be branded and may also correspond to personal landmarks or other locations without commercial significance. Additionally, multiple locations may be a grouping of locations defined by a plurality of coordinates, each of the plurality defining a polygon, or a plurality of perimeters.

The Customer Relationship Management data includes total visitors for the set of business locations but it may also include new visitors for the set of business locations, total visitors for the set of business locations, or return visitors for the set of business locations.

Furthermore, the methods and systems account the error associated with the process of locating the mobile device is accounted for when necessary or desired.

The above and other objects may be achieved using methods and systems involving tracking a mobile device to determine if the user of the mobile device visits a business location. This involves loading at least one data point corresponding to the business location into the mobile device along with a radius, and recording or reporting instances when the location of the mobile device corresponds to an area indicted by the data point and radius corresponding to the business location. Alternatively, multiple data points defining the perimeter of the business location may be loaded into the mobile device, and the mobile device may record or report instances when its location is within the area defined by the data points.

Furthermore, a data point may be loaded into a mobile device that is located along a path to the business location. When the mobile device is within a proximity to the data point, or within an area defined by multiple data points, a notification is triggered. The notification message may direct the user to a business along the path.

The above and other objects may be achieved using methods and systems involving indicating an approximate perimeter of a business location and requesting that a system send a notification to a potential customer when it is determined that the potential customer is travelling along a route where at least a portion of the route is in proximity to the business location.

Aspects and applications of the invention presented here are further described in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he may be his own lexicographer if desired. The inventor expressly elects, as his own lexicographer, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning of the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the provisions of 35 U.S.C. § 112, ¶6. The use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112, ¶6. Moreover, even if the provisions of 35 U.S.C. § 112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 2D depicts a user interface on a mobile device some forms of the invention use in order to clarify which businesses were visited by the user of the mobile device.

FIG. 12A depicts an exemplary form of the invention showing a number of business at which a user's friends are currently located.

FIG. 12B depicts an exemplary form of the invention showing a number of business at which a user's friends are currently located along with the name or nicknames of the individuals located at each business location.

FIG. 16A depicts an exemplary web based user interface that advertisers may use to create content.

FIG. 16B depicts an exemplary web based user interface that advertisers may use to view data associated with their content.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. It should be noted that there are many different and alternative configurations, devices and technologies to which the disclosed inventions may be applied. The full scope of the inventions is not limited to any examples or embodiments that are described below nor should any examples or embodiments be construed in any way as limiting the applications of the invention or the intention of the inventor in having the invention applied to any devices or systems whether presently existent or not.

Figure 1:
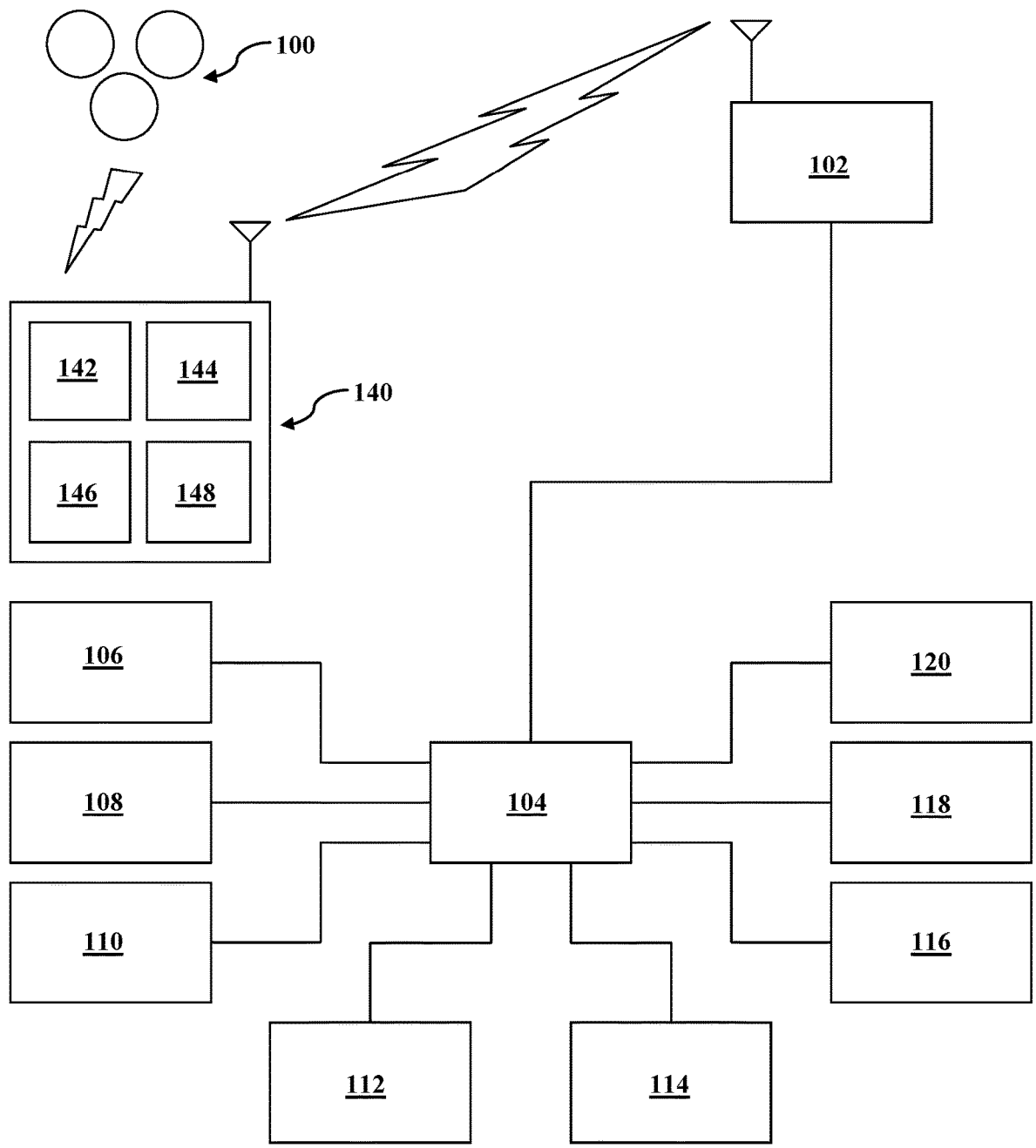
FIG. 1 depicts a general system overview of one form of the invention that relies on GPS satellites in order to determine the location of the handset and that has a number of features available based upon the location data.

With reference to FIG. 1 GPS satellites 100 operate to determine the location of a mobile device 140 that has a number of features available based upon the location data. The mobile device 140 provides a user interface 142, GPS receiver 144, CPU and memory 146, and radio 148. Examples of mobile device 140 include cellular phones, personal digital assistants, pagers, laptop computers, automobile navigation systems, among others. Mobile device 140 receives GPS signals and determines its location. For purposes of illustration and without limitation, this may occur solely through using the GPS system, or may occur by using a filter to combine location data from the GPS system and another system such as cell-tower-triangulation in order to obtain a more accurate location. The mobile device 140 is wirelessly coupled to an access point 102 with a built in radio 148. The access point 102 is coupled to the Internet 104 or other network. A number of other systems or services are available to the device over the Internet 104 or other network optionally including but not limited to an inventory system 106, advertisement system 108, search engine 110, mapping, business location, GIS, and routing database 112, user information database 114, advertiser information database 116, payment system 118, and phone system 120.

In some forms of the invention, a remote server periodically receives and stores location information associated with a mobile device, such as a mobile phone. The information is sent from the mobile device; however, it may also be pulled from the mobile device, or obtained from another service that is able to determine the location of the mobile device (e.g., Location Based Services (LBS), Assisted GPS (A-GPS), eGPS, GSM Localization, Multilaterilzation, Radiolocation, Trilateration, Faux-GPS, etc.). The information includes not only geographic location data, but also the speed and the heading of the mobile device. If the speed and heading data is not collected or sent, then this information is determined by comparing subsequent data sets containing the mobile device's geographic information. The data sets are stored in a database and associated with the particular mobile device or a particular user.

Many businesses provide their own Wi-Fi access points that consumers are allowed to utilize. These access points may also be used to help ascertain the location of a user. The mobile device is able to report back to remote servers that comprise the system and the remote servers, by analyzing the IP address information, are able to determine the business the user is currently located at. Alternatively, the system can use ambient Wi-Fi information in order to determine its location. For purposes of illustration and without limitation, Skyhook Wireless's® WPS system may be used. This information may be analyzed independent of or in conjunction with other forms of location information.

The location information is obtained in real time from the device. For purposes of illustration and without limitation, the device may stream location information to the server, or send location information periodically such as every few seconds, or every few minutes. In alternative forms of the invention, the mobile device may record location information periodically to internal memory and periodically send the information to a remote server. In some forms of the invention, the user is able to select between streaming location information to the server and periodically sending recorded information. This selection may be made depending on current wireless signal conditions. For purposes of illustration and without limitation, if the mobile device is on a high speed data network such as EV-DO, HSDPA, Wi-MAX, Technologies operating in the 700 MHz Spectrum, or Wi-Fi, the device may elect to stream location information and possibly send a relatively large data packet of previously recorded location information. If the device is on a slower speed data network, then the location information may be sent less periodically and more detailed records kept in internal memory on the phone that are sent to a remote server when a higher speed data connection is available.

In some forms of the invention, location information describing the perimeters of business locations are sent to the mobile device and the mobile device communicates with the server if the location of the mobile device is located within the perimeter of the business location. In other forms of the invention, the location information of the mobile device is sent to the system and compared with information describing the perimeters of business locations. Alternatively, the business locations may be defined by a point and radius, or mathematical formula. This is exemplary and is not intended to limit the scope of the invention. As shown and described, a person having ordinary skill in the art is able to implement the invention in any number of varying forms.

The software that provides these methods runs on any mobile device or it may also run on a general purpose computer. For purposes of illustration and without limitation, the software may run on Palm®, Blackberry®, Windows Mobile®, or Open Handset Alliance® Android devices or a personal computer running Windows®, OS X®, Linux, or any other operating system. The software that runs on the device may run in the background (e.g., as a service, daemon, etc.), it may run as a script on a webpage, or it may run as an application in the operating system on the device.

In order to protect the user's privacy, any of the real time and recorded location information reporting may be disabled or selectively enabled by the user of the mobile device. For purposes of illustration and without limitation, a user may elect to only have their mobile device send periodic requests to retrieve location based content without sending current location information. The mobile device collects location information over time and either sends the raw data at a later time; or, the data is processed into a list of traveled routes and visited locations. Thus, the mobile device does not necessarily send current location information. A user profile (or information to identify a user profile stored on a remote server) may also be transmitted to associate the location information with a particular user. Then, a data set is returned containing location based content tailored to the interests or current needs of the user.

In some forms of the invention, the mobile device receives information that describes the geographic locations of businesses. The mobile device may only report when the location of the mobile device corresponds to the geographic location of a business. For purposes of illustration and without limitation, the mobile device may contain information that describes the perimeters of many different business locations. When the location of the mobile device is determined to be within the location of one of the many businesses, then the device will record that it was located within one of the business locations and communicate that information to a remote server. This information may be anonomyzed or otherwise obfuscated as to decrease privacy concerns.

Alternatively, a user may disable all location reporting features as previously described. Location information and the areas in which the user typically travels may be gleaned from user searches for businesses within a specific geographic location, user requests driving directions, and other search habits of the user. Location information pertaining to the user may also be gleaned based upon transaction information obtained from payment processing companies, or by analyzing the phone numbers of various business locations dialed by the user.

Figure 2A:
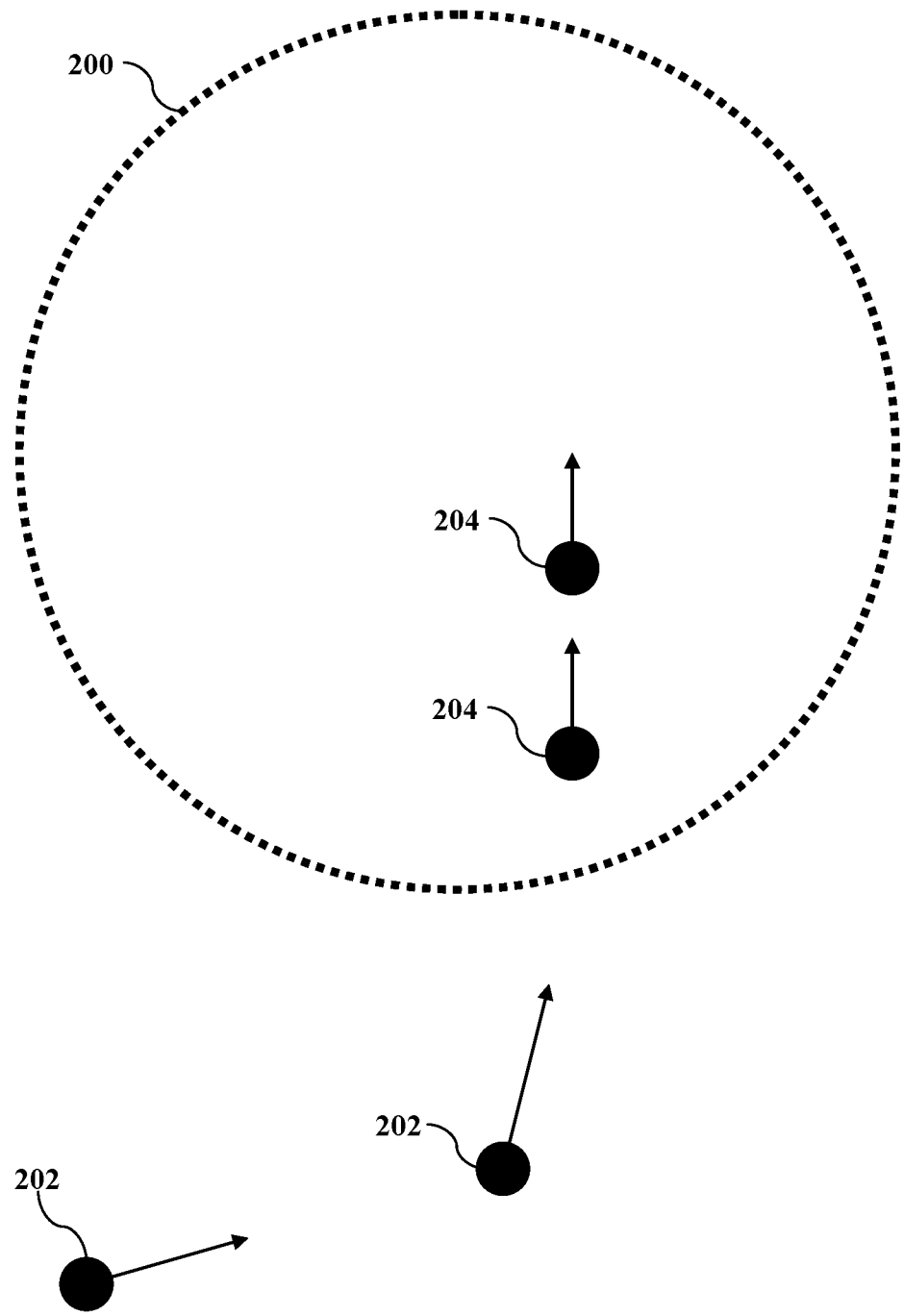
FIG. 2A depicts the method some forms of the invention use in order to determine if a user visited a particular location.
Figure 2B:
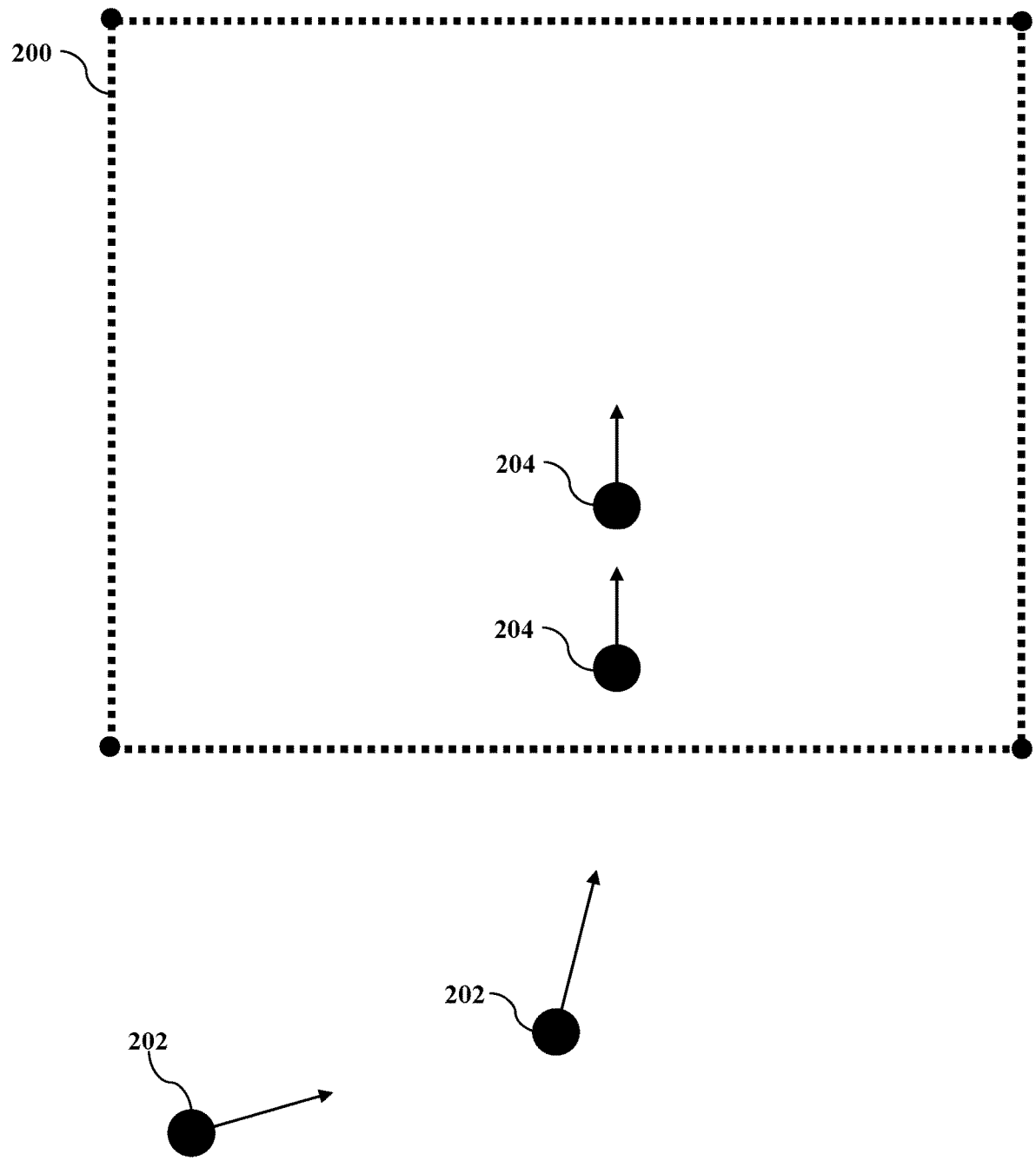
FIG. 2B depicts the method some forms of the invention use in order to determine if a user visited a particular location.

In one form of the invention, the location information stored is analyzed to determine the types of businesses that the user of the mobile device typically visits, or visited. The stored location information stored in is compared to a database of business information and locations in order to determine specific businesses, or types of businesses frequented by the user of the mobile device. The information may be stored and analyzed in any portion of the system. For purposes of illustration and without limitation, in various forms of the invention, the information may be stored in the mobile device and analyzed on the mobile device providing maximum privacy; the information may be stored on a server remote from the mobile device and analyzed on the server remote from the mobile device; the information may be stored on the mobile device and analyzed on the remote server; or the information may be stored on the remote server and analyzed on the mobile device. This may be done in one of several ways. With reference to FIG. 2A and FIG. 2B, when a mobile device location is within a predefined distance from either the address of a business, a geographic location associated with the business (such as latitude and longitude, or a latitude and longitude obtained from a geocoding algorithm), or a geometric perimeter of the business location 200, it may be determined that the user of the mobile device was at a particular business. Some location data corresponds to locations outside of the business location 202, and other data corresponds to locations inside of the business location 204. It may be determined that a user was at a particular business location when the data corresponds to locations inside of the business location 204. The altitude data may also be analyzed to determine which floor of a multi-story building the user of the mobile device 140 was located in. The altitude data may be obtained from a pressure sensor, GPS receiver 144, or any other location determining hardware. Alternatively, referring to FIG. 2D, the user of the mobile device may be presented with a menu 280 prompting for the business at which they are currently located or were located previously.

In alternative forms of the invention, information is sent to the mobile device describing the location and a radius, or a perimeter, of businesses in a certain geographic area. When the user is within the areas defined by the data sent to the mobile device, then the mobile device reports the location of the device to a remote portion of the system or records the location of the device to a local portion of the system. Alternatively, the mobile device only reports that it is located at the particular business. The mobile device may also report other information such as the time spent at the business location.

Figure 2C:
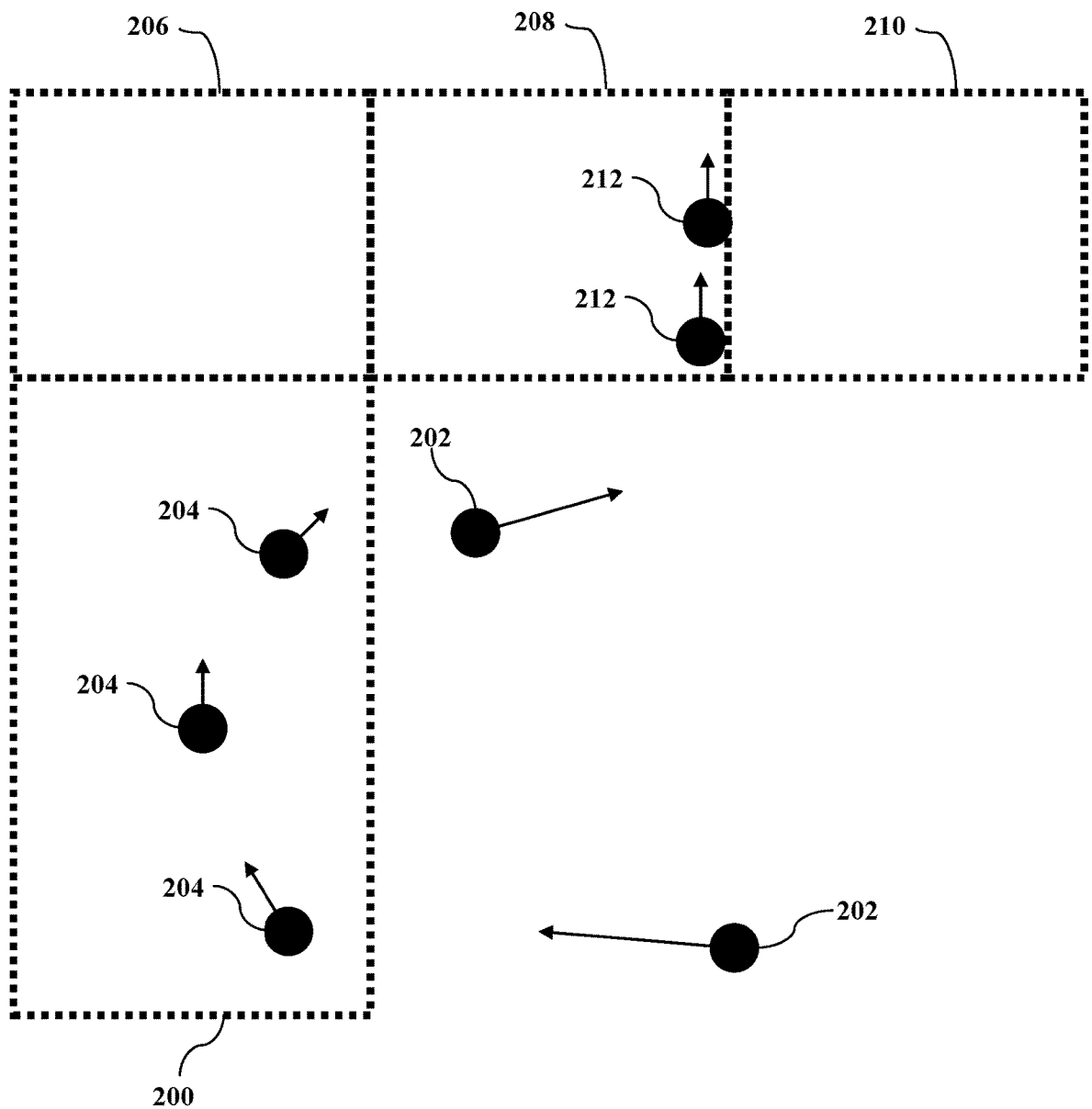
FIG. 2C depicts the method some forms of the invention use in order to determine if a user visited a select group of many locations.

If the system is not able to determine the specific business, such as in the case where many businesses are in close proximity, at least one of several actions may be taken depending on the form of the invention. With reference to FIG. 2C, a user generates location data corresponding to locations outside of the business locations 202; the user then enters the perimeter of business location 200. The user then generates location data corresponding to locations outside of the business locations 202, does not enter the perimeter of the second business location 206 and enters the perimeter of a third business location 208 but generates ambiguous location data 212 that is near the perimeters of the third business location 208 and the perimeter of the fourth business location 210. Determination of the business visited in conjunction with the ambiguous location data is attempted. With reference to FIG. 2D, the mobile device prompts the user to specify the business that was visited with a menu 280 allowing the user to assist with determining the businesses visited corresponding to ambiguous location data 212. The menu 280 may only show options for the businesses where there is uncertainty if the user visited the particular location; for purposes of illustration and without limitation, referring to FIG. 2C and FIG. 2D, the menu may only contain options for Business Locations 208 and 210. Furthermore, the menu 280 may contain any type of input field including checkboxes or radio buttons. The user may select all businesses that they visited or may only select one business. In some forms of the invention, a map is presented to the user and the user is asked to touch the business locations visited or otherwise indicate the business visited using a marker, pen, drag and drop icon, or any other indicator. Alternatively, location data may be analyzed over time and determine the most likely business visited based upon several data points. For purposes of illustration and without limitation, the ambiguous location data may be averaged (e.g., average of x-coordinates and average of y-coordinates, weighted average of x- and y-coordinates, average of radius and angle coordinates with reference to a point, etc.) 212, or it may be determined that the user entered the perimeter of the third business location 208 and did not enter the perimeter of the fourth business location 210 and therefore the ambiguous location data 212 does not correspond to locations within the perimeter of the fourth business location 210.

In some forms of the invention the website or payment systems of the store communicate with the mobile device. The website or payment system data is associated with the location data to determine the store and the store location that the user is visiting. For purposes of illustration and without limitation, if the mobile device is interfaced with Starbucks'® payment system or if the mobile device recently visited the Starbucks® website (or a computer operated by the user under an account associated with the mobile device) and subsequently it appears that the mobile device's location may correspond to Starbucks® or one of several stores adjacent to the particular Starbucks® location, it may be determined that the user is currently visiting the Starbucks® near their reported location. Alternatively, the system may provide increased weighting to Starbucks® when determining the location of the mobile device.

In preferred forms of the invention, speed data is incorporated into the analysis. It may be determined that a user of a mobile device was at a particular business location if, in addition to the reported location of the device, the speed of the mobile device was below a threshold level. For purposes of illustration and without limitation, if a user walks through a store quickly, or drives past a store, it is not erroneously assumed that the user visited the particular business location. Additionally, before assuming a user is visiting a certain business location, a time requirement may be incorporated into the analysis. Before a determination is made as to whether the device is, or was, present at a business location it may be determined how long the device was present at the business location. For purposes of illustration and without limitation, in some instances people quickly pass through a store to get to another area of a shopping center. The geographic location and optional speed requirements previously discussed are imposed. Furthermore, one or both of these conditions may be required to persist for a threshold period of time. This time may be the amount of time that a typical visitor spends at the particular business location. This helps insure that someone who walks by a business or through a business is able to be distinguished from someone that actually visits a business location. These methods and associated systems may be used to determine the specific businesses or types of businesses a user of a mobile device visits.

Figure 3:
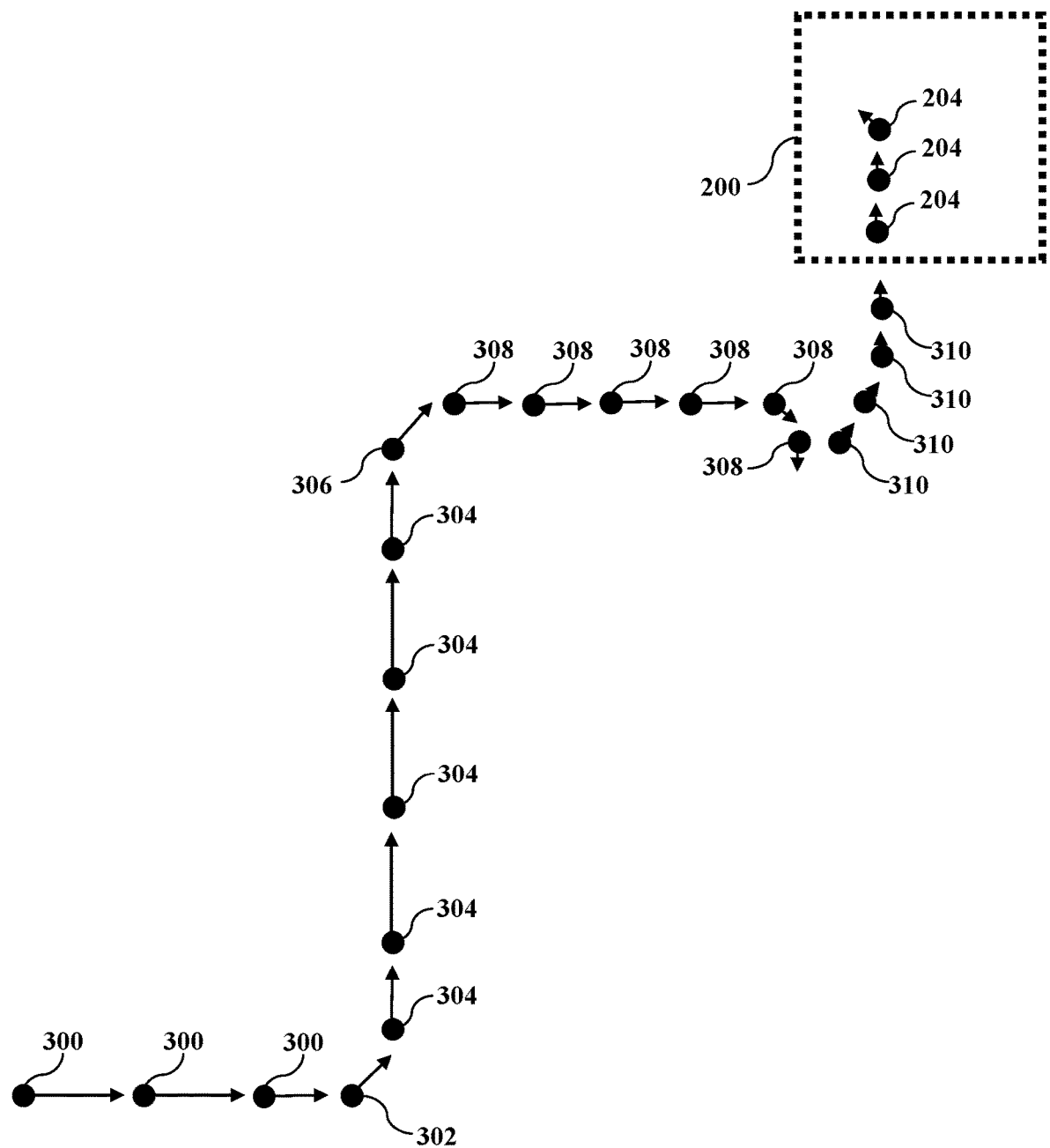
FIG. 3 provides exemplary user data collected when a user approached, parked, and visited a particular business location.

With reference to FIG. 3, location data points and the associated vectors (representing the relatively high velocity) allow determination of the points that correspond to the user traveling on a major road 300. Location data point and the associated velocity vector (at an angle) 302 indicate that the user is turning on to another major road. Location data points and the associated velocity vectors (representing the relatively high rate of speed) allow determination of the user is travelling on a major road 304. Location data point and the associated velocity vector (at an angle) 306 allows the determination that the user is turning into a shopping center. Location data points and the associated vectors (representing a slower velocity) allow the determination that the user is driving in a parking lot 308. Location data points and the associated vectors (representing a very slow velocity) may be used to determine that the user is walking to the store 310. A location data point 204 within the perimeter of the business location 200 may be used to determine that the user of the mobile device visited the particular business location. The time spent by the user at the particular business location may be determined by calculating the time difference in time between the first data point and the last data point within the perimeter of the business location 200. Alternatively, the device may record the time from when the device first senses it is within the perimeter of the business location 200 to when the device senses it has gone outside of the perimeter of the business location 200.

In some forms of the invention, the location information stored is analyzed to determine the routes along which, or the areas in which, the user of the mobile device typically travels. The stored location information stored is compared to a database of map information (e.g., MapQuest, Google Maps, NavTeq, Geographic Information Systems (GIS), etc.) in order to determine specific routes taken by the user of the mobile device. Driving direction queries that the user of the mobile device has submitted may also be analyzed to determine rotes or areas that the user of the mobile device typically travels. This is useful in many applications including but not limited to predictive navigation. The current, or most recent, data set is compared to at least one previously received data set. The system is able to determine the routes taken by the user when the user previously produced a similar data set. The system is then able to determine the anticipated route 402 that the user is taking, the apparent destination, or a list of apparent destinations so that the user does not have to key in their destination each time they use the navigation system.

Figure 4:
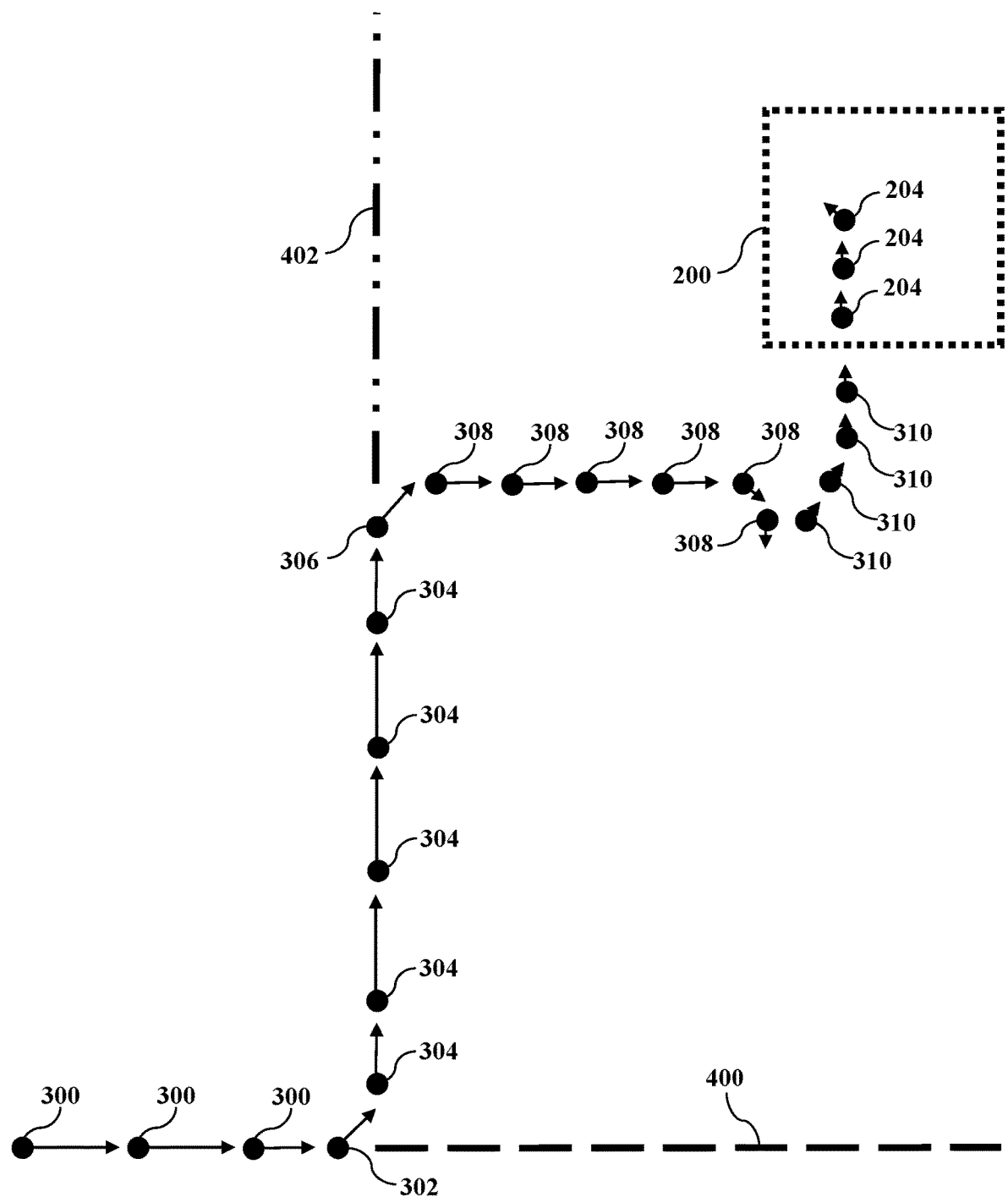
FIG. 4 provides exemplary user data collected when a user approached, parked, and visited a particular business location and further shows additional data that is determined based upon previous data collected from the user.

With reference to FIG. 4, targeted content associated with a particular business location 200 may be displayed based upon the determination of previous courses 400 and the current likely course of travel or anticipated route 402; however, this display of targeted content is not necessary for purposes of this example. Location data points and the associated vectors (representing the relatively high velocity) may be used to determine that the user is traveling on a major road 300. Based on the determination that the user of the mobile device is traveling on the major road and analyzing historical location data associated with the user, it may be determined that the user is going to turn left at the next major road and take anticipated route 402. Based upon this determination, targeted content may be sent for one or more businesses along the anticipated route 402 to the user of the mobile device. Location data point and the associated velocity vector (at an angle) 302 allows the determination that the user is turning on to another major road. At this point, the anticipated route 402 is reevaluated to determine if it has changed. Location data points and the associated velocity vectors (representing the relatively high rate of speed) allow the system to determine the points correspond to the user traveling on a major road 304. At some point, targeted content for the business location 200 is displayed on the mobile device. The user of the mobile device may not see the content because the user is not looking at the device, the user may see the content and ignore it, the user may see the content and perform an action on the content through the user interface, the user may see the content, and not perform any action on the content through the user interface but then proceed to the location indicated by the content. Location data point and the associated velocity vector (at an angle) 306 may be used to determine that the user is turning into a shopping center. Location data points and the associated vectors (representing a slower velocity) may be used to determine that the user is driving in a parking lot 308. Location data points and the associated vectors (representing a very slow velocity) may be used to determine that the user is walking 310 to the store. Location data points 204 within the perimeter of the business location 200 may be used to determine that the user of the mobile device visited the particular business location after the targeted content was displayed on the user's mobile device. The time spent by the user at the particular business location may be determined by calculating the time difference in time between the first data point and the last data point within the perimeter of the business location 200. Furthermore, with an integrated payment system, the amounts of any transactions completed by the user of the mobile device are known. If targeted content was displayed to the user, then this information is associated with the targeted content so that the business owner is able to determine the effectiveness of their targeted content.

Figure 5:
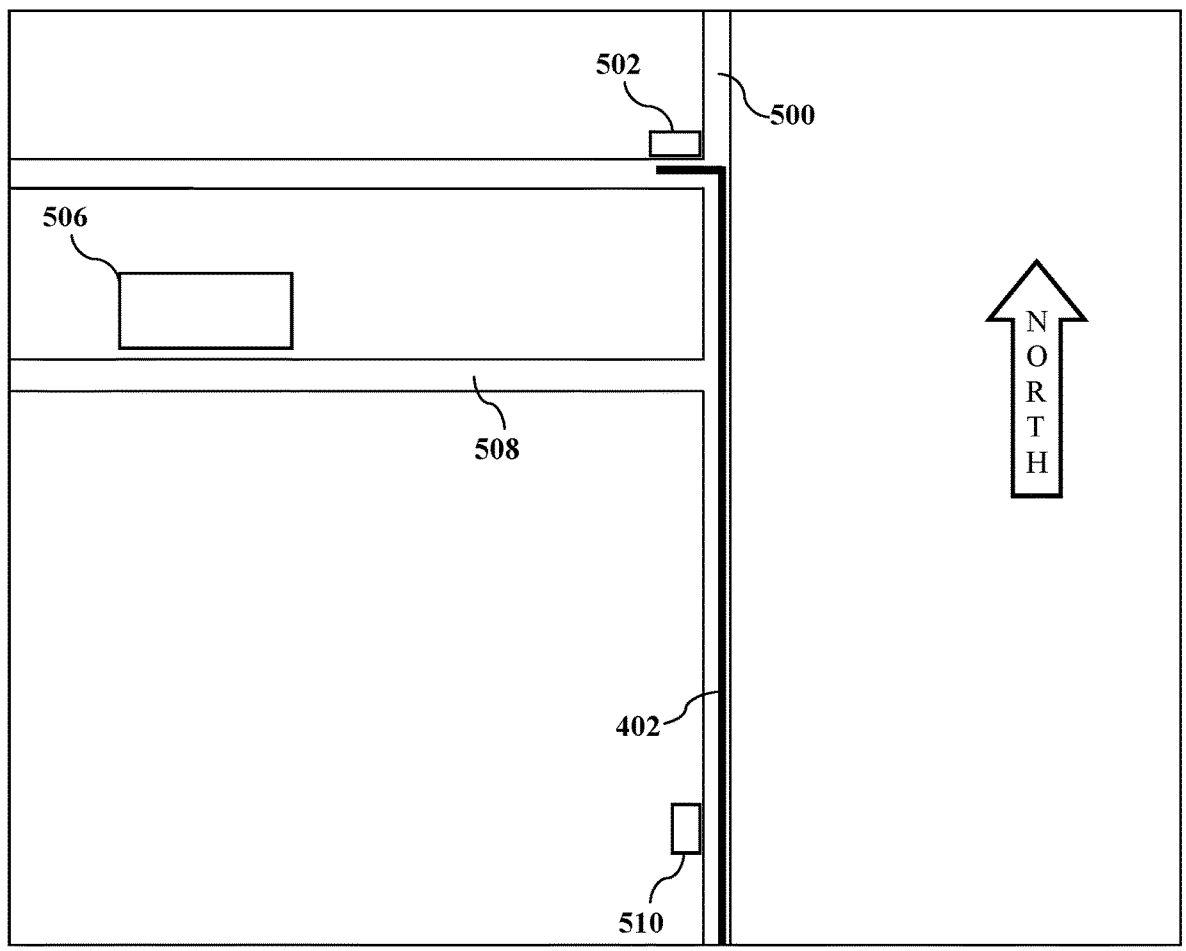
FIG. 5 provides an example scenario of methods and systems some forms of the invention use in anticipating the route of a user of a mobile device.

The anticipated route 402 may be determined based on several factors including but not limited to: the month or season, the day of the week, or the time of the day. For purposes of illustration and without limitation, referring to FIG. 5, if a user is driving North down Hayden Road 500 in Scottsdale, Ariz., and it may be determined that the user of the device typically goes to the Safeway® 502 on Chaparral Road 504 or Scottsdale Fashion Square 506 on Camelback Road 508 when driving north on Hayden Road 500, then the user is prompted to select between at least Safeway® 502 on Chaparral Road 504 or Scottsdale Fashion Square 506 on Camelback Road 508. Alternatively, the most likely destination may be automatically selected based upon the habits of the user. For purposes of illustration and without limitation, if it is Saturday and the user typically goes to Safeway® 502 on Saturday and not Fashion Square 506, Safeway® 502 is automatically selected as the destination. However, if the user always takes Camelback Road 508 from Hayden Road 500 to go to Fashion Square 506, then the anticipated route 402 and destination is updated in the event the user turns on to Camelback Road 508 from Hayden Road 500 even though the user typically goes to Safeway® 502 on Saturday. For purposes of further illustration and without limitation, Safeway® on Chaparral Road 504 contains a pharmacy, bakery, Starbucks®, and deli. These features of the grocery store may be taken into account when recommending or pushing advertisements to the user. If the user goes to a doctor's office an advertisement for the Safeway may be presented to the user. Alternatively, an advertisement for another pharmacy that is more convenient to the user may be presented to the user. If the user has never been to the more convenient pharmacy, then a coupon may be coupled to the advertisement to incentivize the user to go to that pharmacy instead of the one at the Safeway® the user typically visits. Other business locations may include movie theaters, restaurants, airports, subway stations, bus stations, optometrists, cobblers, tailors, or other services that may be taken into account when determining advertisements to send or the anticipated route of the user.

Figure 6:
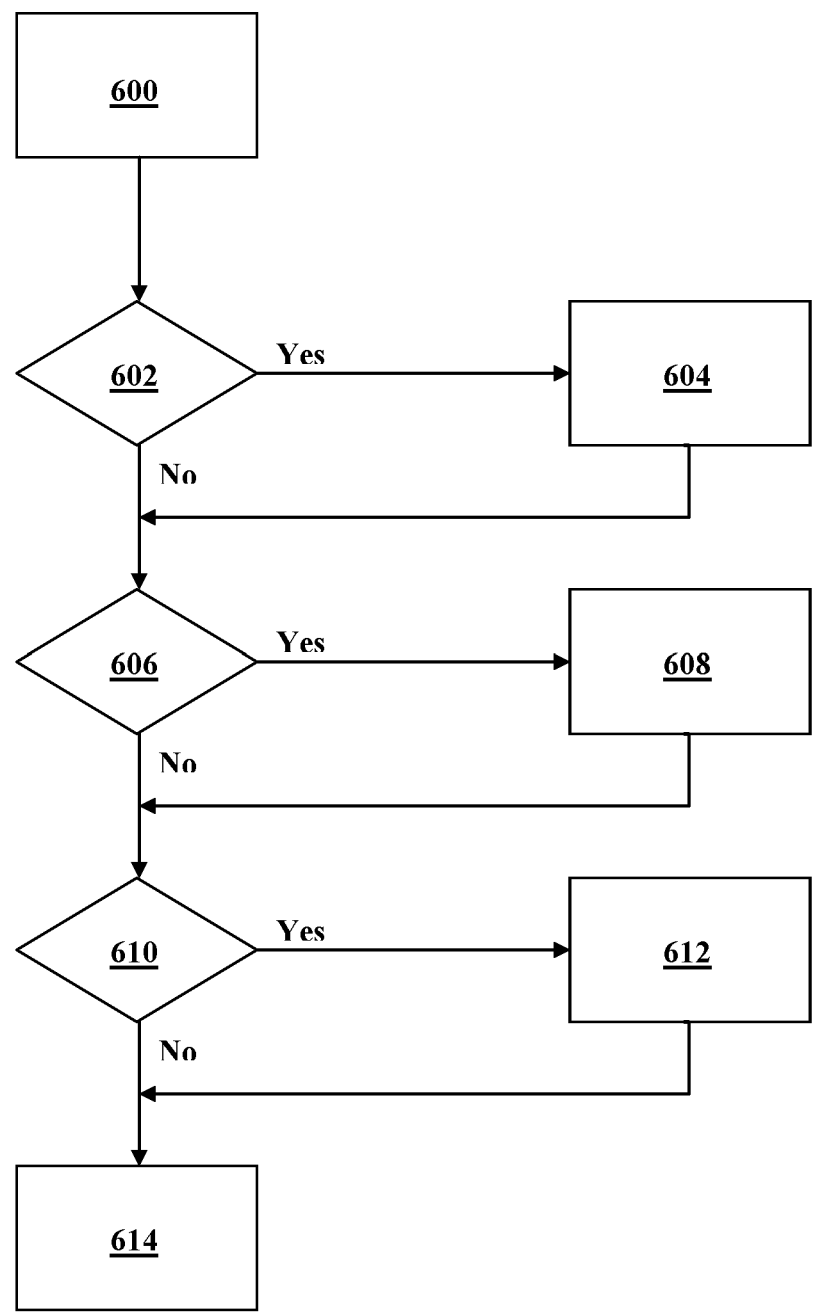
FIG. 6 depicts a flowchart of a method used by some forms of the invention to determine, or assist in determining, the route currently being taken by the user based upon historical location data.

The current location information is used in order to predict the current path by comparing the current location information associated with the mobile device to past location information associated with the mobile device. It may be determined the paths that the user has traveled on when their mobile device previously reported similar location data. The search of past location information may be further narrowed to produce more accurate predictions by filtering for routes taken on similar days (e.g., only Saturday, only every other week, monthly), at similar times (e.g., only around 5:00 PM, between 3:00 PM and 6:00 PM, after sunset, before high-noon, before a particular stock market opens in the time zone of the user, etc.), or any combination. For purposes of illustration and without limitation, referring to FIG. 6, a new location is reported at action 600, the historical location data associated with the device is searched to recall routes previously taken when the device produced similar data at a similar time of the day at action 602. the routes taken are stored in a weighted list at action 604. Next, the historical location data associated with the device is searched to recall routes previously taken when the device produced similar data at a similar day of the week at action 606. The routes taken are stored in a weighted list at action 608. The historical location data associated with the device is searched to recall routes previously taken when the device produced similar data at any time at action 610. The routes taken are stored in a weighted list at action 612. The weighted lists are then combined to produce a set of results. Based on these results, it may be determined the route the user is most likely taking at action 614. Alternatively, the user may be presented with a list of likely destinations at action 614.

In some forms of the invention, the anticipated route 402 or destination information is referenced against a database of targeted content that includes business locations and information in order to determine if there is any content of interest to the user of the mobile device along the anticipated route 402. If there is appropriate targeted content, this information is sent to the mobile device in order to inform the user of the mobile device of business and events of interest that are easily accessible from their current route. For purposes of illustration and without limitation, referring again to FIG. 5, if the user frequents office supply stores, an advertisement indicating that Office Max 510 on the West side of Hayden Road 500 may be sent to the mobile device to be displayed at an appropriate time. A user is more likely to respond to content that is easily accessible than if they have to go out of their way; therefore, targeted content on the right hand side of the road (in the United States) may be given preference to content on the left hand side of the road when targeted content is sent to the user, or when the content is displayed on the mobile device. For purposes of illustration and without limitation, targeted content for Office Max 510 may only be displayed when the user is driving South on Hayden Road 500, or may be displayed when the user is driving North on Hayden Road 500 as long as there is not a relevant advertisement associated with a business on the right hand side of the road. In alternative forms of the invention, these distinctions are not made.

In some forms of the invention, the system is able to determine the user's mode of transportation. The mode of transportation may be walking, jogging, biking, riding a motorcycle, driving a car, air travel, or any other mode of transportation. The mode of transportation impacts the ability of the user to access certain locations and the ability to obtain certain types of goods and services (e.g., a person on a motorcycle is not going to be able to stop at a store and buy large items). Thus, the mode of transportation of the user will determine the types of advertisements that are likely to be effective. The mode of transportation of the user may be determined based upon the speed of the user and may also take into account additional information based upon searches of the user, a user profile, or other information associated with the user. In forms of the system integrated with payment systems, the average purchase price of gasoline may be used to indicate of the user primarily drives a car or motorcycle. Whether the user is driving or walking may also be determined based on location data. For purposes of illustration and without limitation, if the system sees that the user is moving at about 2 mph on a roadway it may be assumed or otherwise determined that the user is driving; however, if the user is moving at about 2 mph in a downtown area or shopping center then it may be assumed or otherwise determined that the user is walking. Recently obtained location and speed data may also be analyzed in making this determination. For purposes of illustration and without limitation, if the user is moving at about 2 mph on a roadway but has previously been traveling at about 40 mph on the roadway, it is assumed or otherwise determined that the user is driving; however, if the user has consistently been moving at about 2 mph on the roadway, it is assumed or otherwise determined that the user is walking down the roadway. Information pertaining to the elevation of the user may also be used to determine the user's mode of transportation. If the elevation data suggests that the user is very high above the ground level, it may be determined that the user is in an aircraft and unable to respond to advertisements, or that an advertisements associated with businesses at the destination airport should be displayed. The destination airport may be gleaned from public flight information by matching up the current location of the user with the current location of airlines, or the typical flight paths of airlines. Alternatively, the user's ticket purchase may be known or accessible by the system and thus enable the determination of the destination airport. They elevation and location data may also suggest that the user is on a specific floor of a shopping mall, or driving on an elevated controlled access roadway. For purposes of illustration and without limitation, the system is able to determine whether a user is walking around a shopping area based upon the speed of the user. In some forms of the invention, the behavior of the targeted content displayed to the user is adjusted based upon the determination of whether the user is walking or driving. If the user is walking, the location of the targeted advertisements relative to the side of the path the user is travelling on is either given less weight, more weight, or no weight at all. Furthermore, the type of targeted content that is sent to the user may be adjusted so that it contains more information or the frequency new advertisements are sent and the duration of display of targeted content. The frequency of data collection or reporting from the device may be increased as well because a user walking around a shopping mall is able to change paths frequently and with ease. If it is determined that the user is on a controlled access road, movie theater, restaurant, or other areas where the user is unlikely to respond to targeted content, then the frequency of data collection may be reduced.

Content is sent to a mobile device based upon at least either current location information, historical location information, or anticipated location information. The likely or anticipated route that the user of the mobile device is currently taking may be based upon their current location information and the historical location information. Based upon this information, targeted content is sent to the user. The targeted content is any type of information including but not limited to advertisements, traffic information, danger warnings, or any other type of information that pertains to a geographic location. For purposes of illustration and without limitation, it may be determined a user is travelling into the downtown area of a city along a specific route, advertisements associated with establishments of interest along the route, traffic information about construction and accidents along the route, and information about fires, hostage situations, or other dangers, are sent to the mobile device. For purposes of further illustration and without limitation, the location of a mobile device is reported to be on Dorsey and 8th Street in Tempe, Ariz. heading north at 35 mph on Saturday around 3:40 PM. This information is compared with historical location information associated with the user and the system determines that the anticipated route is: (1) north on Dorsey to University; (2) east on University to McClintock; (3) north on McClintock until it turns into Hayden; (4) north on Hayden until Chaparral; (5) east on Chaparral for one-tenth of one mile; and (6) destination is Safeway Grocery store. Alternate anticipated routes or alternate possible routes may be determined. It may be determined that the particular user had previously taken the route: (1) north on Dorsey to University; (2) east on University to the AZ-101 freeway access road; (3) north on the access road and enter AZ-101 at Rio Salado; (4) exit AZ-101 at Chaparral; (5) east on Chaparral until one-tenth of one mile past McClintock; and (6) destination is Safeway Grocery store. On one particular day, there may be construction on McClintock due to a broken water line under the road and therefore heavy traffic; the AZ-101 is under construction and the Rio Salado entrance is closed. Notifications of these traffic events may be sent to the user once it is determined that they are likely to proceed into these areas. Alternate routes may also be suggested that are free of problems. One alternate route may be calculated down Scottsdale Road; however, there are traffic issues on Scottsdale Road due to a fire at a business along the road. The user may then obtain a notification of a suggested route from Tempe into Mesa and down Alma School Road through the Indian Reservation to Indian School Road, then west to McClintock where the user can get back onto their preferred route to their destination while avoiding all of the traffic congestion.

The targeted content may be sent to the mobile device by way of any protocol whether currently existing or yet to be created via any wireless communication method. The targeted content or notifications may be sent over any communication system or protocol including but not limited to TCP or UDP protocols, WAP push, Short Messaging Service (SMS), Multimedia Messaging Services (MMS), email, Instant Message (IM) protocols (e.g., AIM, MSN, Jabber, Google Talk, etc.), Extensible Messaging and Presence Protocol (XMPP), Extensible Markup Language (XML), Real Simple Syndication (RSS), or Web 2.0 technologies such as AJAX.

In some forms of the invention, guidance information is determined and provided to the user based upon the likely destinations of the user of the mobile device. Route guidance information is provided for the most likely destination based upon the location information associated with the user of the mobile device, or associated with the mobile device. Alternatively, the user may be provided with a list of likely destinations that the user is able to select from to receive driving directions from their current location. Furthermore, the guidance information provided may be based upon current traffic conditions, user preferences, or other road hazards and dangers along the possible routes that may be provided.

In the forms of the invention where the mobile device is also a navigation system, it may be determined a likely route based upon a tentative route that is input into the mobile device. Often users of navigation systems prefer routes that differ from the routes proposed by the navigation system. This may be out of personal preference, known speed trap locations, or current traffic conditions. The user simply ignores the route proposed by the navigation system and continues driving while the navigation system recalculates the route. Furthermore, the preferred route of a user may change depending on the time of the day. A proposed route is obtained from the navigation system and returns a likely route based upon past data sets and other preferences of the user. For purposes of illustration and without limitation, a user requests directions from downtown Tempe, Ariz., to downtown Scottsdale, Ariz. A typical navigation system calculates a route down Rural Road until it turns into Scottsdale Road. The user of the mobile device rarely goes down Rural Road to Scottsdale Road due to numerous speed traps along that route. The system of the present invention determines that the user prefers to avoid the stretch of road from downtown Tempe to Scottsdale Road along Rural Road and provides an alternate route for that leg of the trip from downtown Tempe to downtown Scottsdale. In some forms of the invention, the user preferences for specific routes may be determined if the user modifies the route on their mobile device or on a computer using an account associated with their mobile device. For instance, if they request driving directions and then modify the route by clicking and dragging to move the path from one road to another road, this route is classified as a user preferred route.

The likely route or destination information may be compared to a database of targeted content that includes business locations and information in order to determine if there is any content of interest to the user of the mobile device along the anticipated route. If there is appropriate targeted content, this information is sent to the mobile device in order to inform the user of the mobile device of business and events of interest that are easily accessible from the route.

Figure 7A:
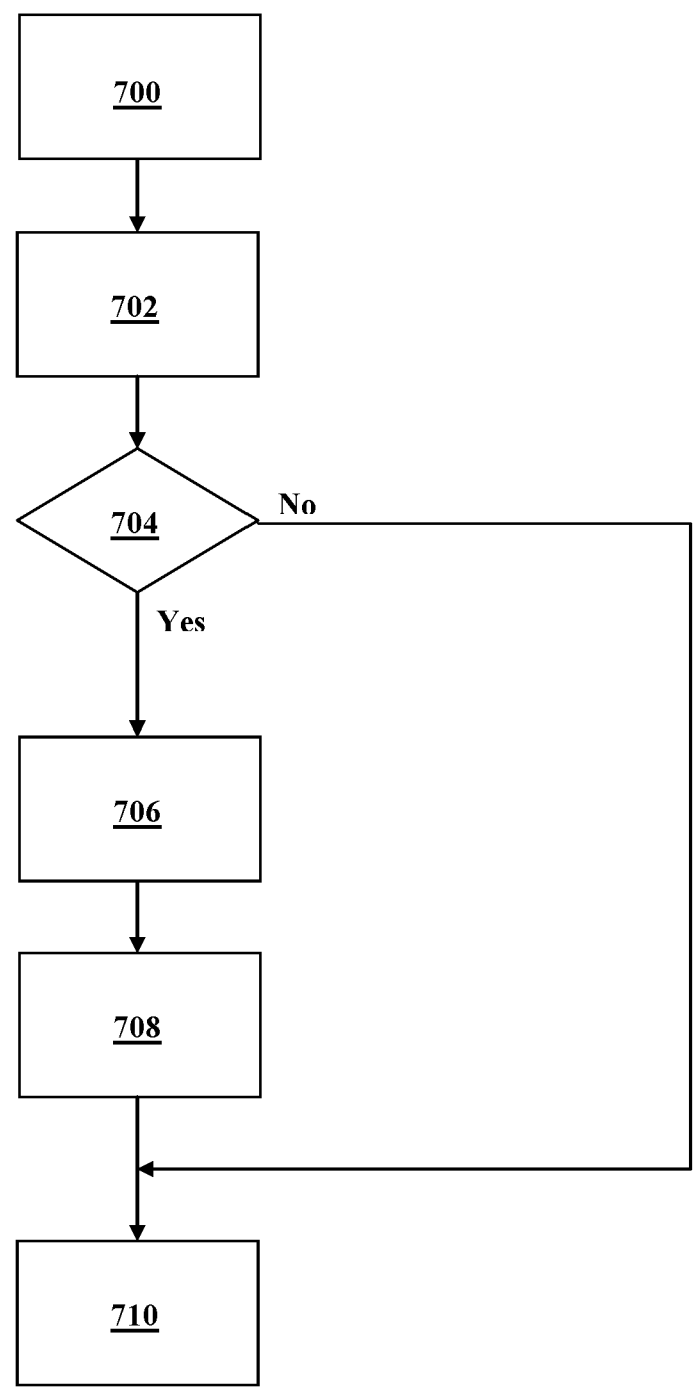
FIG. 7A depicts a flowchart of a method used in some forms of the invention that determines content delivery based upon an anticipated route.
Figure 7B:
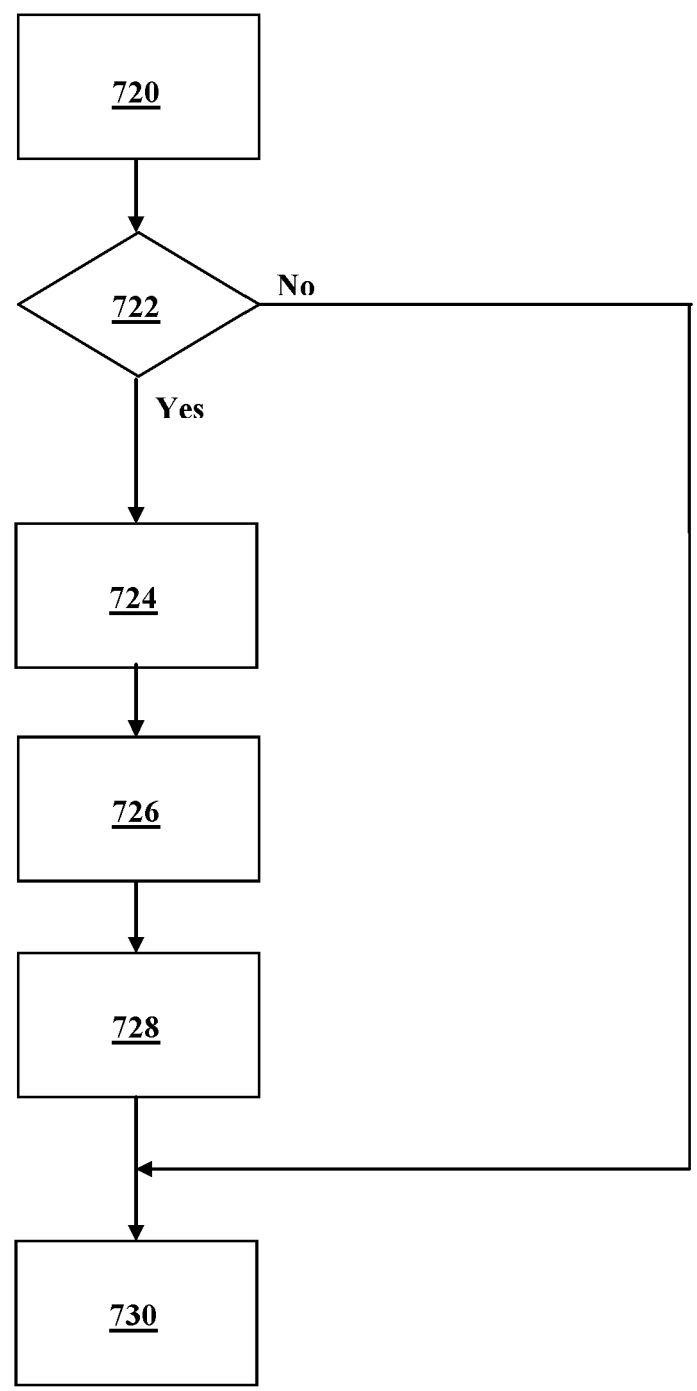
FIG. 7B depicts a flowchart of a method used in some forms of the invention that determines content delivery based upon an anticipated route.
Figure 8:
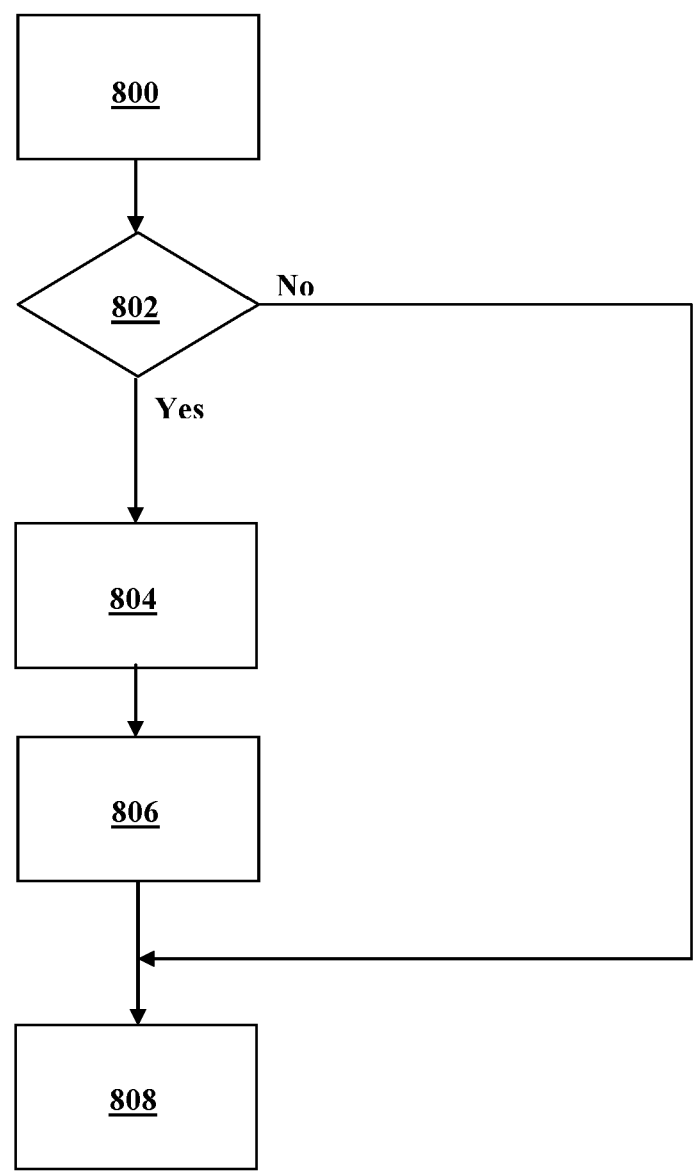
FIG. 8 depicts a flowchart of a method used in some forms of the invention that determines content delivery based upon a planned navigation route.

When an updated data set is obtained by the system, the system determines a targeted content set to be sent to the user. For purposes of illustration and without limitation, with reference to FIG. 7A, a process used in some forms of the invention that determines content delivery based upon an anticipated route is initiated at action 700 with location data. Then, the anticipated route is determined at action 702. Next, it is determined whether the anticipated route has changed since a previous iteration of the method at action 704. If the anticipated route has changed, then a new targeted content for the user based upon the new anticipated route is compiled at action 706. Next, the updated content is transmitted to the mobile device at action 708. Finally, the display is updated at action 710 to reflect the new targeted content stored in the device. If it is determined that the anticipated route has not changed at action 704, then the display is updated at action 710. For an additional example reference to FIG. 7B depicting a flowchart of another form of the invention that determines content delivery based upon an anticipated route. The process is initiated at action 720 with location data. It is determined whether the location data is significantly different than the previous location data at action 722. In determining whether the data is significantly different at action 722, whether there has been a large time gap between receipt of the current and previous data set, or whether location (and speed, and heading) data that indicates the user is no longer on the likely course of travel or anticipated route may be analyzed. If the data is determined to be significantly different, the apparent route is determined at action 724. Then, new targeted content for the user is compiled based upon the new anticipated route at action 726. Next, updated content is transmitted to the mobile device at action 728. Finally, the display is updated at action 730. If it is determined that the location data is not significantly different at action 704, then the display is updated at action 730. For yet another illustration without limitation, refer to FIG. 8 depicting a flowchart of one form of the invention that determines content delivery based upon a planned navigation route. A route is presented to the method at action 800. Then, it is determined if the route is different than the last route that was presented, or if the last route is outdated (e.g., was presented over a threshold period of time in the past) at action 802. If the route is different than the previously presented route or if the previously presented route is very old, then content of interest to the user is located along the presented route at action 804. The content is sent to the mobile device at action 806.

The data sent from the phone containing location information may be further analyzed to determine various aspects of the data set that is sent to the phone including but not limited to the behavior of the targeted content. Based upon the data set, it is determined whether the user of the mobile device is stationary or moving. Based upon the speed of the user, it may further be determined whether the user is in a car, walking, or stationary. The mobile device may behave differently or targeted content may be delivered to the user based upon their speed. If the user is moving slowly, many elements of targeted content associated with the nearby area are sent to the mobile device or retrieved from the memory of the mobile device. If the user is moving faster (For purposes of illustration and without limitation, if they are in a car, on a motorcycle, on a high speed train, etc.) then targeted content associated with businesses in a wider area are sent to the user or retrieved from the memory of the mobile device. This allows the mobile device to display the most relevant content to the user of the mobile device while allowing the content to be displayed a sufficient amount of time so that the user is able to see and react to the content before the content is replaced with more relevant information based upon updated location information available to the mobile device. Content is replaced when it is no longer convenient for the user to respond to or when it has been displayed for a given period of time without a user response. For purposes of illustration and without limitation, when a user is driving down a road and an advertisement is displayed to a user for a particular business location, once the user passes the entrance to the complex where the business is located the advertisement may be replaced on the screen of the mobile device. When the user is walking around a shopping center and an advertisement is displayed for a time sufficient for the user to see and respond to the advertisement (e.g., after the user responds to a text message and therefore is looking at their phone an advertisement notification is displayed for a nearby store for a period of 30 seconds and then the advertisement subsides or is replaced with another advertisement).

In some forms of the invention, a user's favorite businesses and attractions are determined. For purposes of illustration and without limitation, these locations may be determined by analyzing the location information to determine the frequency with which the user of the mobile device visits particular businesses or particular types of businesses; the amount of time spent at the business location; by reference to positive or negative or numerical ratings the user associates with particular businesses or business types (such ratings can be entered via a menu on a mobile device or through an application or webpage associated with the user's profile). The ratings are positive or negative such as thumbs up and thumb down but may also be numerical such as a rating one through five.

In some forms of the invention, advertisements and search results are returned based upon at least a likely course of travel. For purposes of illustration and without limitation, if it is determined that the user is on a specified path, then the top search results returned are relevant results along the current path. Other results that are returned are relevant results along other paths that the user is known to have previously taken. Furthermore, results associated with relevant locations that are slightly off of the known paths of the user are returned as top search results.

In determining the top search results or in configuring the information displayed on the screen, the hours of operation of the businesses may be considered. For purposes of illustration and without limitation, if the user is driving down a road at 10:00 PM and performs a search (either at a stop light or via a voice command while moving), the top results are relevant businesses along the path that are currently open as determined by known hours of operation that are posted on the internet or stored in a database. Therefore, businesses that close at 5:00 PM are not included in the top results, or if they are included in the top results they are near the bottom of the top results or otherwise weighted appropriately (e.g., to reflect that the business is not currently open). Furthermore, hours of operation are taken into consideration when sending targeted content to a mobile device so that a user is not directed to a business location before or after business hours.

In some instances, the user of a mobile device desires to see a map or listing of businesses of interest to them located around them. For purposes of illustration and without limitation, on a business trip, a user of a mobile device may not know where their favorite businesses, or similar businesses, are located in relation to their hotel. Furthermore, the system does not have a database of routes available to base targeted advertisements or other information off of for the user because the user has not interacted with businesses in the new location. The system is able to provide a user with a map view, or listing, of the user's favorite businesses in relation to any given location. For purposes of illustration and without limitation, if the system knows that the user of a particular mobile device enjoys coffee shops, particularly Starbucks®, fast food restaurants, particularly McDonalds®, and grocery stores, particularly Safeway®, and the user travels to Chicago and is not aware of where their favorite branded locations are with respect to their hotel, the user is able to see a map with a number of their favorite businesses, or similar establishments, overlaid simultaneously on the map. The user sees a map with Starbucks®, McDonalds®, and Dominick's® (similar to Safeway®) in relation to their current location or their hotel. Results of similar business establishments may be provided that are more convenient to access from the current location of the user. Furthermore, advertisements targeted to tourists or travelers as opposed to advertisements targeted to residents and commuters may be provided. For purposes of illustration and without limitation, an advertisement for a furniture store may not be displayed while the user is on a business trip even though the user frequently visits furniture stores in their home city.

The targeted content (or advertisements) are sent to the user of the mobile device and displayed on the screen of the mobile device. The targeted content is based on various factors, including at least some the following: the route that the user of the mobile device usually takes; the route that the user is currently taking (e.g., based upon driving directions or the anticipated route); the types of businesses along the route that the user takes; the types of businesses that the client appears to visit or is known to visit based upon GPS and payment system data; any business within a radius or perimeter of the user; the history of the advertisements or other targeted content that the user has responded to in the past; a list of keywords that the user is interested in; a user profile that details search trends or interests of the user; or a category or status message provided by the user of the device (e.g. "I am hungry," "I am tired," "What is everyone up to?," "I am going to get coffee," etc.).

In some forms of the invention, the targeted content appears on the mobile device differently in varying circumstances. In the case where the mobile device is stationary, or where the mobile device is stationary and there is no anticipated or explicitly defined route, ads or other targeted content may appear based upon the radius or based upon the current perimeter of the map view of on the mobile device. In the case where the mobile device is moving, targeted content appears based upon the location, speed, and heading of the device. The targeted content appears before the user reaches the location of interest along the path. The faster the mobile device is moving, the earlier the targeted content is displayed to allow the user of the mobile device sufficient time to decide whether or not to respond to the content. The content may appear based upon the side of the road on the business is on that the content relates to.

Figure 9:
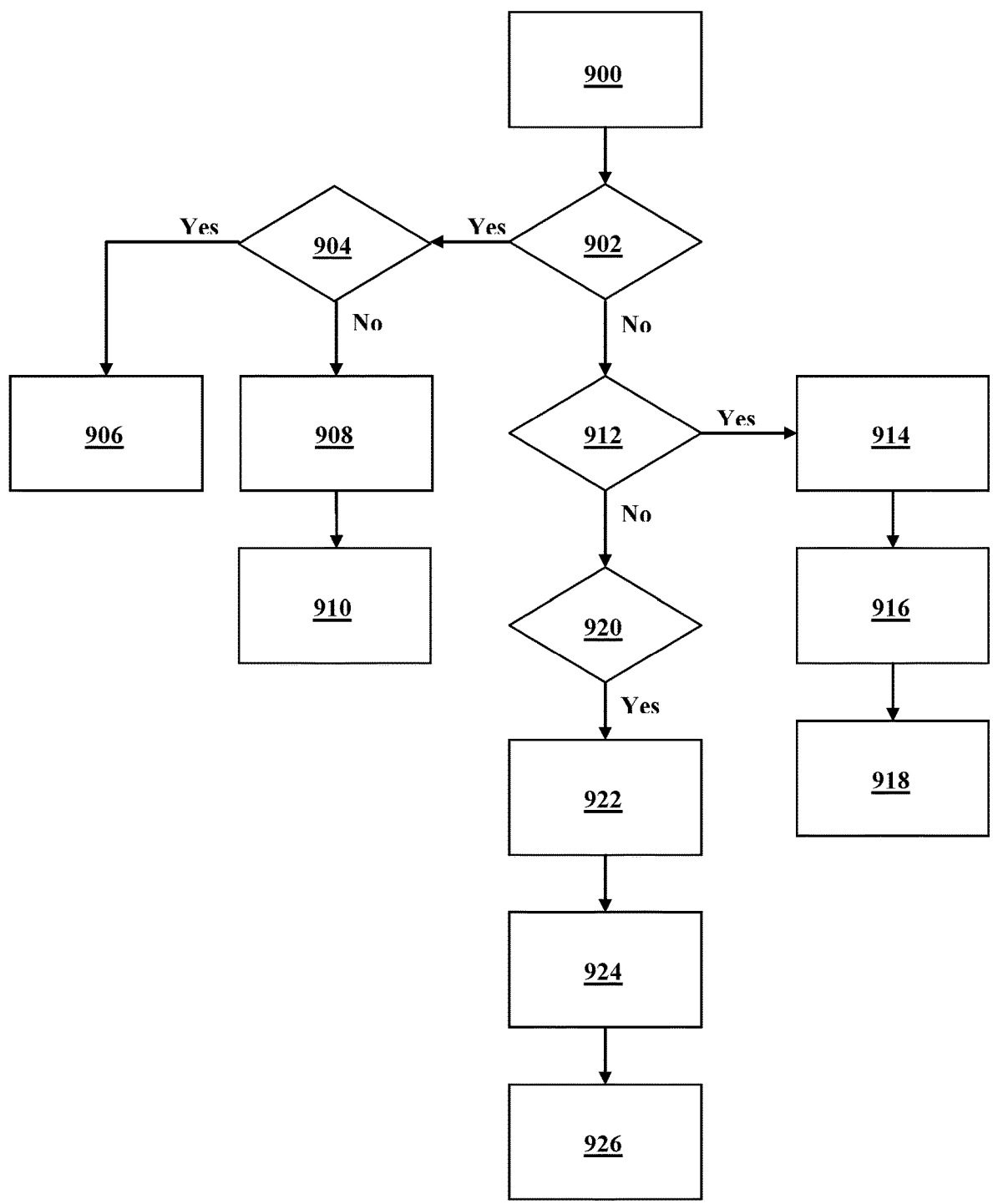
FIG. 9 depicts a flowchart of a method used in some forms of the invention that determines what action a user is currently taking and what type of information is to be sent to the user.

With reference to FIG. 9 it is determined what action a user is currently taking and what type of information is to be sent to the user. The method is initiated at action 900 with location, speed, and heading data from a mobile device. If the mobile device only provides location data, the speed and heading data may be calculated by taking the difference in position and time between subsequent location data points. It is then determined, based upon the speed, if the user is stationary at action 902. If the user is stationary, then it may be determined if the user is at a business location indicated by targeted content previously sent to the user's mobile device at action 904. If the user is at the location, then the duration of the visit is recorded at action 906. If the user is not at the business location, the user's location is recorded at action 908 and it the business the user is currently located at, if any, is determined at action 910. If the user is not stationary, it may be determined if the user is walking based upon speed data at action 912. If the user is walking, then targeted content is transmitted for business locations of interest to the user of the mobile device to the mobile device at action 914. Then, the content is displayed on the mobile device at action 916. The responses to the content and which content is ignored are recorded at action 918. If the user is not walking, then it may be determined if the user is driving at action 920. If the user is driving, then targeted content formatted for driving speeds (e.g., spaced apart so that a user has time to see and respond to displayed content) is generated and transmitted to the mobile device at action 922. Next, the content is displayed on the mobile device (with preference given to displaying content that is coming up on the right hand side of the road) at action 924. Finally, the responses to the content and which content is ignored are recorded at action 926.

In some forms of the invention, events may be triggered based upon the location of a device. When it may be determined that its location corresponds to a specific pre-defined location, a message, targeted content, or advertisement is presented. In some forms of this aspect of the invention, if the user responds to the message by clicking on it to find out more information, then more detailed tracking information (e.g., with increased data resolution) is kept in order to determine if the user of the device proceeds to the advertiser's business location and makes a purchase. For purposes of illustration and without limitation, a user creates a shopping list on a website through their personal computer, or on their mobile device and associate the shopping list with grocery stores in general, a specific brand of grocery store, or a specific grocery store. When the user of the mobile device is in proximity to a grocery store or when a grocery store is along the path the user is currently traveling on or the anticipated path of the user, a notification is displayed including the shopping list or a link to the shopping list. In forms of the invention interfaced with databases containing store inventories, the notification may only be displayed if the store has at least an item that is in the list. If the user responds to the notification or content then more detained information about the user's behavior (such as more frequent location data) may be communicated in order to provide the content producer more information so that they are able to use the information to improve subsequent customer experiences at the business location.

Figure 10:
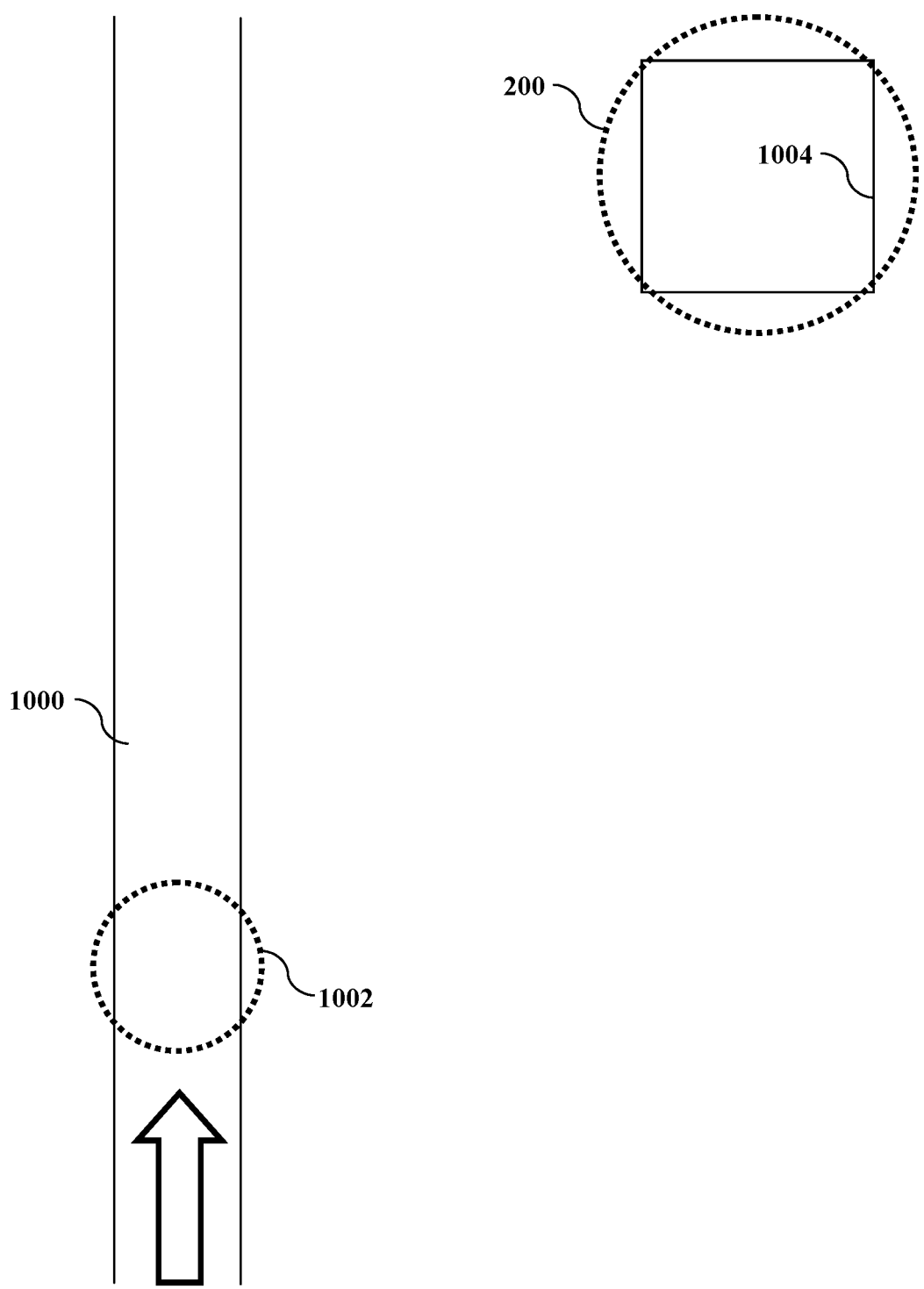
FIG. 10 provides an example scenario of methods and systems some forms of the invention use in delivering targeted notifications to a mobile device.

In some forms of the invention, for each targeted advertisement, a location is sent to the device that triggers the advertisement to be displayed to the user wherein the advertisement is for a business located along the path the user is traveling. For purposes of illustration and without limitation, information is sent to the mobile device containing points that correspond to locations where if the user is in proximity to the point, the mobile device takes an action, or manifests an intent to take an action. The action is displaying targeted content but it may also be responding with additional information, changing the behavior of the mobile device (e.g., location reporting frequency, content display settings, etc.), or any other action desired or combination of actions desired. One, two, or more locations may be sent to the user of the mobile device. For purposes of illustration and without limitation, referring to FIG. 10, two location data points and associated radiuses are sent to the mobile device. One point and radius 1002 corresponds to the location where the targeted content notification is triggered and a second point and radius 200 corresponds to the business location associated with the targeted content. For purposes of illustration and without limitation, the user is traveling north along a path 1000 and comes into proximity with a first location 1002 which triggers the device to display content that directs the user to a particular business location 1004. The user proceeds to the business location 1004 and when the user's location is within the second point and radius 200, the mobile device records that the user visited the business location or communicates that the user visited the business location.

In order to entice users to respond to targeted content, some forms of the invention provide coupons that are integrated with the targeted content. In some forms of this aspect of the invention, the value of the coupon is determined based on the amount of effort that a user has to exert to arrive at the business location. For purposes of illustration and without limitation, the value of a coupon associated with a business location on the left hand side of the road may be higher than the value of a coupon associated with a business location on the right hand side of the road. In the case where targeted content corresponds to a business slightly off the main path that the user is taking, a coupon with an increase value may be sent to the user.

Depending on the form of the invention, the coupons operate in one of several ways. In one form, the coupon is a text, image, or video. The user of the mobile device simply communicates (e.g., types into computer system, shows the coupon to an employee, etc.) the coupon to the business in order to redeem the coupon. For purposes of illustration and without limitation, a bar code (or other coded image) can be displayed on the screen of a cell phone, PDA, or other mobile device and the customer or employee of the store scans the bar code. Other examples would involve multiple image codes being scanned or animated image codes. In another form of the invention, the image coupon contains a barcode or other optical symbol or text code that is input into the computer system of a business in order to redeem the coupon. In another form of the invention, the coupon is redeemed wirelessly. For purposes of illustration and without limitation, technologies such as Bluetooth, technologies operating on the 700 MHz spectrum, or Wi-Fi may be used to transmit coupons between a remote server, the mobile device, a retailer, or any combination thereof. In one implementation, this is achieved by having the mobile device connect to the merchant's computer system where the coupon code is transmitted via the wireless connection. In another form of the invention, the coupon is redeemed via a RFID or similar chip that is present on the mobile device. The RFID number of the mobile device is associated with a list of coupons that were sent to the device and then when the RFID of the mobile device is scanned at a business location, the RFID number is matched with the coupons sent and the merchant ID number that scanned the phone to determine the value of the coupon. For purposes of illustration and without limitation, a list of RFID numbers associated with merchant ID numbers is maintained and coupon identification number or value for coupons that have been sent to the mobile phone with the particular RFID number. When the merchant ID scans the RFID chip and obtains the RFID number then the merchant submits a query with the RFID number and their merchant ID number and the coupon identification number or value is returned. This invention may also be used with any other wireless identification number such as the Media Access Control (MAC) address of a Bluetooth or Wi-Fi radio, or any unique identification number. In another form of the invention, a list of advertisements sent to the mobile device is maintained and it is observed whether the location of the mobile device subsequently corresponds to a business location of targeted content that was sent to the phone. A payment system (e.g., PayPal, Google Checkout, etc.) may further be notified and when the user makes a purchase while at the business location the coupon value is applied by the payment system. In another form of the invention, the system communicates with a payment system to apply the coupon value if the user makes a purchase at the business location within the period of time the coupon is valid. The above forms are exemplary and do not constitute an exhaustive list of all forms of this aspect of the invention.

When presented with a coupon, the client either accepts the coupon by clicking on a button or other methods (e.g., voice, optical gesture recognizer, touch, etc.) to accept or postpone the advertisement (e.g., "Ok," "Yes," "Accept," "Later," "Ignore," etc.), the user may simply ignore the advertisement (e.g., by not providing any input in response to the advertisement), or explicitly reject the advertisement by clicking a button or indicating through other methods.

Other illustrations of recipient interaction with coupons are when the initial offer contains the full content of the offer; when the act of clicking "Ok" on the targeted content displays the full offer; when the tracking frequency (e.g., the amount of data points collected) remains the same as before the targeted content was presented to the user; when the tracking frequency increases so that better data resolution is obtained when it is believed that the user is about to enter a business location. These various alternatives allow tracking of the customer to the business location and better enables calculation of how long the user visited the store. For purposes of illustration and without limitation, if the initial tracking frequency is one data point every minute, the tracking frequency after the targeted content is presented may change to one data point every fraction of a minute (e.g., 30 seconds, 20 seconds, 10 seconds, 5 seconds, 1 second, etc.). This allows a finer resolution in determining how long the visitor stayed within the store. In some forms of the invention, the system can be configured to ensure that there is a low speed when the device reports that it is at the business location to make sure the user is actually stopping there and not just passing through or that the data point was not recorded in error (e.g., when there is an erroneous data point that is within the business location the speed is, in some instances, reported as being incredibly fast due to the abrupt change in location).

In some forms of the invention, advertisers and targeted content producers can increase the effectiveness of the targeted content when the system records and provides the responses to each of the advertisements sent to the user whether the user explicitly accepted the content, explicitly rejected the content, did not respond to the content, or saved the content to be viewed later.

The user of the mobile device is not limited to receiving only the targeted content received unsolicited at the mobile device; the user of the mobile device may also initiate searches for terms of interest. Results are returned based upon at least the current likely course of travel. When a user initiates a search, relevant content associated with locations along the current likely route is returned. The results do not need to be limited to the current likely route; there may be a plurality of routes that are traveled by the user based upon the current position information. Results may be returned based upon all possible routes traveled by the user based upon their most current data set (e.g., their location, their speed, their heading, the path they are on, etc.). Additionally, a user is able to search all relevant content along all paths that they have traveled; results may be provided based upon this information. The results of any mobile search may be limited to, or preference may be given to, relevant content ahead on the likely courses of travel based upon the current data set. This returns the business locations that are most easily accessible to the user first. For purposes of illustration and without limitation, the user is driving north on AZ-51 in Phoenix, Ariz. The user realizes that he needs gas and initiates a search for a gas station. The closest gas station is less than a mile away from the user of the mobile device, but it is located behind the user relative to their direction of travel. The user would need to exit the freeway at Glendale Road, make a left and then make another left turn to backtrack to the gas station. Once the user is done filling up, the user would need to get back on the freeway to continue on the route. The present invention analyzes the location information of the user to determine the route and return a more convenient gas station along the route of the user. It may be determined that the user is driving north on AZ-51 and determines that the next gas station along the path the user is on is located several miles ahead on northbound AZ-51 and located at Shea Road and 32nd Street. This determination may be made based on previous route or location information requested by the user, or may be determined absent this information simply by analyzing location information and map information.

In some forms of the invention, the system is integrated with a search engine. In one implementation, when the user of a mobile device is using a mapping website or program such as Google Maps or Google Earth, at least some of the data collected from the phone (e.g., previous locations, businesses the user frequents, etc.) is overlaid on a map. When the user requests driving directions the mapping website or program displays targeted content along the route. When the user is viewing an area of the map without driving directions, the mapping website or software displays locations of interest in the current view of the map. When the mapping website or software is showing search results, and the user selects a specific business location, locations of other types of businesses of interest appear on the map around the location selected. For purposes of illustration and without limitation, if the user searches home improvement stores and selects a specific Home Depot®, then businesses of interest to the user appear around the Home Depot® location. If the user is known to like coffee, a Starbucks® location in proximity to the selected Home Depot® location displays on the map. Furthermore, and any number of other businesses the user is known to enjoy or it may be determined that the user is likely to enjoy may be simultaneously displayed. The search engine may obtain location contemporaneously with the search request. The location information may be submitted as part of a hidden form field and obtained through a script on the page or other program that interfaces with the location API on the mobile device. Alternatively, a program or other code may run on the mobile device associated with the user and periodically update location information the search engine associates with the user. Therefore, when a search is performed, the most recent location information may be used in determining weighting for the search results. In some forms of the invention, if a time associated with the most recent location information is not about the current time, then the system may notify the user the information is outdated, requests new location information, or otherwise perform the search with or without the benefit of the location information.

In some forms of the invention, the location information is interfaced with traditional web search results. When the user searches for specific terms that correspond to businesses that provide services along the routes the user typically travels on, or nearby routes the user typically travels on, the search engine provides these results to the user with increased weighting relative to results associated with businesses and websites with locations that are not on the paths the user typically travels.

In some forms of the invention, the system provides a user with the ability to perform a search of web pages associated with businesses in an area or along paths that the user has traveled on, or along the anticipated route. For purposes of illustration and without limitation, a user wants to get a chicken strip dinner at Rock-N-Roll Fingers in Tempe, Ariz. It is 8:00 PM when the user arrives at the restaurant but the restaurant closed at 7:30 PM. The user may search chicken strips. This searches the web pages of all businesses along paths associated with the user of the mobile device. A particular Sonic Drive in Restaurant in Tempe, Ariz., (down the street from Rock-N-Roll Fingers) is associated with the Sonic Drive In webpage. The Sonic Drive In webpage mentions a chicken strip dinner and the Sonic Drive In (and optionally a link to the website and information about the chicken strip dinner) is displayed as one of the results returned from the search chicken strips. In some forms of the invention integrated with inventory databases, restaurants may list their menu items in an inventory list so that they are searchable in a similar fashion.

Sometimes, people do not realize that businesses of interest are nearby. In another form of the invention, results returned while a user is using a search engine or a search on a mobile device may be flagged by the user so that next time the user is near a business related to the search result the user is notified. This feature may operate based on whether the user is heading in a path towards a place of business, or whether the user input a route into a navigation program on a mobile device that passes near a business location of the content originator. When appropriate, an alert or other content is presented thereby notifying or reminding the user of the nearby business of interest. For purposes of illustration and without limitation, a link is placed on a website under an advertisement or content that says "send to mobile device for later notification," "remind me," "notify me," or any similar text, image, or icon. The user clicks the link and the next time they pass by, or are anticipated to pass by, the associated business a reminder pops up on their mobile device. In some forms of the invention, the user may be able to pull up the notification on their mobile device without needing to pass by the business location. For purposes of illustration and without limitation, when a "notify me" link is clicked on a webpage or from the mobile device, the business location is put into a list of business locations on the mobile device, or on the system, that the user of the mobile device is able to review at any time.

In some forms of the invention, embedded internet location based content is inserted into search results or web pages. The embedded content accesses GPS or other location information on the mobile device and then updates the location information associated with the user or a unique identifier on a server. Future content sent to the user is further targeted based upon the updated location information.

In some forms of the invention, the search feature may be integrated with one or many databases containing the inventories of stores. The user searches for specific products and results are returned from the inventory listings of the various stores. Stores that are along the paths the user typically travels on, paths that the user is known to have traveled on, or paths that are convenient to the user based upon their traveling habits are weighted accordingly in the returned search results. Furthermore, stores that have the product in their inventory are weighted accordingly in the returned search results. Stores that do not have the product in their inventory may be removed from the result set completely. This information may also be sent as a notification to a user's mobile device when the user passes by a store that has a product that they have previously searched for in their inventory. In some forms of the invention there is an additional option to register that the user has already purchased the product and that future content geared at selling that particular product is not appreciated. Alternatively, the fact that a user has satisfied their need for a particular good or service is learned from the purchase history associated with the user. The purchase history is provided through an integrated payment system or it may also be provided by the user, the retailers, or any other third-party.

In some forms of the invention, the system is further integrated with a payment system that is accessible from the mobile device, and that assists with providing conversion tracking to advertisers, retailers, or other content producers. If the user of the mobile device pays through the payment system, then the payment information is associated with other information in the system or other information coupled to the system. For purposes of illustration and without limitation, if a user of a mobile device goes to a store and pays though the payment system on the mobile device, not only does the system determine the store and the time spent at the store from location data, but the amount of money spent at the store by the user. Furthermore, in some forms of the invention, the transaction information is used (who was paid) to verify or refine the accuracy of the system. Additionally, it may be determined whether or not targeted content was previously sent to the device and, if so, how the user responded to the content. In some forms of the invention, it may be determined if targeted content or an advertisement is viewed on a webpage or map and whether the user subsequently calls or visits the associated business location.

In some forms of the invention, the system is interfaced with databases maintained or contributed to by credit card processing companies (e.g., Visa, MasterCard, etc.). The payment information in these databases is coupled to the account of the user of a mobile device and their associated location information. If the user of the mobile device uses their credit card to purchase an item, the location information associated with the particular business the credit card was used at is inserted into the location tracking portion of the system associated with the user. This information may also be processed to determine if the money was spent in response to an advertisement that was sent to the mobile device or viewed by the user on their computer.

In some forms of the invention, the system is interfaced with electronic and other online payment systems such as Google Checkout or PayPal. This operates in a similar manner to the integration with the credit card information databases. The user pays through their mobile device, or by obtaining a reference number from their mobile device provided by their online payment account which is used by the merchant to obtain the proper payment. Alternatively, the user may pay by inserting an identifier associated with the merchant (e.g., merchant ID, email address associated with the merchant or the particular business location, etc.) into a form presented to them on their mobile device or computer. The location tracking then tracks the sale back to the user and the particular business location, and associates the amount spent at the business location with the user. This information is optionally available to the producers of the targeted content so that they are able to analyze the effectiveness of the content and the associated sales numbers. They may then modify their advertisement campaigns in order to obtain improved conversion rates.

The data sets received from a mobile device subsequent to content being displayed may also be analyzed in order to determine if the content was viewed or acted upon by the user, or if the content induced the user of the mobile device to visit a particular business. As previously discussed, the location information is analyzed in order to determine the specific businesses a user of a mobile device likely visited. This method may also be used to determine if a user of a mobile device visited a business location after receiving targeted content associated with that business. Furthermore, other actions taken by the user of a mobile device may be monitored. It may be determined whether or not a user ignored the targeted content. This may be determined by analyzing the location information to see if the user of the mobile device passed by the location indicated by the targeted content. It may be determined whether or not the user of the mobile device dismissed the notification, saved the notification for display next time they pass by the location, or some other user input into the mobile device that is associated with the targeted content. This information is used to determine the return on investment (ROI) and conversion tracking statistics. A conversion may occur when a user simply acknowledges the targeted content by clicking on it, when the user visits a website associated with the targeted content, visits a business location in response to an advertisement, or visits the business location and makes a purchase. In some forms of the invention, a conversion may be defined by the advertiser or many different categories of conversions may be defined.

In some forms of the invention, Customer Relationship Management (CRM) Systems or Business Analytics systems are provided. Location data is aggregated from all users to determine visitor information associated with retail locations, branded retail chains, or any other geographic location or sets of locations. This may be used to determine of the number of new visitors, and returning visitors during a specified time period and location or set of locations. Businesses are able to quickly determine the number of and type of customers that are visiting their business locations. This assists with the supply chains of the respective businesses, customer relations management, and financial predictions. This also allows large business chains to visualize which locations are more popular than other locations allowing the chains to optimize the locations where they choose to place their businesses.

For purposes of illustration and without limitation, a chain of coffee house locations is able to visualize the number of visitors that have visited any one of their locations, the number of new visitors in a given period of time, the number of returning visitors in a period of time, the average number of visits associated with returning visitors. The above statistics may be visualized with respect to all business locations, a sub grouping of business locations, or each individual business location. In forms of the invention where payment systems are integrated, the average dollar amount spent per visit, the revenue per store, and a great deal of other information relevant to the businesses and their operation is revealed to the owners of the business.

For purposes of illustration and without limitation, the metrics available to content producers may include the number of visits to their business location(s) as shown as a histogram on a timeline. The total number of visits to the locations, the bounce rate (e.g., may be displayed as a measure of the number of visitors that visit the store briefly possibly without purchasing anything and then leave the store possibly never returning to the store, etc.), the average time spent at the store, a percentage of new visits to the store, a breakdown of the geographic locations of where visitors come from or live (e.g., the country, state, county, city, town, neighborhood, etc.), the traffic source (e.g., how the user arrived at the business location, the path user took to get into the shopping complex, what stores they visited before and after, etc.), visitor profiles including their languages, network locations (e.g., wireless service provider), other demographic information about the users, the new vs. returning visitors, the trend of visitors over time, the loyalty of visitors, the recency of visitors (e.g., may be displayed as a histogram of the percentage of all visitors as a function of time—for purposes of illustration and without limitation, 65% of all visitors in the past week visited one day ago on Saturday, etc.), a measure of the length and depth of the visit, the capabilities of the mobile device of the visitors (e.g., provides business ability to better tailor targeted content to the capabilities of the mobile devices used by their visitors, etc.), length of visit (e.g., may be displayed as a histogram of the percentage of all visitors against the length of visit, etc.), items that were bought at the store correlated to any other metric described in this and related patent applications, conversion goals which may include total conversions, conversion rates, and goal values. It is further provided that and any other metric may be visualized that is typically used or is desirable to the business including user defined metrics that are programmable or customizable by the business operator.

The gathered information may be used to forecast financial information associated with business locations as a service to clients or in order to profit through buying or shorting the particular businesses based on their forecasted performance. For purposes of illustration and without limitation, reports may be provided to businesses of the various statistics associated with their business. Additionally or alternatively, the information may be used by market analysts in order to provide investment opinions and determine whether or not the company's stock should be bought, sold, or held.

Figure 11A:
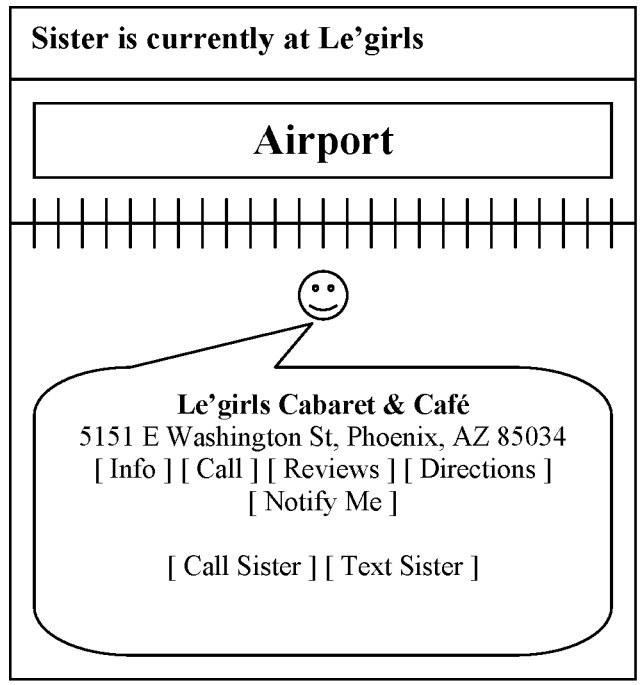
FIG. 11A depicts an exemplary view of one form of the invention showing the location of a single family member on a map with the name of the business at which they are currently located.
Figure 11B:
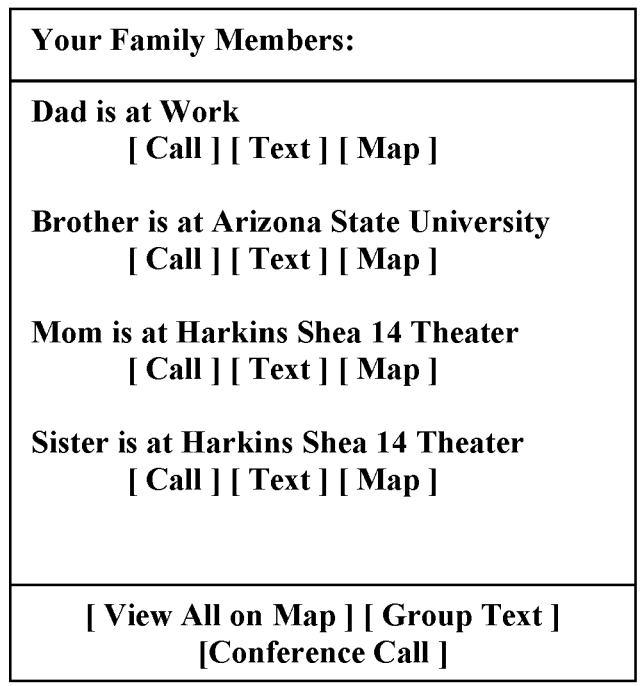
FIG. 11B depicts an exemplary view of one form of the invention showing the location of a number of family members with the name of the business at which they are currently located.

In some forms of the invention, social uses are provided. Such social uses include determining a family member's location and reporting the name of the business at which the user of the mobile device is currently located. Currently, there are systems that determining the approximate location of a family member's mobile device. One such system is the Sprint Family Locator service. This service uses the cellular network to triangulate the location of a family member's cellular phone and display the location on a map. However, there are some problems with this that the current invention eliminates. Namely, the location of the family member is simply provided as a dot with associated error radius on a map. The present invention provides the name of the business location at which the family member is currently located. For purposes of illustration and without limitation, assume it is 1:30 AM on a Saturday night and the father of an 18 year old girl who lives across town and attends college wants to make sure she is safe. The father goes to the Sprint Family Locator website to locate his daughter's phone and sees that she is on the railroad tracks next to the airport. The father knows that this is an unsavory part of town and about 15 minutes driving distance away from where his daughter lives. The father is worried and calls his daughter who does not answer her phone. The father then calls his oldest son who lives near his 18 year old sister to see if he knows where his sister went. The oldest son calls his sister who answers the phone but is barely audible due to a great amount of background noise. Nevertheless, the son is able to find out that the daughter is at a strip club near the airport with several of her friends. The 18 year old daughter then calls her father to let him know she is okay. All of this worrying may have been avoided had the locating service reported the daughter was at the particular strip club by the airport than simply near the railroad track by the airport. For purposes of illustration and without limitation, the father would locate the daughter and would be notified that she is at the particular strip club near the airport. The notification may be displayed on a map, as shown in FIG. 11A, or it may be a text based notification. In some forms of the invention, multiple family members may be located at the same time. For purposes of illustration and without limitation, referring to FIG. 11B, a list of family members and their locations may be displayed. Alternatively, their locations may be displayed on a map and the business names either visible or accessible through a graphical user interface. Furthermore, in some forms of the invention, the name of the business location or the anticipated destination of the user is displayed to friends or family members when the user dials a call to friends or family members. For purposes of illustration and without limitation, if a man is going to a grocery store (or is at a grocery store) and calls his wife, his wife will see that he is going to the grocery store (or is at the grocery store) and that he probably wants to know if she would like anything. The wife can then determine if she wants to answer the call or if she misses the call she will have an idea what the call was about without listening to voicemail.

Another social use is aimed at locating friends in a similar fashion as the family location uses described above. In some forms of the invention, there is more control over privacy settings associated with friends than to family members.

Another social use is to provide a user of a mobile device a list or map showing the current locations of his friends and names of the businesses where their friends are currently located. For purposes of illustration and without limitation, on a Friday night, instead of a user calling or texting each of his friends to find out where they are going out, the user is able to pull up a list, as shown in FIG. 12A, or a map showing the names of the businesses at which the user's friends or family are currently located. This list or map view may optionally contain the names of each of the user's friends associated with the list of business locations at which they are located as shown in FIG. 12B. In some forms of the invention, the names of the establishments that a user's friends are currently at may be shown, but the names of the user's friends at the various establishments will not be shown unless the user is also located at the particular establishment as well. For purposes of illustration and without limitation, referring to FIG. 12A, the user of the mobile device will see a list of the establishments that their friends are currently located at and the number of friends at each establishment. If the user of the mobile device were to proceed to Dos Gringos, then a listing of the user's friends that are at Dos Gringos becomes available to the user of the mobile device; however, the user of the mobile device is not provided a listing of his friend's that are located at any of the other establishments on the list. Referring again to FIG. 12A, some forms of the invention provide an indication as to the number of friends that have stayed at their respective houses for the evening or otherwise have decided not to go out to socialize.

In some forms of the invention, the system is interfaced with one or many social networking websites (e.g., Facebook, MySpace, Friendster, LinkedIn, etc.). A link may be established with the social networking website in order to define their friends and provide location information or permission to view location information to their friends; this may be done through an API provided by the social networking web site. Alternatively, the system may provide its own address book in which a user maintains a list of their friends and any associated security settings or permission settings. Furthermore, in various forms of the invention the location privacy settings may be configured from the social networking site, from another portion of the system, or from within the mobile device or cellular phone itself.

In some forms of the invention, users are able to notify their friends and family of the business locations they are currently located at, or planning to go to later. Furthermore, optionally the owner of the business location may enable a commission feature that allows the user who sent the notification to obtain a percentage of the money their friends spend at the business location. For purposes of illustration and without limitation, Albert notifies his friends Betty and Curtis that he is going to Dos Gringos Bar to meet up at their Happy Hour. Both Betty and Curtis come to Dos Gringos it is registered that their location is in fact at Dos Gringos. Then Betty orders food and pays with a credit card and Dave orders food and drinks and pays with an online payment system over his mobile device. In forms of the invention where the system is interfaced with credit card payment systems, is able to calculate a commission based on Betty's payment. In forms of the invention where the system is interfaced with an online payment system, the commission due to Albert based upon Dave's purchase is calculated. Furthermore, if Curtis notifies Dave then Curtis may obtain some commission as well as Albert obtaining some commission based upon Dave's purchase. In some instances, it may be desirable to offer a fixed commission for drawing friends to a certain location. For purposes of illustration and without limitation, if Albert invites Betty, Eden, Faith, and Gloria to Dos Gringos, Dos Gringos may pay Albert a commission for bringing girls to the bar. The bar may pay Albert a commission only for girls that he invites that are within a certain age range or demographic group that the bar is targeting. Alternatively, the bar may pay the girls to come to the bar as an incentive to visit the bar. The payment, in some instances, is based upon the length of time the users of the respective mobile devices stay at the location and the amount of money spent at the location. Additionally, a business location may offer increased payment for enticing someone who has never been to the particular location, or particular business, to go to the business. For purposes of illustration and without limitation, if Albert invites Betty and Dave to Dos Gringos but it is Dave's first time at any Dos Gringos bar, then Albert receives a higher commission for Dave than if Dave had never previously been to a Dos Gringos location.

Figure 13A:
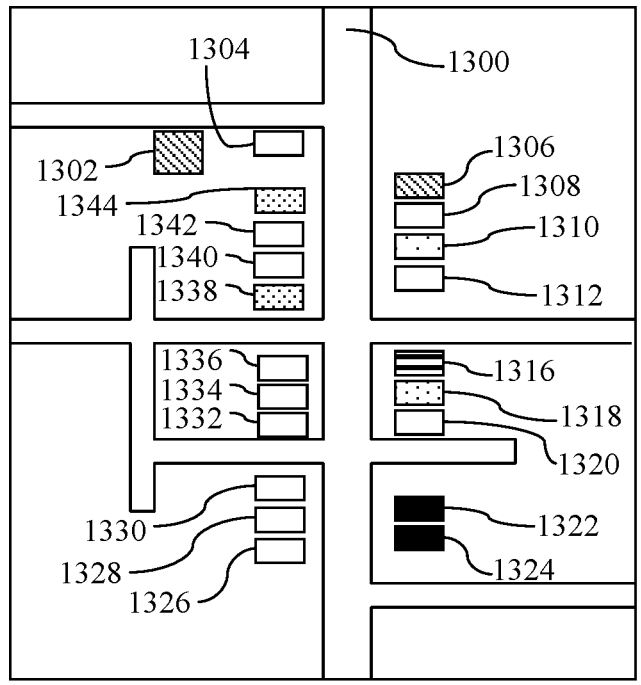
FIG. 13A depicts an exemplary form of the invention showing the current popularity (e.g., a measure of how busy) of certain business overlaid on a map.

Another social use relies on aggregate location data associated with many users in order to provide information on which business locations are currently popular, sparse, or empty. In various situations any of these cases may be desirable. The system has access to the reported locations of a number of mobile devices. It may be determined the business locations that the mobile devices are present at. Another user of the system accesses this aggregate location information from their mobile device or from a standard web browser in order to determine which business locations are currently busy. If the user of the system wants to go out to a busy nightclub they are able to determine which nightclubs are the most popular on that particular night. If the user of the system wants to have a nice quiet dinner out, they are able to see which restaurants are not busy and are therefore likely be quiet and not be a problem to get into. The system indicates how busy the business is based upon the square footage of the business. Alternatively, the system may base this indication using any combination of: the type of business, the square footage of the business, the maximum occupancy of the business, the typical number of users at the business (e.g., more or less popular than normal), or any other metric. The indication is displayed overlaid on a map. The system may display this indication as a gradient, percentage, index value, arbitrary number, on a map or in list not overlaid on a map. For purposes of illustration and without limitation, referring to FIG. 13A, the user of the mobile device is interested in going out to Mill Avenue in Tempe, Ariz., and pulls up a map showing the area. The map displays Mill Avenue 1300 and all of the businesses located on the street (some businesses that are actually present are omitted from FIG. 13A for purposes of simplicity). For purposes of illustration and without limitation, the map may include The Tavern 1302; Café Boa 1304; Rula Bula 1306; Fascinations 1308; Club Cherry 1310; Ra Sushi 1312; The Big Bang, The Library, Hooters, and Club 301 (located on different levels of the same building) 1316; Big Fat Greek Restaurant 1318; Urban Outfitter 1320; Zuma 1322; Cue Club 1324; Uno Pizzeria 1326; Fat Tuesdays 1328; Coffee Plantation 1330; American Apparel 1332; Cold Stone Creamery 1334; The Post Office 1336; Starbucks® 1338; Fatburger 1340; Taco Del Mar 1342; and, The Coconut Club 1344. A user looking at the map is able to see that Ra Sushi 1312 is relatively empty and knows that they are able to easily get a table and eat some Sushi. Furthermore, a user looking at this map would know that Zuma 1322 and Cue Club 1324 are very busy and therefore it may be fun to go there to see if they run into anyone they know or possibly meet new people. In some forms of the invention, the user may click on a business location to get more information such as the name of the business, a description of the business, ratings, a menu, status messages of users currently at the business location, comments associated with the location, or other information. In the case of The Big Bang, The Library, Hooters, and Club 301 1316, which are on different floors of the same building, the user may click on the business location to see a breakdown of the number of people at each establishment and to obtain information on one of the particular establishments in that building. In some forms of the invention, the user is able to filter the types of business locations that are displayed on the map. For purposes of illustration and without limitation, a user may filter so that only bars and nightclubs are displayed. Referring again to FIG. 13A, if the user filtered for bars, clubs and restaurants only the following businesses are displayed: The Tavern 1302; Café Boa 1304; Rula Bula 1306; Club Cherry 1310; Ra 1312; The Big Bang, The Library, Hooters, and Club 301 (located on different levels of the same building) 1316; Big Fat Greek Restaurant 1318; Zuma 1322; Cue Club

1324; Uno Pizzeria 1326; Fat Tuesdays 1328; Fatburger 1340; Taco Del Mar 1342; and, The Coconut Club 1344. In some forms of the invention, only businesses that are currently open (e.g., the current time is within their hours of operation) are displayed on the map. Furthermore, in some forms of the invention, the user may configure the display to show alternative information such as the ratio of women to men at each particular establishment, or only the number of men or women at each establishment. In some forms of the invention, a user is able to search for particular types of businesses and see which locations are the most popular. For purposes of illustration and without limitation, a user may search for coffee houses and obtain a list or a map of the coffee houses in the area with a ranking indicating their popularity or the number of people at each location. Another example may be a user who is in Chicago on business and is unfamiliar with popular restaurants in the area. The user may search for all restaurants ranked by the number of people currently at the restaurants. The user may search for all pizza restaurants ranked by the number of people currently at the restaurants. The user may even search for all pizza restaurants ranked by the number of people from Chicago currently at the restaurant (e.g., if the user wants to experience authentic Chicago pizza and not a restaurant that mainly caters to tourists).

Figure 13B:
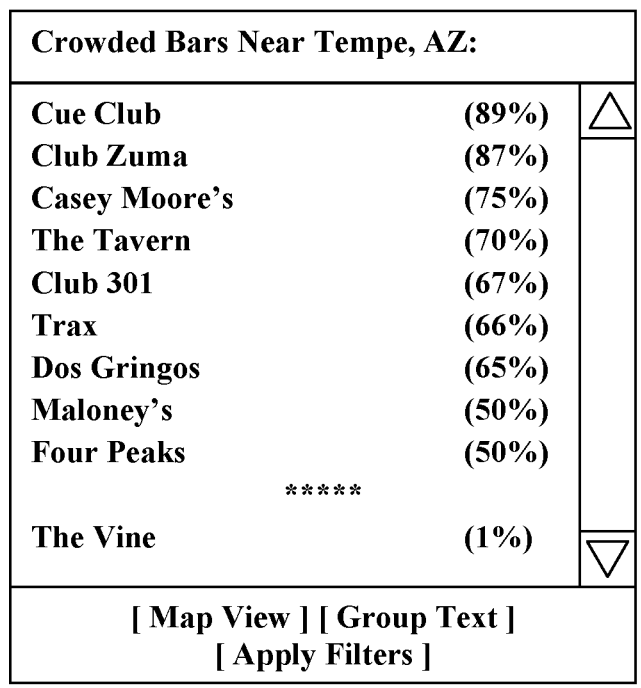
FIG. 13B depicts an exemplary form of the invention showing the current popularity (e.g., a measure of how busy) certain business.

In alternate forms of the invention, a list of business locations along with an indication of how popular the business is currently is provided to the user of the mobile device. For instance, FIG. 13B depicts a listing of various business locations and a measure of the popularity of the business. This may be a ratio of the number of people to the square footage of the business location, the number of people as a ratio to the legal capacity of the business location, the number of people at that club compared to other clubs, or any other measurement.

In some forms of the invention are integrated with navigation systems. The navigation system is able to retrieve favored routes, remember prior routes, provide for routes near businesses of interests, and interface with advertisements as previously described. In some forms of the invention, the advertisement allows a user to insert the business location as an intermediate location in the guidance to the final destination.

In some forms of this aspect of the invention, the navigation system is coupled to the power or fuel management system of the car. The navigation system may automatically place gas stations or recharging stations in the route guidance or highlight them on the map when it is determined that the car needs to be refueled or recharged. For purposes of illustration and without limitation, a user may request driving directions for a long trip; the navigation software retrieves targeted content for service stations along the route; the navigation automatically inserts an intermediate destination at a service station when the gas tank is about a certain percentage empty or when the batteries are about a certain percentage discharged. The certain percentage may be set by user preference. The servicing stations selected may be based upon a particular brand of service station that is preferred by the user.

In some forms of the invention, the navigation system is not integrated with the car but instead is able to communicate wirelessly with the ECU or computer that controls the car in order to obtain information such as battery charge or fuel levels. The mobile device with navigation connects to the ECU with a wireless technology such as Wi-Fi or Bluetooth. Alternatively, the mobile device coupled to the Internet or other network, and the car ECU is coupled to the Internet or other network. The mobile device and the ECU communicate through the Internet or other network.

In more advanced forms of the navigation integration, mass scale organized route control may be provided. A central system hands out suggested routes in order to minimize congestion and optimize (e.g., minimize) the overall travel time for everyone. This may be accomplished through standard optimization techniques known in the art (e.g., gradient optimization, genetic algorithms, neural network based solutions, etc.). The desired destination or anticipated route is obtained, compares it with known traffic conditions and the other proposed routes that are known, and returns the optimized route to the mobile device. In some forms of the invention, the routes are updated as conditions change.

In some forms of the invention, the system is integrated with a Telephony or Voice over Internet Protocol (VoIP) system or systems (e.g., Skype®, Yahoo Voice®, Google Talk®, Vonage®, Gizmo(G), Asterisk PBX, Cellular, Data, or any phone system based on Session Initiation Protocol (SIP), etc.). The phone numbers of businesses dialed and the location of the dialed business are associated with the user of the mobile device's account. It is then determined whether the user subsequently visits the business location.

It is another object of the invention to provide methods and systems that communicate phone numbers that a user dials to a remote system in order to assist with tracking the effectiveness of advertising materials. For purposes of illustration and without limitation, software running on a mobile device periodically reports the telephone numbers dialed, web addresses visited, or any other such information, to a remote server. In the case of telephone numbers that are reported to a remote server, the businesses contacted by the user of the device may be determined.

Some forms of the invention record all of or a portion of the telephone conversation for review by the business (or by the user that initiated the call). The business may determine which type of phone calls result in visits to their business location. The interests of the user of the mobile device are further refined by analyzing the phone numbers dialed by the user.

The system may expand the geographic area of targeted content associated with the user based on the numbers the user dials. For purposes of illustration and without limitation, if the user dials a phone number of a business off the path of the user's typical travels, results for other businesses in that area are weighed more so than it would have prior to the user calling the business in the new area.

In some forms of the invention, the system notifies the user who dials the phone number associated with a business of a more convenient business or location before completing the call. The system may not notify the user if the user recently visited the more convenient location or called the more convenient location. The notification is in the form of a text message, alert, or other notification displayed on the mobile device, but it may also be an audio message played before the call is completed. The notification provides the user with the option of dialing the phone number for the more convenient business location, and may also allow for a map showing the more convenient location.

In forms of the invention interfaced with inventory data, it may be determined whether the more convenient store has an item or type of item the user previously searched for (or that it may be determined that the user would be interested in) in its inventory. If the store has the item, then the notification includes this information; however, this may be omitted. The price and price difference between the item at the more convenient business and the dialed business may also be included in the notification.

In some forms of the invention, the notification is not sent when the price is greater by a threshold value or percentage when compared to the price at the dialed business location. If it is determined that the dialed business location does not have the item, a notification of a store that does have the item (even if less convenient) is provided. If no more convenient stores have the item but the dialed store does have the item, then the system does not send a notification; however, in other forms of the invention the system may still send a notification.

In some various forms of the invention the telephony integration is interfaced with conversion tracking (e.g., provides the ability for a business to track calls that result in visits or sales, etc.), credit card or other payment information, and other systems described in this and related patent applications.

In some forms of the invention, information specific to the particular business location is sent to the phone. For instance, a user of the device enters a store, it may be determined that the user has entered the store, and an image including a map of the store is sent to the mobile device. Alternatively, the current specials of a store are sent to the user, or the location of a particular item in the store. For instance, a user of the mobile device enters a Border's book store. It may be determined that the user has entered the store and sends a map of the particular store to the user. The user submits a query for a particular book. An image of the location of the particular book overlaid on the map of the store is returned to the mobile device.

In some forms of the invention, Bluetooth, RFID, or other short range wireless transceivers are placed throughout the business location. The mobile device connects to the wireless transceivers with the best signal (e.g., the closest one), or is scanned by a wireless scanner, and the user's location in the store is determined. Targeted content based upon the location of the user in the store is sent to the user. For instance, the user queries the location of a particular book and a map is returned with directions from the current location of the mobile device in the store to the location where the book is on the shelf. Additionally, a user of a mobile device may hit a button for help which would then alert a store employee that a customer needs assistance and indicate where the customer is located in the store. In some forms of the invention, these short range wireless technologies may also assist in providing the name of the business location at which the user of the mobile device is currently located.

The inventive methods and systems may be used on a variety of different mobile devices such as small or simple sell phones, smart phones, Apple's iPhone, UMPC computers, wristwatches, laptop computers, car navigation systems, or any other computerized device. Therefore, there are a variety of different user interfaces that may be implemented when used on mobile devices of varying capabilities and screen sizes.

Figure 14A:
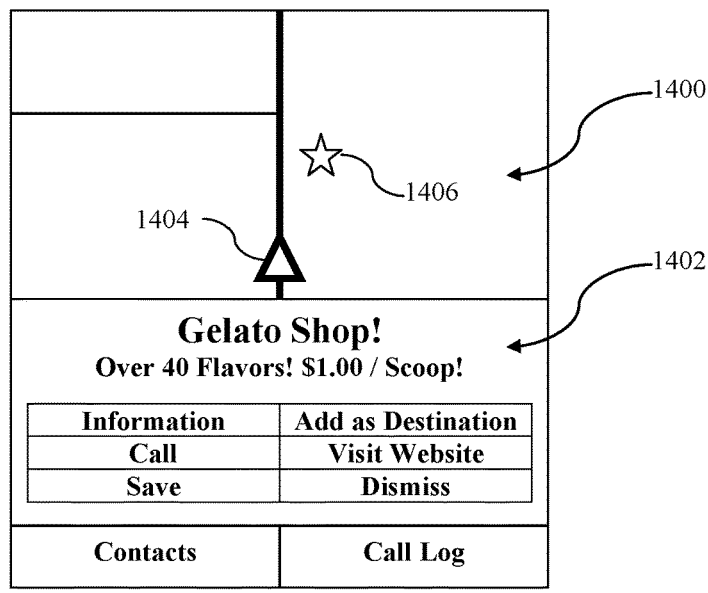
FIG. 14A depicts an exemplary user interface designed for use with some forms of the invention.

With reference to FIG. 14A, the top portion of the screen or map portion 1400 contains a map showing the current location of the mobile device 1404 and a business of interest to the user 1406. The lower portion of the screen or options portion 1402 contains the name of the business location and may also contain targeted content. The lower portion of the screen 1402 also may contain options that are available to the user. For purposes of illustration and without limitation, the user may request more information about the business location, add the business location as a destination, save the business location for notification later, or dismiss the notification.

Figure 14B:
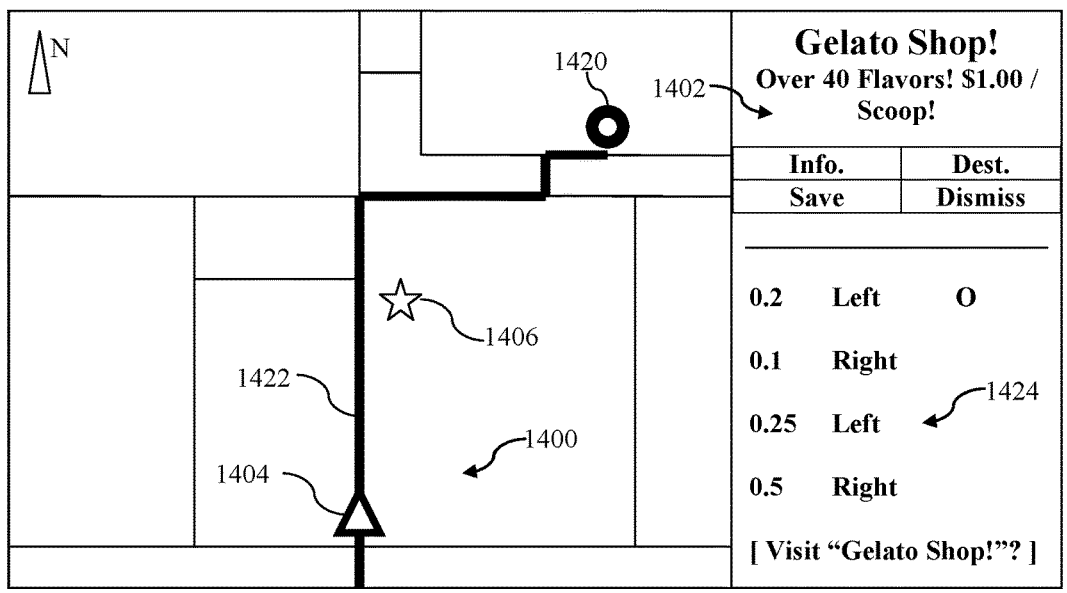
FIG. 14B depicts an exemplary user interface designed for use with some forms of the invention.

With reference to FIG. 14B, the map portion 1400 of the screen displays the location of the mobile device 1404, a business of interest to the user of the mobile device 1406, the anticipated or actual destination of the user 1420, the anticipated or actual route of the user 1422, an information section with targeted content and options available to the user 1402, and an area with turn-by-turn directions 1424. There may be many businesses of interest 1406 simultaneously displayed on the map but the targeted content may only be shown in the options portion 1402 of the screen for the next business location along the route in the list of targeted content. Alternatively, the options portion 1402 may cycle through the list of targeted content along the route while indicating the corresponding business location on the map portion 1400.

Figure 14C:
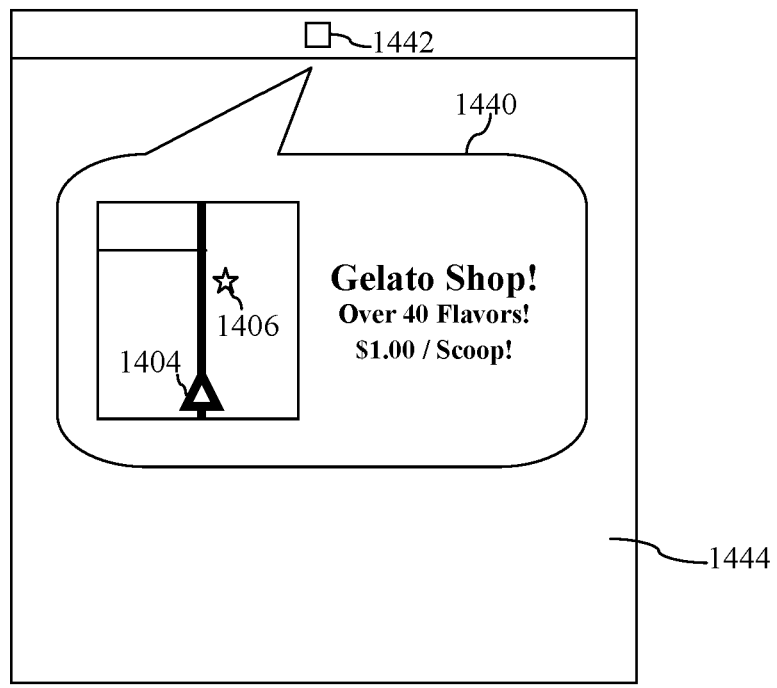
FIG. 14C depicts an exemplary user interface designed for use with some forms of the invention.

With reference to FIG. 14C, there is a notification bubble 1440 that optionally contains a map portion 1400 and targeted content. The notification bubble 1440 is accessed from a notification indicator 1442 and appears on top of another application 1444 running on the mobile device. If a user clicks on the notification indicator 1442, the notification may be hidden. If a user clicks outside of the notification bubble 1440, the notification bubble 1440 may be dismissed or hidden. If the user clicks inside of the notification bubble 1440, a number of other options are available such as more information about the business location, the option to add the business location s a destination in the route guidance, the option to save the business location for later review or notification, the option to dismiss the notification, or any other option. The notification bubble may only appear when the mobile device determines it is idle or that the user has not provided input for a period of time. If the mobile device is not idle, then the notification indicator 1442 may flash or otherwise indicate a notification is available without disrupting the user with the notification bubble 1440. In some forms of the invention, when the mobile device is not idle, or instead of showing a notification bubble when the device is idle, a ticker across a portion of the screen scrolls the targeted content so that the user is not interrupted but they are able to view the notification. This is exemplary and is not intended to limit the scope of the invention. As shown and described, a person having ordinary skill in the art is able to implement the invention in any number of varying forms. Generally, the inventive user interface contains an indication of the anticipated or actual route 1422 and a business of interest 1406 along the route that is obtained from targeted content sent to the mobile device.

Figure 15A:
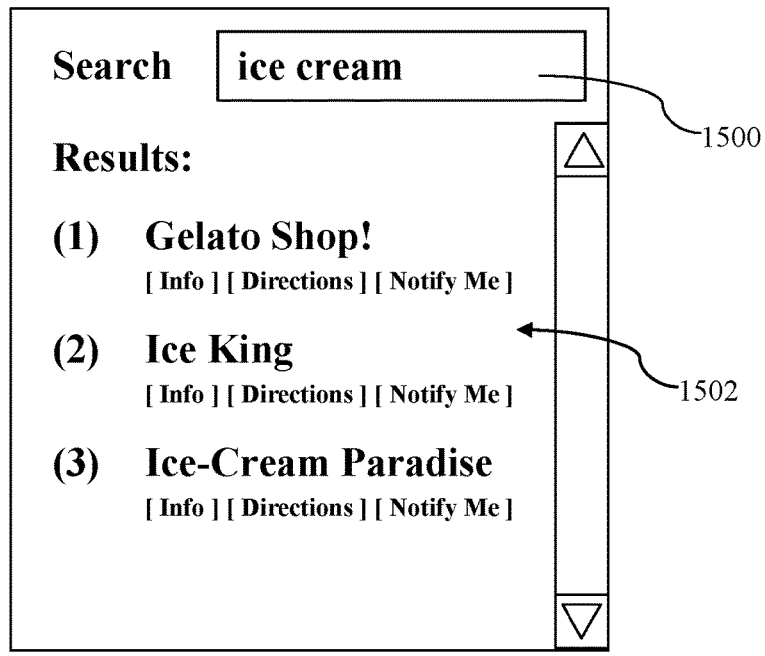
FIG. 15A depicts an exemplary web based user interface that provides a list of search results in order of convenience to the user based upon their typical travel patterns.

With reference to FIG. 15A, there is a search input 1500 and a result listing 1502. The result listing is sorted in order of convenience to the user based on the routes they take most often. For purposes of illustration and without limitation, if a user has traveled along a particular path 59 times and another path 39 times, the ice cream store along the path more traveled will be ranked higher than the ice cream store along the path less traveled. If an anticipated or actual route for the user is known, the results may be listed in order of convenience of access from their anticipated or actual route. The results may be formatted for display on a personal computer or on a mobile device.

Figure 15B:
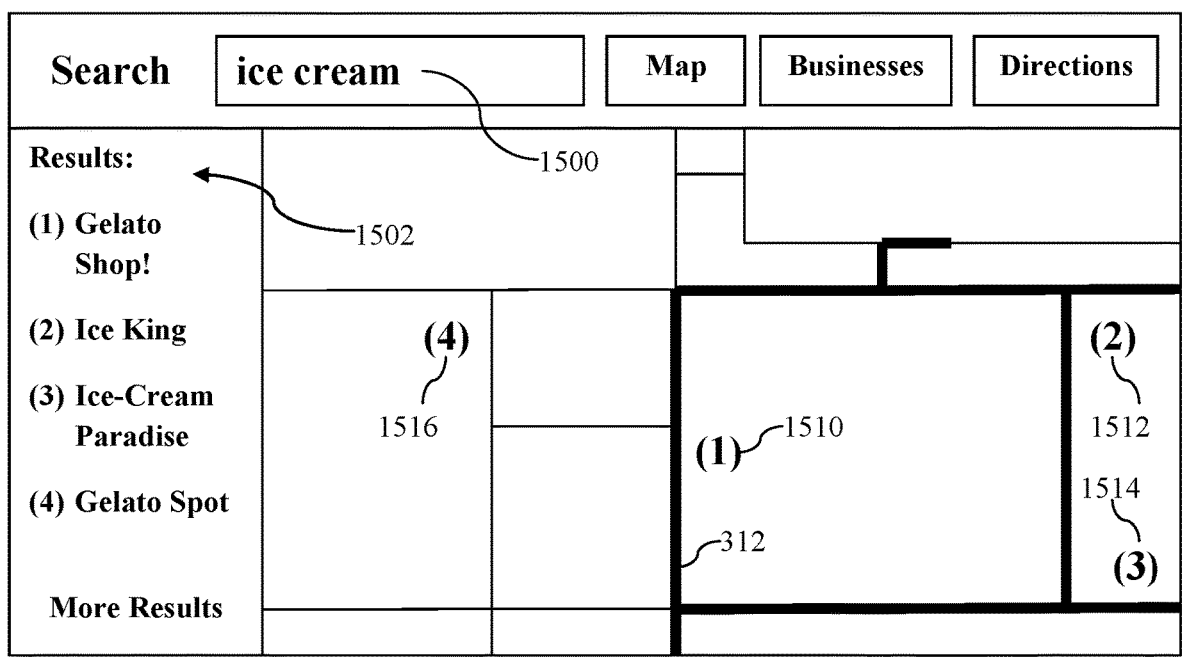
FIG. 15B depicts another exemplary web based user interface that provides a list of search results in order of convenience to the user based upon their typical travel patterns and further shows the results in map form.

With reference to FIG. 15B, there is a search input 1500 and a result listing 1502. The map shows the routes that the user has previously taken 312 and the search results along those routes in order of convenience to the user. For purposes of illustration and without limitation, result 1510 is the easiest ice cream location for the user of the mobile device to access, result 1512 is the second easiest for the user of the mobile device to access, and result 1514 is the third easiest location for the user of the mobile device to access based upon the routes that the user of the mobile device has previously taken. Result 1516 is not along a path that the user has traveled on before and therefore this result is weighed less heavily. The location may be less convenient to access than the other locations based upon the travel habits of the user, or it may be easy to access but the user has never happened to drive along that path. In forms of the invention with an integrated coupon system, a coupon may be offered to the user to entice them to try the particular establishment. In forms of the coupon system where the value of the coupon is determined based upon various factors, a coupon of increased value may be offered to entice the user to visit the location as a first time customer to that particular location or that particular brand of business location. If the user of it may be determined an anticipated route or an actual route for the user of the mobile device, this route may be displayed on the map view. Furthermore, the search results may be ordered based on the convenience for the user of the mobile device to access each result from their current anticipated or actual route.

In various forms of the invention, a user interface is provided to content producers and advertisers. With reference to FIG. 16A, there is a content ID input filed 1600 where the content producer may create a name for their targeted content. There is a business location menu 1602 that allows the content producer to associate the content ID with all of their business locations, a subset of their business locations, or a single business location. There is an optional link field 1604, and there is a content description field 1606 that allows the content producer to further persuade the recipients of the targeted content to visit the associated business locations. Additionally or alternatively, other fields not shown may be included. For purposes of illustration and without limitation, a content producer may limit the demographic segments that the targeted content is sent to. There may be inputs that allow the content producer to limit the recipients of the content to users in a certain age group, users of a certain sex, or users with certain keywords associated with their user profile. There may also be inputs that allow content producers to closely control their advertisement campaigns so that content is only sent out during business hours or is sent out to certain demographics at all times but sent to other demographics only at other times. For purposes of illustration and without limitation, an ice cream shop may send targeted content to teenagers during all hours of operation but only send notifications to older adults during the hottest hours during summer afternoons and after 6:00 pm when older adults may be interested in having ice cream for dessert. Similarly, the advertisements sent to teenagers may emphasize the affordability and number of flavors while the advertisements sent to older adults may emphasize low calorie ice cream.

Content producers may indicate their business location or locations using any one of a number of methods. In one form of the invention, the content producer indicates their business locations by being presented a map or a satellite image of the area in which their business is located. Then, they are asked to draw a polygon around their business location. Alternatively, they may be asked to cover their business location with a number of small circles, or by selecting a number of points and associate a radius with each point until their business location is sufficiently covered. The content producer may also be shown the polygons or other shapes similarly overlaid on adjacent businesses to ensure that the content producer does not overlap the location of the business with another business. Alternatively, the geographic boundaries of various business locations may be obtained from land records or other databases.

Content producers may also look at various statistics associated with their various advertisement campaigns. With reference to FIG. 16B, the user interface includes an identification of the content ID 1620 and a table of data 1622. The table of data may include several columns such as a column for the date 1624, a column for the number of views 1626, a column for the number of visits to the business location or locations indicated by the content 1628, the number of the visits that were return visits 1630, the number of induced sales 1632, and the revenue or a ROI value (see, e.g., reference numeral 1634). The data may also be displayed in graphical or chart form.

In some forms of the invention, the content producers or advertisers may be presented a map showing the common entrance and exit routes that their visitors take into and out of their complex, the stores that the customers visited immediately before and immediately after visiting the business location they visited that was associated with the targeted content, the locations where users were notified of targeted content, where the users viewed the targeted content, if the users ignored the targeted content, if the users saved the targeted content, the routes the users that received the targeted content were taking, the items purchased by specific visitors, the number of times that a particular visitor visited the business location associated with the targeted content, the areas where visitors of their business locations live, a breakdown of the demographics for the visitors to the business location, a breakdown or revenue by the demographics of the visitors to the business location, and all associated data broken down by time of day and day of week. In some forms of the invention, a content producer may be able to view a matrix or other display of this data across their various business locations so that the content producer is able to tailor each business location for the type of visitors the respective locations typically entertain.

In some forms of the invention, methods and systems are provided that determine if a viewer of a video advertisement (e.g., placed before, after, or during, an online video) takes an action (e.g., calling a phone number associated with the advertisement, visiting a business location associated with the advertisement, etc.) after viewing the advertisement. A video advertisement is placed before, during (e.g., as a commercial break, superimposed on the video, watermarked, etc.), or after the desired video content. The video advertisement is associated with an advertiser. The advertiser is associated with at least one of a phone number, an email address, a website, a merchant ID number, a business name, or one or more physical business locations. The user is associated with an identifier on a website that hosts the video content, the identifier is either associated with the user's mobile device or the identifier is coupled to a second identifier in another system that is associated with the user's mobile device. When the video advertisement is played, an indication that the advertisement was displayed to the user is recorded. Then, the user may respond to the advertisement in the future by dialing the phone number of the advertiser, sending an email to the advertiser, visiting the website of the advertiser, making a purchase using a credit card or other payment system with the advertiser, or going to a physical business location of the advertiser. If the user performs any of the aforementioned actions subsequent to viewing the video advertisement, the actions taken by the user are recorded and associated with the user, the business, or both.

In some forms of the invention, methods and systems are provided that determine if a viewer of a video advertisement played on a Digital Video Recorder (DVR) or other digital video playback device (e.g., TiVo, Apple TV, Digital Cable boxes, Satellite TV Receivers, etc.) takes an action (e.g., calling a phone number associated with the advertisement, visiting a business location associated with the advertisement, etc.) after viewing the advertisement. A video advertisement is placed before, during (e.g., as a commercial break, superimposed on the video, superimposed over the video only when the video is in fast forward, watermarked, etc.), or after the desired video content. Alternatively, the advertisement may not be displayed before, during, or after the video but is instead placed as a featured item on a menu in the DVR. In another alternative, advertisements that are placed before, during, or after the video as well as advertisements placed in menus are employed. The video advertisement is associated with an advertiser. The advertiser is associated with at least one of a phone number, an email address, a website, a merchant ID number, a business name, or one or more physical business locations. The user is associated with an identifier; the identifier is either associated with the user's mobile device or the identifier is coupled to a second identifier in another system that is associated with the user's mobile device. When the video advertisement is played, an indication that the advertisement was displayed to the user is recorded. Then, the user may respond to the advertisement in the future by dialing the phone number of the advertiser, sending an email to the advertiser, visiting the website of the advertiser, making a purchase using a credit card or other payment system with the advertiser, or going to a physical business location of the advertiser. If the user performs any of the aforementioned actions subsequent to viewing the video advertisement, the actions taken by the user are recorded and associated with the user, the business, or both.

Figure 17:
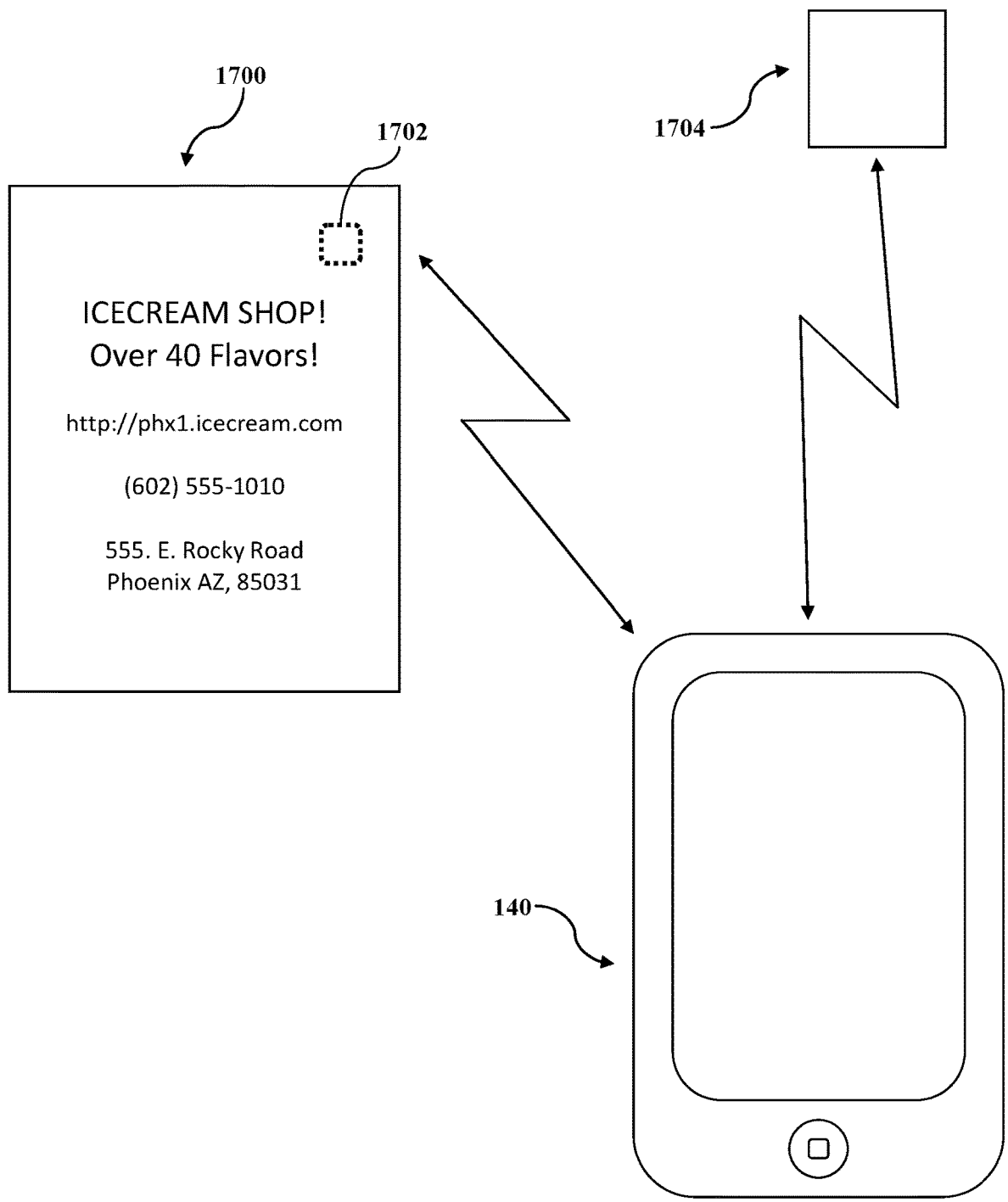
FIG. 17 depicts a general system overview of one form of the invention that provides methods and systems for determining whether a user performs an action subsequent to viewing a print advertisement.

In some forms of the invention, methods and systems are provided that determine if a user is in proximity to a print advertisement; whether it is likely that the user read the print advertisement; and, if the user performed an action (e.g., calling a phone number associated with the advertisement, visiting a business location associated with the advertisement, etc.) after viewing the advertisement. With reference to FIG. 17, a print advertisement 1700 has a near field identification tag (e.g., Radio Frequency Identification (RFID) tag, Bluetooth chip, etc.) 1702 embedded into the advertisement or affixed to the advertisement with adhesive or tape. A mobile device 140 with a near field reader (e.g., RFID reader, etc.) reads the near field identification tag 1702 on the advertisement 1700. The mobile device 140 then registers that it was in proximity to the particular advertisement 1700 with system 1704. System 1704 may be either a remote system, or a subsystem or other application or database within the mobile device 140. In some forms of the invention, the mobile device 140 will only register that it was in proximity to the particular advertisement 1700 if the user is in proximity to the advertisement for a sufficient time that it was likely the user saw and read the advertisement. This may depend on the type of print advertisement. For purposes of illustration and without limitation, if the advertisement is a flier placed on a car windshield the period of time required may only be a few seconds whereas if the advertisement is a menu for a restaurant then the period of time required may be a few minutes. The advertisement 1700 is associated with a particular advertiser through the identification number on the near field identification tag 1702. The near field identification tag 1702 may contain an identification number unique to the advertiser or one that is unique for each advertisement. Instead of near field identification, a barcode or other coded image may be used. A user may use the camera on their mobile device to take a picture of the coded image. The picture of the coded image is processed to obtain the encoded identifying information which is then reported to system 1704.

Figure 18:
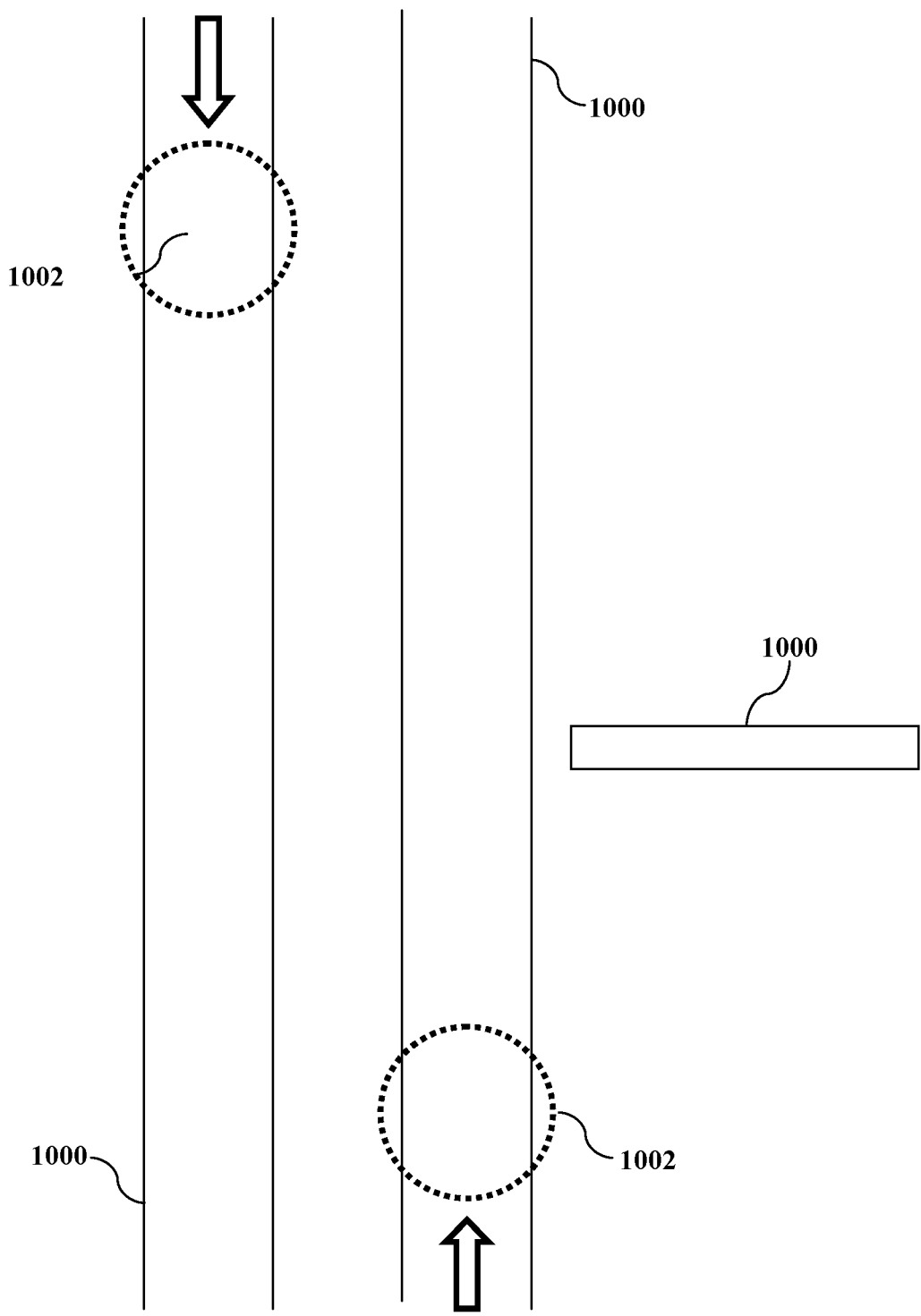
FIG. 18 depicts an exemplary form of the invention that determines whether a user performs an action subsequent to viewing a print advertisement or billboard.
Figure 18A:
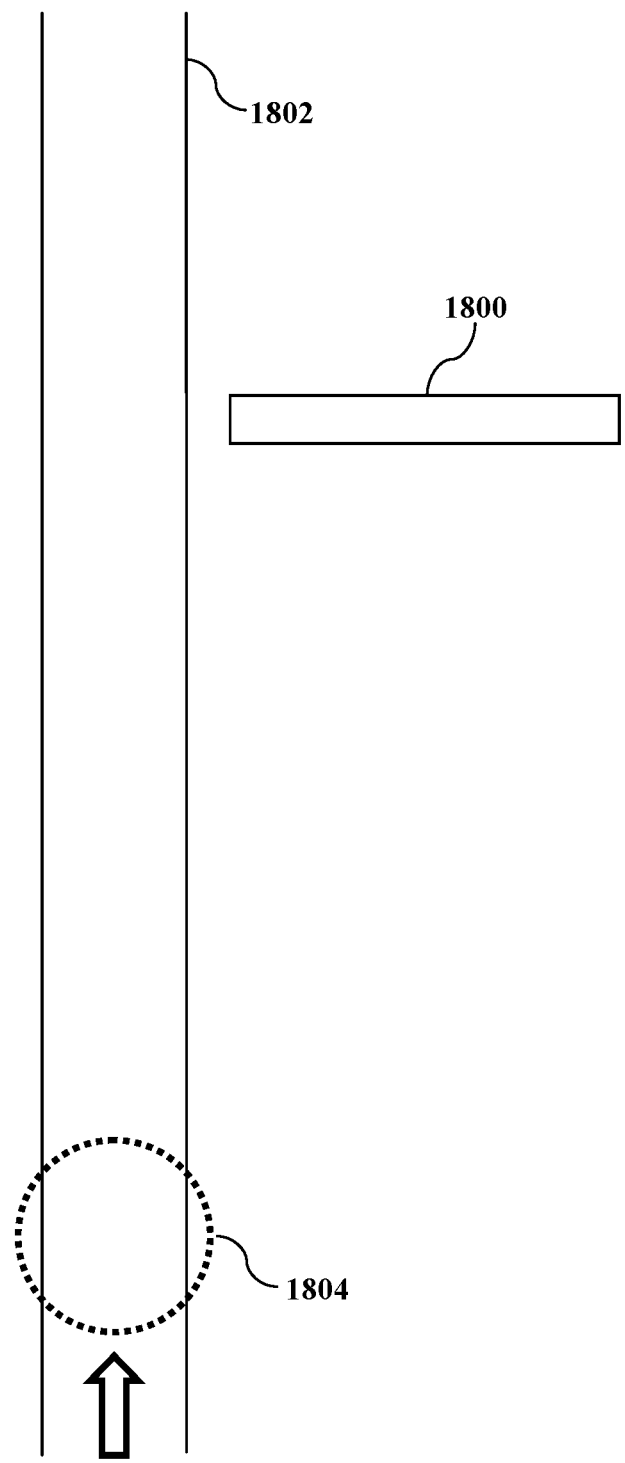
FIG. 18A depicts another exemplary form of the invention that determines whether a user performs an action subsequent to viewing a print advertisement or billboard.

In some forms of the invention, methods and systems are provided that determine if a user views a public advertisement (e.g., Billboard, Sign, Poster) and takes an action (e.g., calling a phone number associated with the advertisement, visiting a business location associated with the advertisement, etc.) after viewing the advertisement. With reference to FIG. 18, billboard 1000 along roads or paths 1000 is visible to a user who passes through either of areas 1002. Geographic location information representing areas 1002 may either be sent to the mobile device 140 or maintained in another portion of the system remote from the mobile device. If a user passes through either of areas 1002, then the mobile device will either notify the system that the user was able to view billboard 1000 or the mobile device will simply report the position to the other portion of the system remote from the mobile device that determines the location of the mobile device was within either area 1002. If the user subsequently dials a phone number associated with the business advertised on billboard 1000, visits a website of the business advertised on billboard 1000, visits a store location of the business advertised on billboard 1000, or takes any other action in response to the advertisement on billboard 1000, the action is recorded. This information may be provided to the advertiser or used by the company that uses the billboard to determine the effectiveness or pricing of the advertisement. Similarly, with reference to FIG. 18A, billboard 1800 along road or path 1802 is visible to a user who passes through area 1804. Geographic location information representing area 1804 may either be sent to the mobile device 140 or maintained in another portion of the system remote from the mobile device. If a user passes through area 1804, then the mobile device will either notify the system that the user was able to view billboard 1800 or the mobile device will simply report the position to the other portion of the system remote from the mobile device that determines the location of the mobile device was within area 1804. If the user subsequently dials a phone number associated with the business advertised on billboard 1800, visits a website of the business advertised on billboard 1800, visits a store location of the business advertised on billboard 1800, or takes any other action in response to the advertisement on billboard 1800, the action is recorded. This information may be provided to the advertiser or used by the company that uses the billboard to determine the effectiveness or pricing of the advertisement.

Figure 18B:
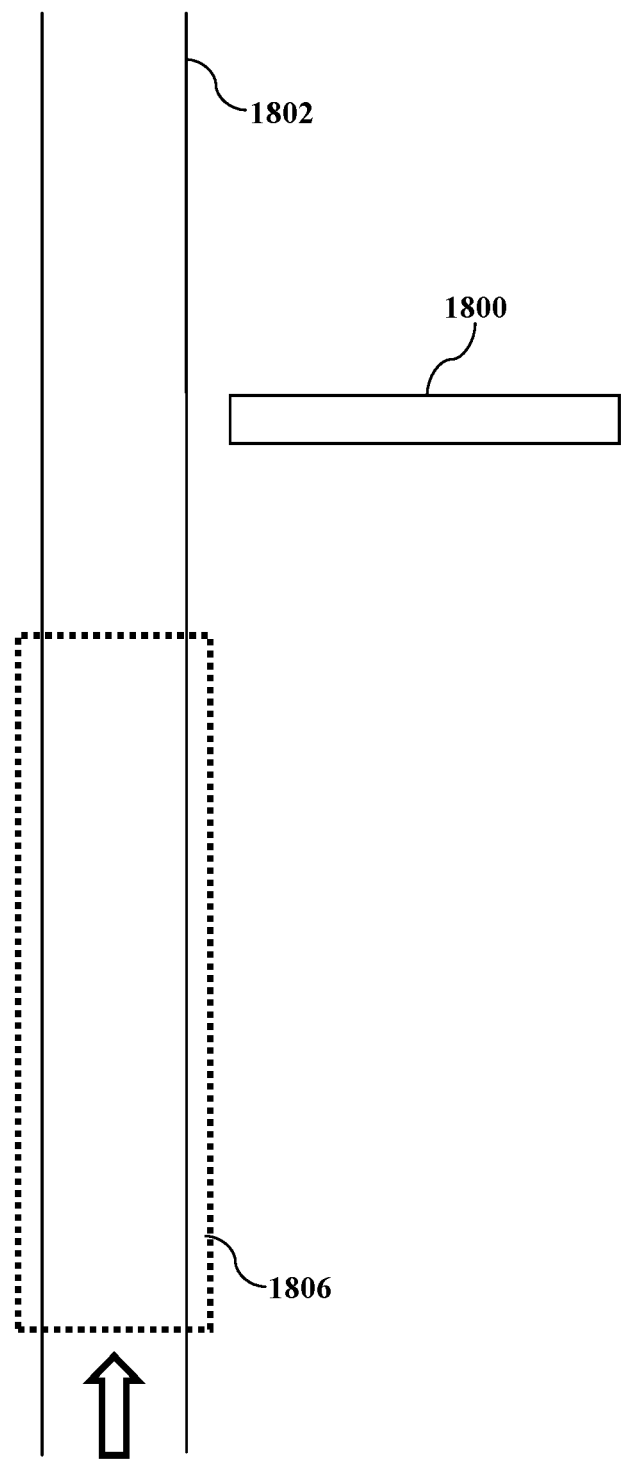
FIG. 18B depicts another exemplary form of the invention that determines whether a user performs an action subsequent to viewing a print advertisement or billboard.

With reference to FIG. 18B, billboard 1800 along road or path 1802 is visible to a user who passes through area 1806. Geographic location information representing area 1806 may either be sent to the mobile device 140 or maintained in another portion of the system remote from the mobile device. If a user passes through area 1806, then the mobile device will either notify the system that the user was able to view billboard 1800 or the mobile device will simply report the position to the other portion of the system remote from the mobile device that determines the location of the mobile device was within area 1806. In this figure, area 1806 represents an area where the user is likely to have viewed all of the advertisements displayed on billboard 1800. Billboard

1800 may contain several advertisements that rotate and are only visible one at a time, or the advertiser may desire users to be exposed to the advertisement for a threshold period of time so that the user can absorb the full content of the advertisement. If the user subsequently dials a phone number associated with the business advertised on billboard 1800, visits a website of the business advertised on billboard 1800, visits a store location of the business advertised on billboard 1800, or takes any other action in response to the advertisement on billboard 1800, the action is recorded. This information may be provided to the advertiser or used by the company that uses the billboard to determine the effectiveness or pricing of the advertisement.

Figure 18C:
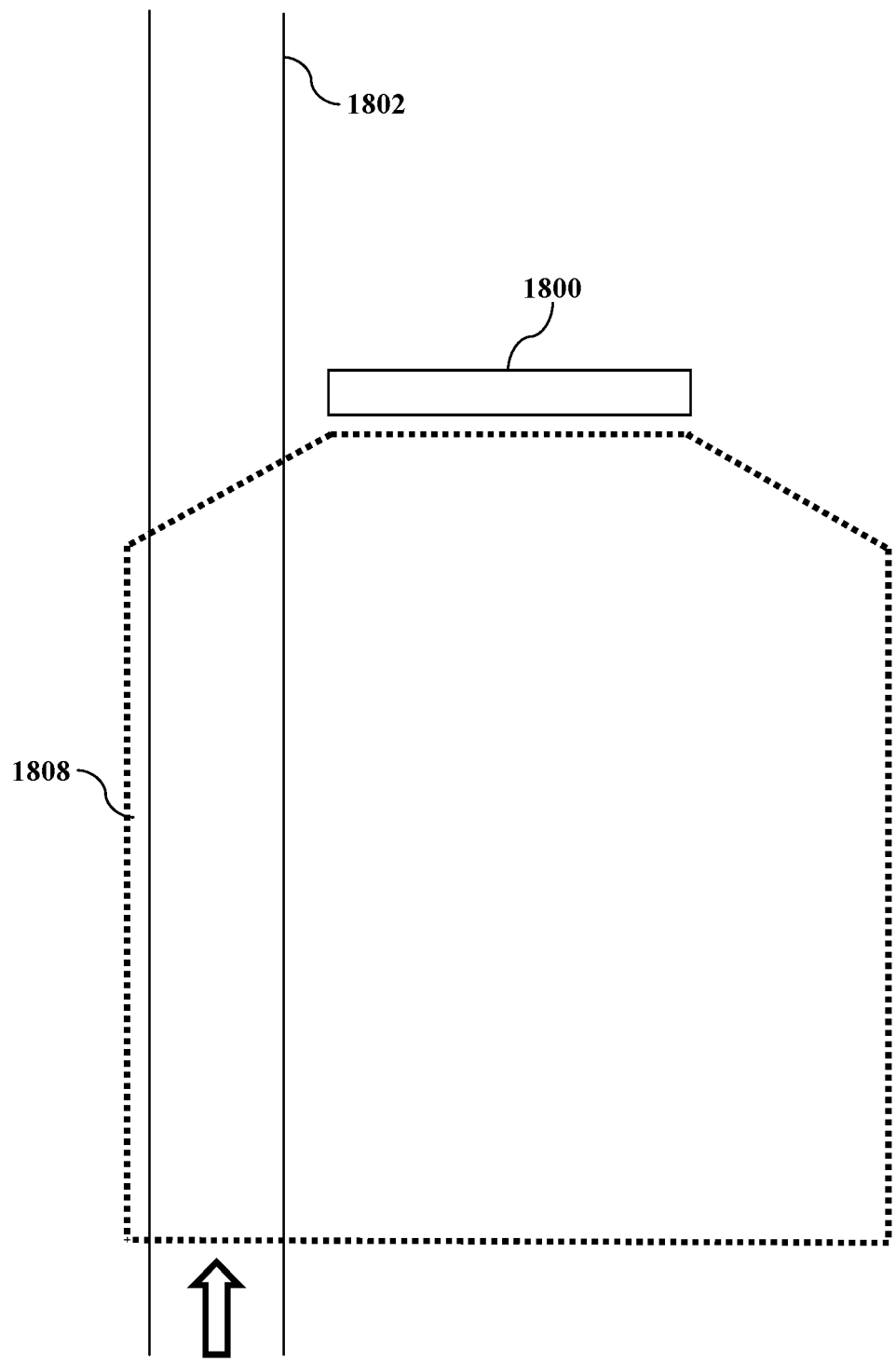
FIG. 18C depicts another exemplary form of the invention that determines whether a user performs an action subsequent to viewing a print advertisement or billboard.

With reference to FIG. 18C, billboard 1800 along road or path 1802 is visible to a user who passes through area 1808. Geographic location information representing area 1808 may either be sent to the mobile device 140 or maintained in another portion of the system remote from the mobile device. If a user passes through area 1808, then the mobile device will either notify the system that the user was able to view billboard 1800 or the mobile device will simply report the position to the other portion of the system remote from the mobile device that determines the location of the mobile device was within area 1808. In this figure, area 1808 represents an area where the user is likely to have viewed all of the advertisements displayed on billboard 1800 regardless of whether the user was driving along road or path 1802. Thus, if there are shopping centers, parking lots, or other places where potential customers are likely able to view billboard 1800, the views and conversions pertaining to those individuals are recorded. If the user subsequently dials a phone number associated with the business advertised on billboard 1800, visits a website of the business advertised on billboard 1800, visits a store location of the business advertised on billboard 1800, or takes any other action in response to the advertisement on billboard 1800, the action is recorded. This information may be provided to the advertiser or used by the company that uses the billboard to determine the effectiveness or pricing of the advertisement.

Figure 18D:
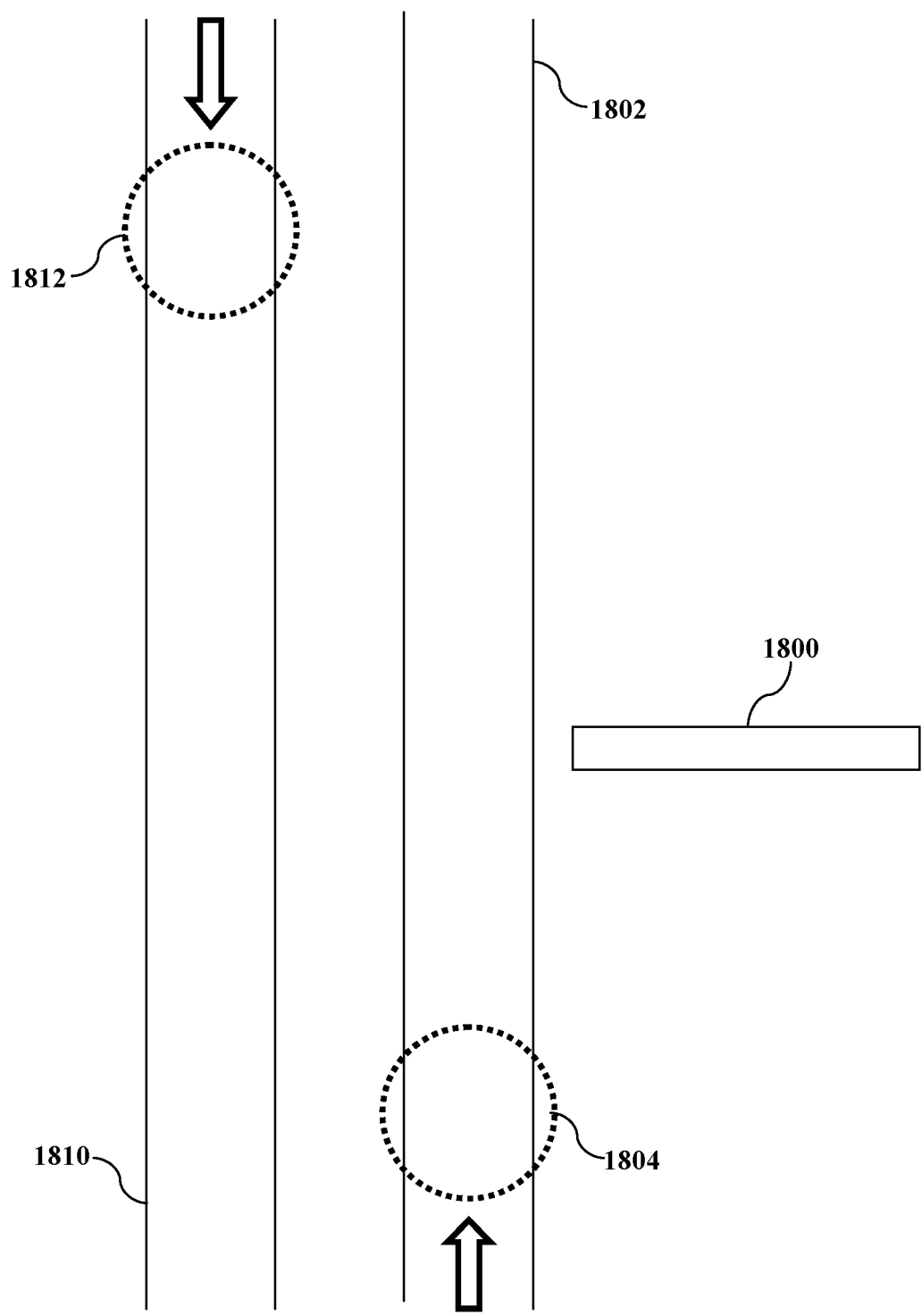
FIG. 18D depicts another exemplary form of the invention that determines whether a user performs an action subsequent to viewing a print advertisement or billboard.

With reference to FIG. 18D, billboard 1800 along road or path 1802 and road or path 1810 is visible to a user who passes through either area 1804 or area 1812. Billboard 1800 may display different advertisements on each side. Geographic location information representing areas 1804 and 1812 may either be sent to the mobile device 140 or maintained in another portion of the system remote from the mobile device. If a user passes through either area 1804 or area 1812, then the mobile device will either notify the system that the user was able to view a particular side of billboard 1800 or the mobile device will simply report the position to the other portion of the system remote from the mobile device that determines the location of the mobile device was within either area 1804 or area 1812. If the user subsequently dials a phone number associated with the business advertisement they were likely to have viewed on billboard 1800, visits a website of the business advertisement they were likely to have viewed on billboard 1800, visits a store location of the business advertisement they were likely to have viewed on billboard 1800, or takes any other action in response to the business advertisement they were likely to have viewed on billboard 1800, the action is recorded. This information may be provided to the advertiser or used by the company that uses the billboard to determine the effectiveness or pricing of the advertisement.

Figure 18E:
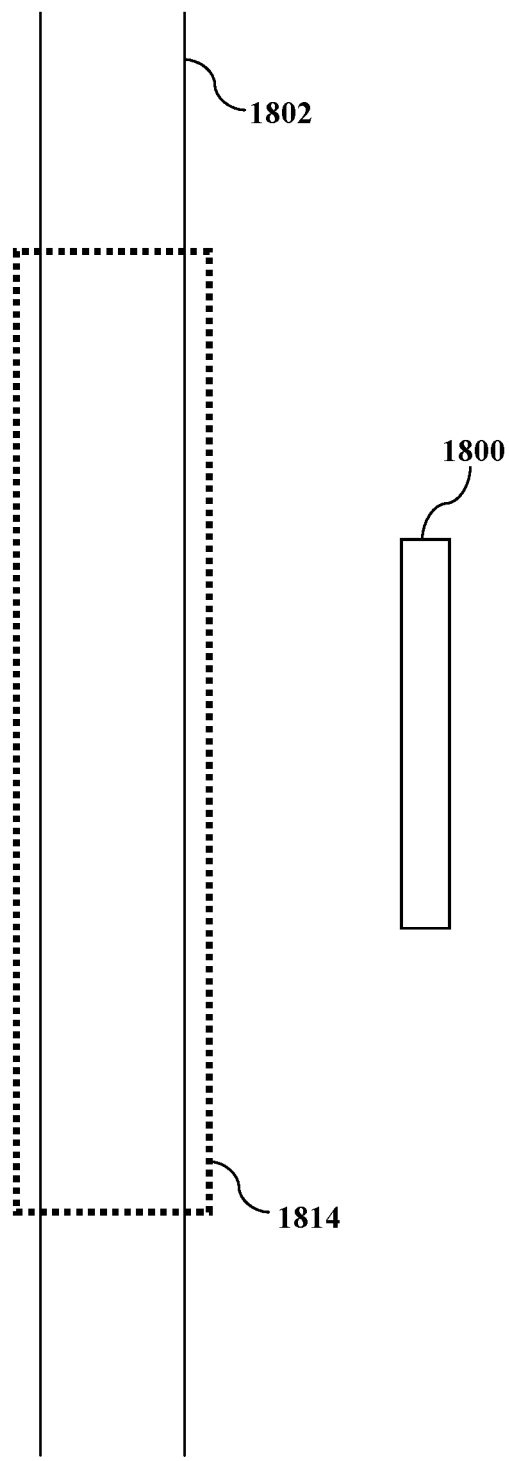
FIG. 18E depicts another exemplary form of the invention that determines whether a user performs an action subsequent to viewing a roadside print advertisement or billboard.

With reference to FIG. 18E, billboard 1800 along road or path 1802 is visible to a user who passes through area 1814. Geographic location information representing area 1814 may either be sent to the mobile device 140 or maintained in another portion of the system remote from the mobile device. If a user passes through area 1814, then the mobile device will either notify the system that the user was able to view billboard 1800 or the mobile device will simply report the position to the other portion of the system remote from the mobile device that determines the location of the mobile device was within area 1814. In this figure, area 1814 represents an area where the user is likely to have viewed all of the advertisements displayed on billboard 1800. If the user subsequently dials a phone number associated with the business advertised on billboard 1800, visits a website of the business advertised on billboard 1800, visits a store location of the business advertised on billboard 1800, or takes any other action in response to the advertisement on billboard 1800, the action is recorded. This information may be provided to the advertiser or used by the company that uses the billboard to determine the effectiveness or pricing of the advertisement.

Figure 18F:
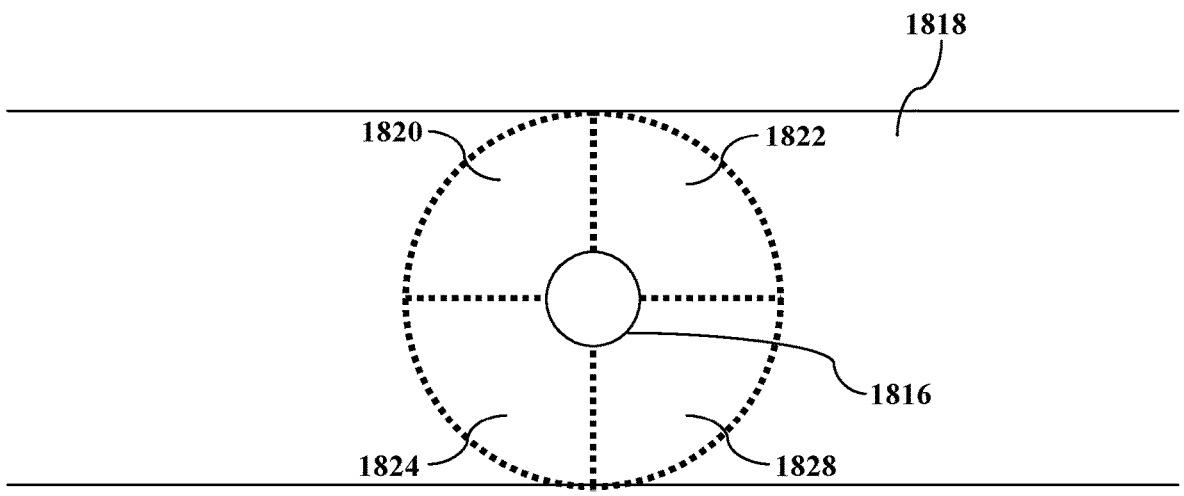
FIG. 18F depicts another exemplary form of the invention that determines whether a user performs an action subsequent to viewing a roadside print advertisement or billboard.

With reference to FIG. 18F, advertisement display 1816 along road or path 1818 is visible to users that pass through areas 1820, 1822, 1824, and 1828. Billboard 1816 may display different advertisements on each side or in different sections around its circumference. Geographic location information representing areas 1820, 1822, 1824, and 1828 may either be sent to the mobile device 140 or maintained in another portion of the system remote from the mobile device. If a user passes through either area 1820, 1822, 1824, or 1828, then the mobile device will either notify the system that the user was able to view a particular side of billboard 1816 or the mobile device will simply report the position to the other portion of the system remote from the mobile device that determines the location of the mobile device was within either area 1820, 1822, 1824, or 1828. If the user subsequently dials a phone number associated with the business advertisement they were likely to have viewed on billboard 1816, visits a website of the business advertisement they were likely to have viewed on billboard 1816, visits a store location of the business advertisement they were likely to have viewed on billboard 1816, or takes any other action in response to the business advertisement they were likely to have viewed on billboard 1816, the action is recorded. This information may be provided to the advertiser or used by the company that uses the billboard to determine the effectiveness or pricing of the advertisement.

In some forms of the invention, methods and systems are provided that determine if a user visits a business location through word-of-mouth advertising (e.g., a friend of a user mentioned a particular business location and the user subsequently visits the business location). The mobile device records unique identifying numbers of other devices that it is in proximity with. For purposes of illustration and without limitation, the Wi-Fi or Bluetooth MAC addresses of each device could be used as the unique identifying number. If one mobile device is within wireless range of another device, the unique numbers are recorded. These numbers may be recorded on the device, a remote system, or recorded on the device and sent to a remote system. Thus, if one user of the system visits a store, comes within wireless contact of another user of the system, and then the other use of the system visits the store, it is likely that the first user communicated with the second user about the store. Optionally, the time that the two devices are in proximity with one another may be used to determine the likelihood of two users communicating. Additionally, the frequency that the two devices are in proximity to one another can also be used to determine the likelihood that word-of-mouth advertising took place.

In some forms of the invention, methods and systems are provided that interface location based services with social networking websites. For purposes of illustration and without limitation, if a user of the system is invited to an event, the user will be registered to have attended the event when the user's location corresponds to location of event at time event is taking place. This may only be registered if the user was invited to the event. A user may be invited to a house party that is to take place from 10 PM-2 AM on a Friday-Saturday night. The invitation shows up on the event website or social networking website that is interfaced with the system. The user has the option to RSVP but the user does not. Then, at 11 PM on Friday the user's location corresponds to the location of the party. The system then registers that the user attended the event. In contrast, if a user of the social networking site creates an event to meet up with a few of their friends at a popular bar, the system will not register people at the bar as having attended the event on the social networking or event planning web site. For further illustration without limitation, a review website may only allow reviews of a business location if the user has previously been to the business location. Additionally, the review site may require that the review of the business location is made while the user is at the location, or within a certain amount of time after the user leaves the business location. In some further forms of the invention, methods and systems are provided that interface location based services with social networking websites by displaying location information on the users profile page (e.g., favorite business locations, favorite bars, favorite restaurants, marked locations, etc.); managing location privacy permissions to friends and family; or displaying location based advertisements to the user based on their location information.

As those skilled in the art will appreciate, many aspects of the invention, and the various forms of the invention, can beneficially be practiced alone and need not be coupled together. Unless specifically stated otherwise, no aspect of the invention should be construed as requiring combination with another aspect of the invention in practice. However, those skilled in the art will also appreciate that the aspects of the invention may be combined in any way imaginable to yield one of the various forms of this invention. For purposes of illustration and without limitation, one form of the invention may consist only of location reporting features while another form of the invention may comprise location reporting features and conversion tracking features and while yet another form of the invention does not include location reporting features but includes any one or more of the other features discussed above.

I claim:

1. A method comprising, by a server:
   receiving a search request from a wireless device of a user;
   receiving current location data associated with the wireless device;
   determining one or more likely travel routes of the user based at least on the current location data, one or more previous search requests from the wireless device for travel directions, and a database of map information;
   selecting, in response to the search request, one or more establishments from a plurality of establishments, wherein the one or more establishments are selected based on (1) the one or more likely travel routes of the user, (2) location data associated with the one or more establishments, and (3) a determination that one or more contacts of the user on a social networking service have visited the one or more establishments; and
   transmitting, to the wireless device, information associated with the selected one or more establishments.

2. The method of claim 1, wherein the one or more establishments are selected based on past location data of the wireless device, the past location data comprising (1) a frequency that the wireless device is located at the one or more establishments or one or more establishment types associated with the one or more establishments, or (2) an amount of time that the wireless device is located at the one or more establishments or one or more establishment types associated with the one or more establishments.

3. The method of claim 1, wherein the one or more establishments are selected based on one or more ratings of the one or more establishments or one or more establishment types associated with the one or more establishments, the one or more ratings being provided by the user on the social networking service.

4. The method of claim 1, wherein the one or more establishments are selected based on the transmitted information associated with the selected one or more establishments, the information comprising an hours of operation of the one or more establishments.

5. The method of claim 1, further comprising determining that the wireless device is traveling in a vehicle, wherein the transmitted information associated with the selected one or more establishments comprises driving directions to the selected one or more establishments.

6. The method of claim 5, further comprising determining a current heading of the vehicle, wherein the one or more establishments are selected based on the current heading of the vehicle.

7. The method of claim 1, further comprising determining that the user of the wireless device is walking, wherein the one or more establishments are selected based on a predetermined radial distance from a current location of the wireless device.

8. One or more computer-readable non-transitory storage media comprising software that is operable when executed by a server to:
   receive a search request from a wireless device of a user;
   receive current location data associated with the wireless device;
   determine one or more likely travel routes of the user based at least on the current location data, one or more previous search requests from the wireless device for travel directions, and a database of map information;
   select, in response to the search request, one or more establishments from a plurality of establishments, wherein the one or more establishments are selected based on (1) the one or more likely travel routes of the user, (2) location data associated with the one or more establishments, and (3) a determination that one or more contacts of the user on a social networking service have visited the one or more establishments; and
   transmit, to the wireless device, information associated with the selected one or more establishments.

9. The media of claim 8, wherein the one or more establishments are selected based on past location data of the wireless device, the past location data comprising (1) a frequency that the wireless device is located at the one or more establishments or one or more establishment types associated with the one or more establishments, or (2) an amount of time that the wireless device is located at the one or more establishments or one or more establishment types associated with the one or more establishments.

10. The media of claim 8, wherein the one or more establishments are selected based on one or more ratings of the one or more establishments or one or more establishment types associated with the one or more establishments, the one or more ratings being provided by the user on the social networking service.

11. The media of claim 8, wherein the one or more establishments are selected based on the transmitted information associated with the selected one or more establishments, the information comprising an hours of operation of the one or more establishments.

12. The media of claim 8, wherein the software is further operable when executed to determine that the wireless device is traveling in a vehicle, wherein the transmitted information associated with the selected one or more establishments comprises driving directions to the selected one or more establishments.

13. The media of claim 12, wherein the software is further operable when executed to determine a current heading of the vehicle, wherein the one or more establishments are selected based on the current heading of the vehicle.

14. The media of claim 8, wherein the software is further operable when executed to determine that the user of the wireless device is walking, wherein the one or more establishments are selected based on a predetermined radial distance from a current location of the wireless device.

15. A system comprising:
one or more processors; and
one or more computer-readable non-transitory storage media coupled to one or more of the processors and comprising instructions operable when executed by one or more of the processors to cause the system to:
receive a search request from a wireless device of a user;
receive current location data associated with the wireless device;
determine one or more likely travel routes of the user based at least on the current location data, one or more previous search requests from the wireless device for travel directions, and a database of map information;
select, in response to the search request, one or more establishments from a plurality of establishments, wherein the one or more establishments are selected based on (1) the one or more likely travel routes of the user, (2) location data associated with the one or more establishments, and (3) a determination that one or more contacts of the user on a social networking service have visited the one or more establishments; and
transmit, to the wireless device, information associated with the selected one or more establishments.

16. The system of claim 15, wherein the one or more establishments are selected based on past location data of the wireless device, the past location data comprising (1) a frequency that the wireless device is located at the one or more establishments or one or more establishment types associated with the one or more establishments, or (2) an amount of time that the wireless device is located at the one or more establishments or one or more establishment types associated with the one or more establishments.

17. The system of claim 15, wherein the one or more establishments are selected based on one or more ratings of the one or more establishments or one or more establishment types associated with the one or more establishments, the one or more ratings being provided by the user on the social networking service.

18. The system of claim 15, wherein the one or more establishments are selected based on the transmitted information associated with the selected one or more establishments, the information comprising an hours of operation of the one or more establishments.

19. The system of claim 15, wherein the processors are further operable when executing the instructions to determine that the wireless device is traveling in a vehicle, wherein the transmitted information associated with the selected one or more establishments comprises driving directions to the selected one or more establishments.

20. The system of claim 19, wherein the processors are further operable when executing the instructions to determine a current heading of the vehicle, wherein the one or more establishments are selected based on the current heading of the vehicle.

* * * * *